US010914067B2

(12) United States Patent
Gilbertson et al.

(10) Patent No.: US 10,914,067 B2
(45) Date of Patent: Feb. 9, 2021

(54) INTEGRATED FENESTRATION WALL ASSEMBLY

(71) Applicant: Integrity Windows and Doors / Infinity Replacement Windows, Warroad, MN (US)

(72) Inventors: Nathan Gilbertson, West Fargo, ND (US); Wesley Green, Fargo, ND (US); Ross Hollermann, Salol, MN (US); Zachary Staples, Moorhead, MN (US)

(73) Assignee: Integrity Windows, LLC, Warroad, MN (US)

( * ) Notice: Subject to any disclaimer, the term of this patent is extended or adjusted under 35 U.S.C. 154(b) by 0 days.

(21) Appl. No.: 16/293,285

(22) Filed: Mar. 5, 2019

(65) Prior Publication Data

US 2019/0271155 A1 Sep. 5, 2019

Related U.S. Application Data

(60) Provisional application No. 62/638,782, filed on Mar. 5, 2018.

(51) Int. Cl.
*E04B 2/96* (2006.01)
*H02G 3/38* (2006.01)

(52) U.S. Cl.
CPC ............. *E04B 2/967* (2013.01); *H02G 3/386* (2013.01)

(58) Field of Classification Search
CPC . E04B 2/967; E04B 9/42; E04B 1/528; E04B 3/4609; E04B 3/5454; E04B 3/2605; E04B 2003/2615; E04B 3/00; E04B 2/74; E04B 2/7407; E04B 2/7438; E04B 2/7457; H02G 3/386
See application file for complete search history.

(56) References Cited

U.S. PATENT DOCUMENTS

| 3,462,892 A | * | 8/1969 | Meyer | E04C 2/521 52/28 |
|---|---|---|---|---|
| 3,810,330 A | | 5/1974 | Daggy | |
| 4,523,716 A | | 6/1985 | Gartner | |
| 4,947,593 A | | 8/1990 | Kuo | |
| 5,022,454 A | | 6/1991 | Kobayashi et al. | |
| 5,230,123 A | | 7/1993 | Williams et al. | |

(Continued)

OTHER PUBLICATIONS

"Cero by NanaWall Product Brochure", Nana Wall Systems, Inc., (2017), 79 pgs.

(Continued)

*Primary Examiner* — Rodney Mintz
(74) *Attorney, Agent, or Firm* — Schwegman Lundberg & Woessner, P, A.

(57) ABSTRACT

A fenestration wall assembly includes a fenestration frame extending along a perimeter of the fenestration wall assembly. The fenestration frame includes a socket core having a first module socket configured to interchangeably receive service modules therein, and a second module socket configured to interchangeably receive service modules therein. The interchangeably received service modules include at least first and second service modules. Each of the first and second modules includes respective first and second module profiles. A panel having a panel profile is surrounded by the fenestration frame. The panel profile is isolated from the first and second module profiles.

60 Claims, 25 Drawing Sheets

(56) References Cited

U.S. PATENT DOCUMENTS

| | | | |
|---|---|---|---|
| 5,548,926 A | 8/1996 | Sjoholm | |
| 6,065,247 A | 5/2000 | Sundvall | |
| 6,286,258 B1 | 9/2001 | Bischof et al. | |
| 6,286,277 B1 | 9/2001 | Blöbaum et al. | |
| 6,460,293 B1 | 10/2002 | Bischof | |
| 6,550,196 B2 | 4/2003 | Braybrook | |
| 6,804,920 B2 | 10/2004 | Hogan | |
| 6,823,927 B2 | 11/2004 | Steel et al. | |
| 6,968,661 B2 * | 11/2005 | Kopish | E04B 2/7457 52/481.1 |
| 6,993,873 B2 | 2/2006 | Biebuyck et al. | |
| 7,036,280 B2 | 5/2006 | Hogan | |
| 7,520,093 B2 | 4/2009 | Guhl | |
| 7,810,283 B2 | 10/2010 | Rapson | |
| 7,941,982 B2 | 5/2011 | Merica | |
| 8,365,482 B2 | 2/2013 | Merica | |
| 8,590,233 B2 | 11/2013 | Sprague | |
| 8,595,995 B2 | 12/2013 | Brescia | |
| 8,604,343 B2 | 12/2013 | Nixon-Lane | |
| 8,627,621 B2 | 1/2014 | Liebscher et al. | |
| 8,640,391 B2 * | 2/2014 | Newkirk | E04F 19/08 52/36.1 |
| 8,713,869 B1 * | 5/2014 | Eychaner | H05K 7/20745 52/238.1 |
| 8,789,323 B2 | 7/2014 | Christian | |
| 8,800,221 B1 | 8/2014 | Header | |
| 8,850,761 B2 | 10/2014 | Aschauer | |
| 8,863,454 B2 | 10/2014 | Davies et al. | |
| 8,898,969 B2 | 12/2014 | Bagatelos | |
| 8,927,953 B2 | 1/2015 | Boissevain et al. | |
| 8,950,115 B2 | 2/2015 | Andersson et al. | |
| 8,955,271 B2 | 2/2015 | Keller et al. | |
| 8,966,842 B2 | 3/2015 | Hager et al. | |
| 9,045,896 B2 | 6/2015 | Haan et al. | |
| 9,238,911 B2 | 1/2016 | Kerley et al. | |
| 9,273,463 B1 | 3/2016 | Kossman | |
| 9,376,849 B2 | 6/2016 | Lim | |
| 9,441,364 B2 | 9/2016 | Bertoldini et al. | |
| 9,482,043 B2 | 11/2016 | Kawashima et al. | |
| 9,518,387 B2 | 12/2016 | Geister et al. | |
| 9,637,961 B2 | 5/2017 | Header et al. | |
| 9,663,946 B2 | 5/2017 | Frederick | |
| 9,683,376 B2 | 6/2017 | Zahner et al. | |
| 9,739,080 B2 | 8/2017 | Yoon | |
| 9,777,530 B1 | 10/2017 | Haba et al. | |
| 9,777,533 B2 | 10/2017 | Lindgren et al. | |
| 9,803,362 B2 | 10/2017 | Bertoldini et al. | |
| 9,840,841 B2 * | 12/2017 | Gosling | E04B 2/745 |
| 9,856,644 B2 * | 1/2018 | Gosling | E04B 2/7453 |
| 9,863,147 B2 | 1/2018 | Graziano | |
| 10,030,384 B2 * | 7/2018 | Gosling | E04B 2/7457 |
| 10,041,288 B1 * | 8/2018 | Flood | E04B 2/44 |
| 10,301,821 B2 * | 5/2019 | Gosling | E04B 2/745 |
| 10,435,885 B2 * | 10/2019 | Piethman | E04B 2/7425 |
| 2004/0139681 A1 * | 7/2004 | Kopish | E04B 2/7457 52/633 |
| 2008/0066402 A1 * | 3/2008 | Walker | E04B 2/90 52/235 |
| 2008/0302054 A1 * | 12/2008 | Gosling | E04B 2/7425 52/588.1 |
| 2010/0050548 A1 * | 3/2010 | Krieger | E04B 2/7453 52/270 |
| 2010/0095604 A1 * | 4/2010 | Newkirk | E04C 2/521 52/79.1 |
| 2010/0223857 A1 * | 9/2010 | Sutton | A61G 12/005 52/27 |
| 2011/0113694 A1 | 5/2011 | Douche | |
| 2011/0283632 A1 * | 11/2011 | Sutton | A47B 96/06 52/36.1 |
| 2015/0027059 A1 * | 1/2015 | Lu | E06B 9/42 49/70 |
| 2015/0308128 A1 * | 10/2015 | Mullaney | H02G 3/288 52/126.3 |
| 2016/0251851 A1 * | 9/2016 | Gosling | E04B 2/828 52/481.2 |
| 2016/0348361 A1 * | 12/2016 | Gosling | E04B 2/745 |
| 2016/0356038 A1 * | 12/2016 | Gosling | E04C 2/46 |
| 2017/0009450 A1 * | 1/2017 | Gosling | E04B 2/7424 |
| 2017/0022707 A1 * | 1/2017 | Feldpausch | E04B 2/7457 |
| 2017/0022708 A1 | 1/2017 | Dolby | |
| 2017/0040940 A1 | 2/2017 | Ting | |
| 2017/0089066 A1 * | 3/2017 | Gosling | E04B 2/7453 |
| 2017/0093100 A1 | 6/2017 | Welch et al. | |
| 2017/0183867 A1 | 6/2017 | Sollohub et al. | |
| 2018/0274245 A1 * | 9/2018 | Kim | E04F 13/083 |
| 2019/0330844 A1 * | 10/2019 | Gille | E06B 3/26 |

OTHER PUBLICATIONS

"Das rahmenlose Fenster / The frameless window", Burckhardt's Soreg Glide Product Brochure, w/ Partial Machine Translation, (2011), 137 pgs.

"Hi-Finity Product Brochure", Reynaers Aluminium, (2016), 20 pgs.

"Keller Minimal Windows 4 Product Brochure", Keller AG, (2017), 76 pgs.

"Orama MiniLok Frames", Orama Architectural Catalogue Ed. 2.0, (2015), 57 pgs.

"Panoramah Minimal Frame Window Catalogue", panoramah.com, (2014), 60 pgs.

"SwissFineLine exclusive frameless windows and doors", Product Brochure, swissFineLine AG, (2018), 32 pgs.

"Vitrocsa Sliding 3001 Data Sheet", Vitrocsa USA, (2015), 11 pgs.

"Working With Sky-Frame", Sky-Frame Product Brochure, (2015), 215 pgs.

* cited by examiner

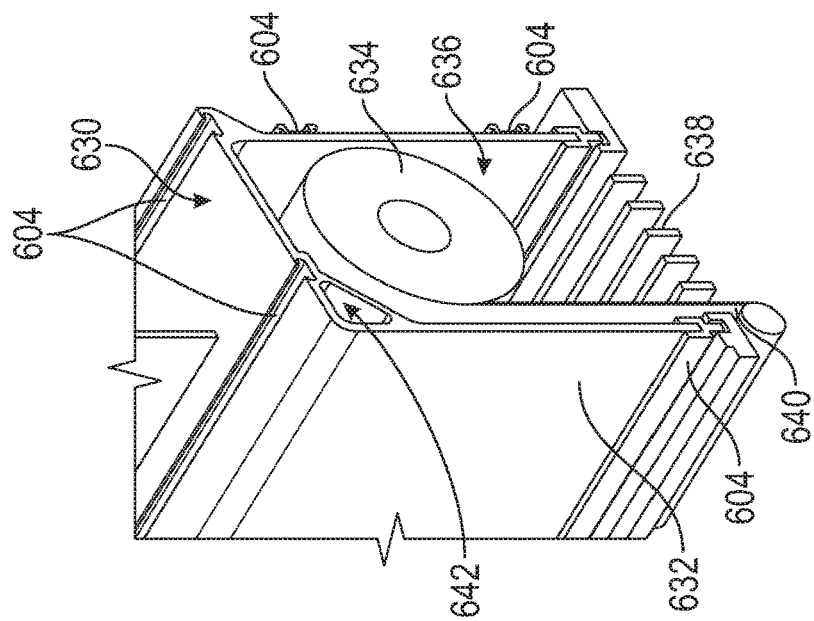
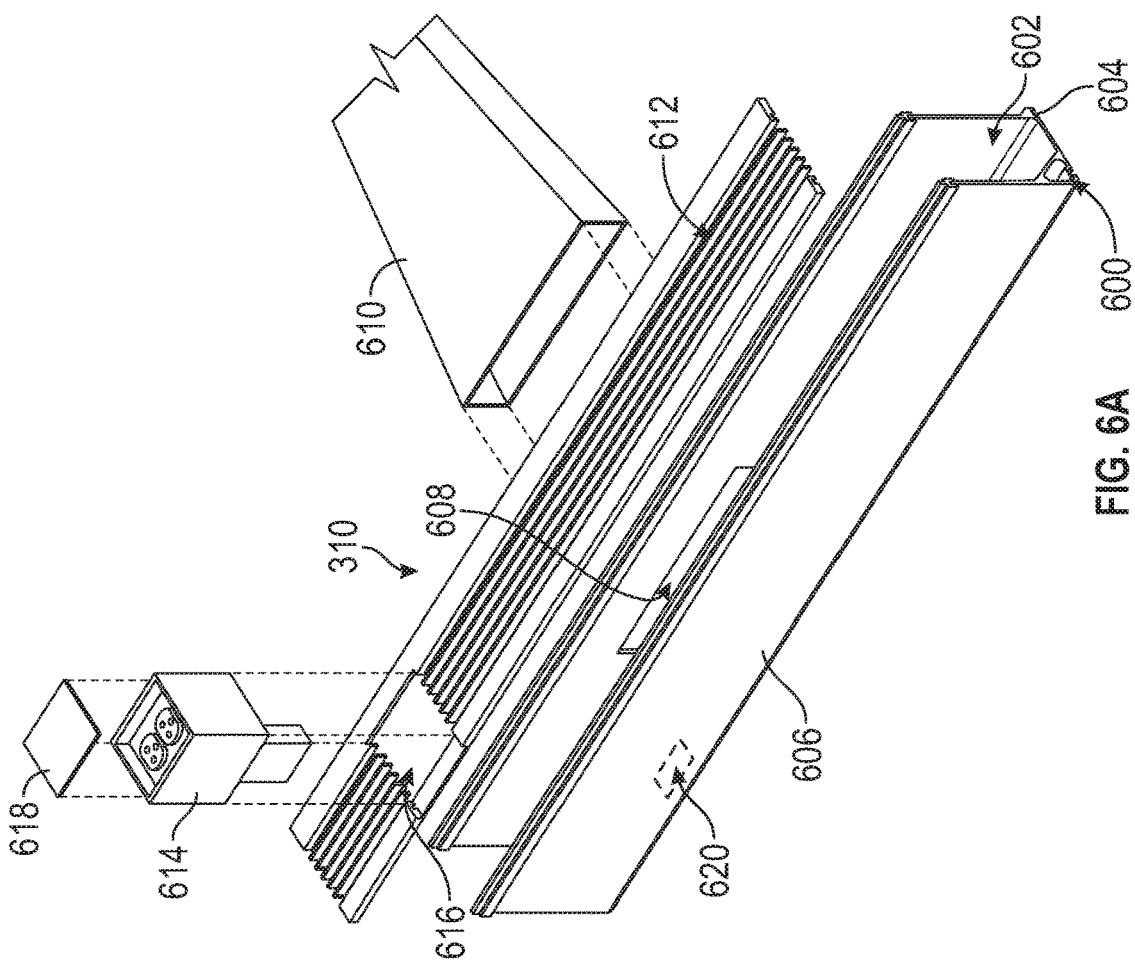
FIG. 6B
FIG. 6A

US 10,914,067 B2

INTEGRATED FENESTRATION WALL ASSEMBLY

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Marvin Cedar Company, d/b/a Marvin Windows and Doors, Warroad, Minn. All Rights Reserved.

BACKGROUND

The construction of a building including both residential and office buildings includes design and selection of components, various construction stages conducted by a variety of tradesmen, and is a generally lengthy process.

For instance, an architect generates a design and plans for a building. The architect selects and specifies materials and components for the building including one or more of structural components and building technique (e.g., concrete and rebar, wood frame, steel frame or the like), component fenestration assemblies, decorative features including wall panels, fascia, and heating ventilation and cooling (HVAC) components, ceiling and flooring, window treatments, lighting and other electrical components and the like.

The project manager and tradesmen then implement the design of the architect. For instance, the tradesmen assemble the frame of the building including pouring concrete, assembling rebar, constructing framing or the like. Other tradesmen install fenestration assemblies including curtain walls having one or more of glazing panels, wall panels or the like. In one example, the curtain walls are hung on the frame of the building (e.g., concrete floors and ceilings at each floor). Further, other tradesmen install other components of the building including fascia, electrical wiring, lighting, HVAC duct work and registers, window treatments or the like. In at least some examples, these tradesmen work with the architect, project manager and other tradesmen to build out the structure to reflect the design.

Overview

The present inventors have recognized that in one example a problem to be solved includes reducing extensive trade work for installation of each of fenestration assemblies; electrical wiring; HVAC duct work and registers; window treatments, such as, concealed shades; fascia on both the exterior and interior of a building or the like. In some examples, the tradesmen or project manager are unable or unwilling to build out various combinations of components and features including HVAC duct work and registers, window treatments, electrical wiring, fascia because the components will not work together (e.g., do not fit, obstruct each other or the like) or extensive work outside of the scope of the project is required. The architect then negotiates a compromise or modifies the design with one or more of changes to the plans or selection of different components or features to accommodate the project manager and tradesman. This back and forth process may proceed through multiple iterations and accordingly introduce additional cost and significant additional design and construction time for the building. For instance, variations in one or more components or features to accommodate other selected parts of the design may prompt further modifications because of interference or difficult integration between the newly selected components or features and the other parts of the design. Additionally, aspects of the design, including customer specified features, may suffer because of these variations from the original design.

Further, even where the components and features may feasibly be constructed with the building, in some examples these features interfere with the aesthetics of one or more components. For instance, one or more of HVAC duct work and registers, wiring, outlets, window treatments including recessed screens or the like, when installed, may interfere with the aesthetic of the building including, but not limited to, a minimalist clean look of a fenestration assembly, floor to ceiling wall panels or glazing units. Additional trade work including ceiling or floor installation, HVAC routing and electrical work is required to accommodate these aesthetic specifications (e.g., by concealing or rerouting components) while also providing the respective services and functions.

The present subject matter helps provide a solution to these problems with a fenestration wall assembly configured to provide module sockets, for instance in the fenestration frame of the assembly. In one example, the fenestration wall assembly includes a socket core that provides a framework, interface or the like having the module sockets. The socket core optionally extends around a portion of the fenestration wall assembly, such as one or more of the jamb or header, or the entire assembly (e.g., including a sill, header, jambs or the like). The module sockets are configured to receive and retain interchangeable service modules. The service modules each provide one or more features or functions that are selected by the architect, customer or designer for inclusion with the fenestration wall assembly. Examples of the service modules include, but are not limited to, conduit modules (HVAC conduit, electrical or data conduit or the like), screen modules, glazing unit modules, door modules, wall modules, diversion modules (water diversion) or trim (fascia) modules.

Once the service modules are selected, the fenestration wall assembly is assembled either at the factory or on site. Each of the selected service modules are coupled along the socket core, for instance, with one or more coupling fittings, ports or the like. In various examples, the service modules include module profiles and the fenestration assembly includes a panel (e.g., glazing pane, door, wall or the like) having a panel profile. The module profiles of the service modules in combination with coupling with the mounting sockets of the socket core isolate the panel profile from each of the module profiles. For instance, a floor to ceiling glazing unit remains fully revealed, provides each of the specified services or features of the installed service modules, while concealing the service modules in the fenestration wall assembly. Additionally, in another example the module profiles of the service modules are complementary to module socket profiles of the socket cores, and when installed, the module socket profiles include the module profiles therein.

Further, the assembled fenestration wall assembly is ready for installation in a limited number of steps with a limited team of personnel. Because the service modules are components of the fenestration wall assembly, the installation of the fenestration wall assembly (e.g., coupling to a building in the manner of a curtain wall, mounting between floors and ceilings or the like) also installs the onboard service modules. Labor and time intensive build outs of HVAC duct work, wiring chases, ceiling recesses for window treatments or the like are minimized or eliminated. Instead, the installed service modules provide these features (or significant portions of these features) when installed as part of the fenestration wall assembly.

Additionally, the architect, customer or designer selects service modules for inclusion with the fenestration wall assembly. Because the fenestration wall assembly includes module sockets, the service modules are seamlessly incorporated into the assembly. Time consuming and iterative redesign, negotiation and sacrifice of the specified design because of incompatibility or tradesman and project manager objections are minimized or eliminated. Instead, the finished fenestration wall assembly is provided in a ready to install configuration and installed in a limited number of steps. Tradesmen, including HVAC technicians, electricians or the like make final connections to one or more ports provided with the fenestration wall assemblies, for instance to connect building HVAC systems, power, data or the like. In another example, the tradesmen run their own wiring, cabling or ducting through the fenestration wall assemblies. The wall assemblies accordingly include onboard conduits or the like to consolidate their work to the fenestration wall assemblies while minimizing separate installation work outside of the wall assemblies.

This overview is intended to provide an overview of subject matter of the present patent application. It is not intended to provide an exclusive or exhaustive explanation of the disclosure. The detailed description is included to provide further information about the present patent application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6A is an exploded view of one example of a subassembly module.

FIG. 6B is a perspective view of another example of a subassembly module.

DETAILED DESCRIPTION

The subject matter described herein provides a platform fenestration assembly that consolidates and blends features and functions of fenestration and non-fenestration subject matter together. The example fenestration assemblies described herein integrate in one product, a combination of systems supplied by various manufacturers and installed by various tradesmen including, but not limited to, lighting, power and data wiring or cabling, HVAC, automation (e.g., tinting, operation of shades or screens), shades, screens or the like. The socket core, modules sockets of the socket core and service modules selected and installed within the module sockets provide a minimal design aesthetic from the interior that maintains floor to ceiling glass views by at least partially concealing the service modules, while at the same time providing one or more operable features or functions described herein. In one example, the customer picks and chooses service modules from a catalog of options for a selected socket core (e.g., having a specified number of module sockets; socket profiles; module socket locations along the sill, header, jambs or the like) to provide an integrated fenestration assembly that provides onboard features and functions including, but not limited to, utilities (e.g., electrical, data, HVAC or the like), solar control (such as tinting, deployable shades or the like), insect control (including deployable screens), diversion (e.g., rain or moisture diversion), various aesthetic profiles provided with trim modules, fascia or the like.

Figure 1:
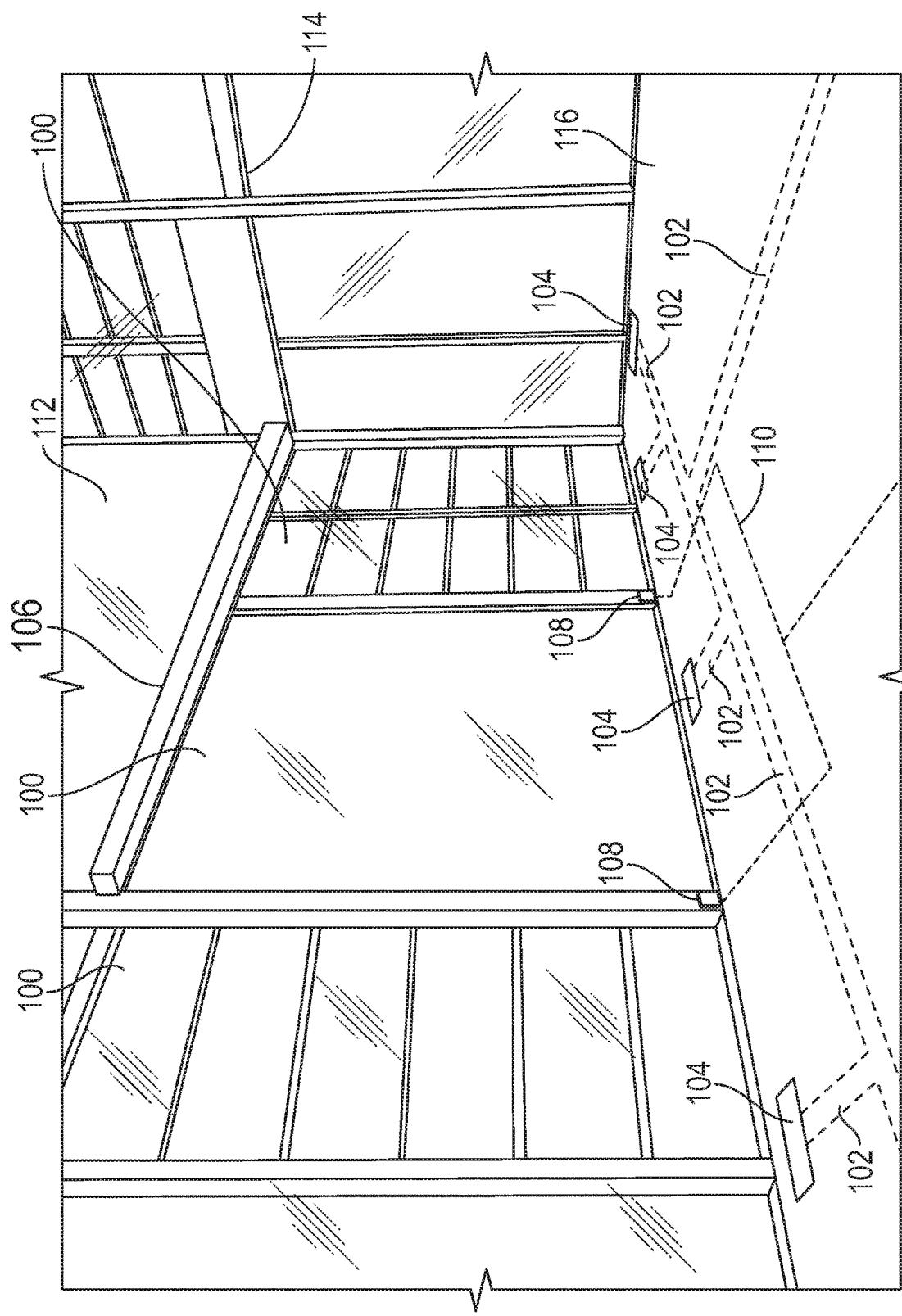
FIG. 1 is a perspective view of a building including one or more fenestration assemblies, window treatments, utility conduits, wiring and ductwork.

FIG. 1 shows one example of a building 114 including a plurality of fenestration assemblies 100 installed therein. The building 114 includes one or more walls 112 and a floor 116. The building 114 further includes a plurality of non-fenestration features including, but not limited to, HVAC registers 104, HVAC ducts 102, wiring runs 110, outlet boxes 108 in communication with the wiring runs 110 and the like.

As shown in FIG. 1, each of the HVAC ducts 102 and wiring runs 110 (e.g., conduits, routing or the like) extend through one or more features of the building 114 including, for instance, the floor 116 as well as non-fenestration components of the walls 112. For instance, technicians, utility specialists or the like route HVAC ducts 102, wiring runs 110 or the like through the building 114 to provide one or more of these services to different locations of the building 114. After installation of the floor 116, walls 112 or the like, additional tradesmen, craftspersons or the like return to the building 114 to install one or more of the outlet boxes 108 and HVAC ducts 102 to accordingly supply environmental services such as conditioned air, power, data or the like. As further shown in FIG. 1, the building 114 includes a plurality of fenestration assemblies 100 provided along one or more of the walls 112 of the building 114. In this example, the fenestration assemblies 100 include extensive windows, sliding doors or the like. Optionally, the fenestration assemblies 100 extend from the floor 116 to the ceiling to provide enhanced daylight openings and natural light to the building 114. In some examples, shade assemblies 106 (deployable shades, louvers, screens or the like) are provided along the walls 112 to provide one or more window treatments for the fenestration assemblies 100. For instance, the shade assemblies 106 include built-out housings, mechanisms or the like to deploy shades, screens, louvers or the like to accordingly adjust the amount of light admitted to the building 114. Additional wiring runs 110 are in some examples run by technicians to provide power to the shade assembly mechanisms (where included).

With the building 114 shown in FIG. 1, a plurality of tradespeople and materials are used to install the various features of the building 114 including, for instance, various services such as heating, ventilation and cooling, electrical power, data connections, window treatments or the like. In the building 114 shown in FIG. 1, each of these components are installed separate relative to the fenestration assemblies 100. For example, tradesmen are assigned to the building 114 on a staggered schedule to access the appropriate portions of the building to install the wiring runs 110, HVAC ducts 102, fenestration assemblies 100, shade assemblies 106 or the like. Each of these tradesmen rotate out to open the building 114 to the next trade.

Figure 2:
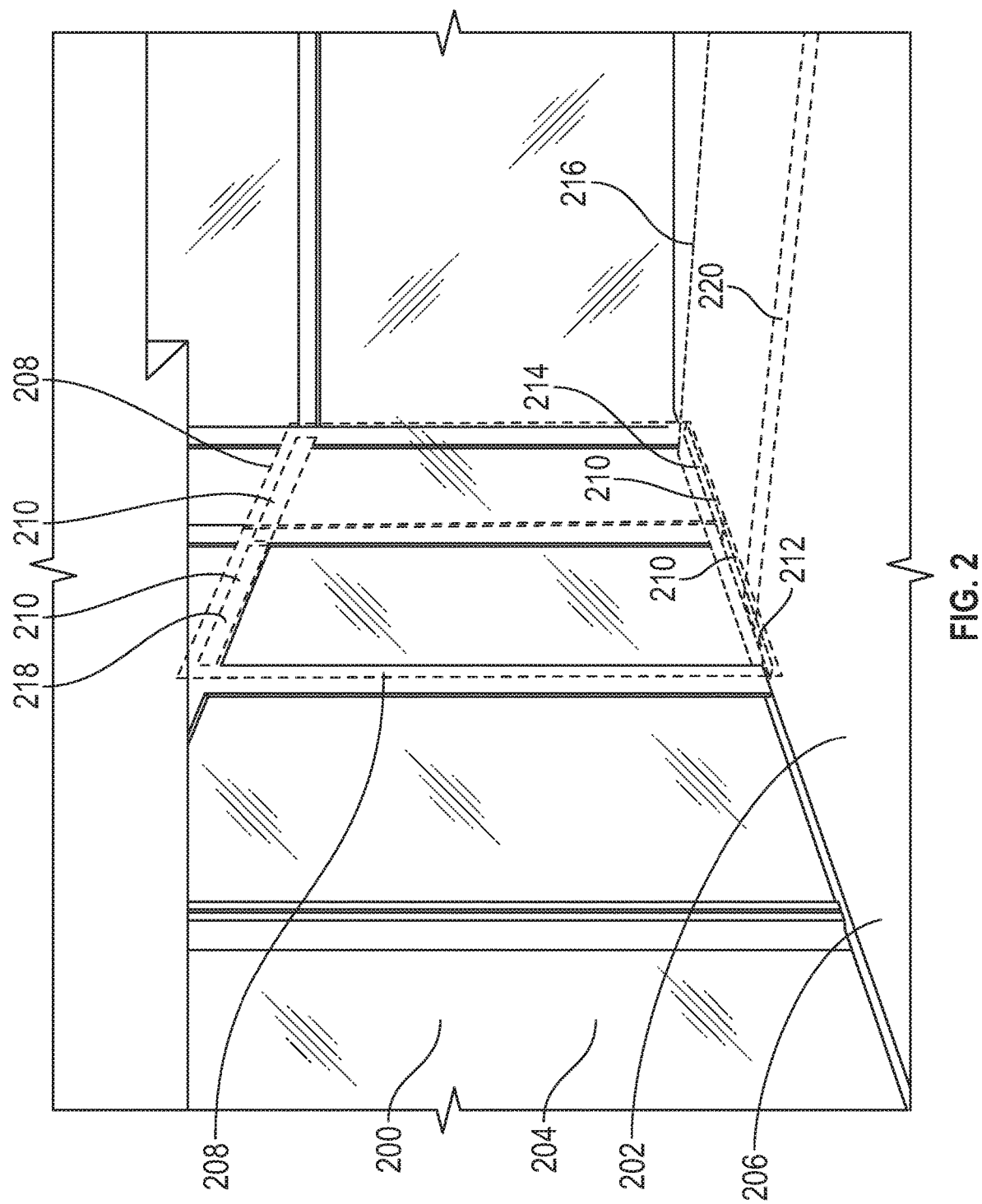
FIG. 2 is a perspective view of one example of a building including one or more fenestration wall assemblies.

Referring now to FIG. 2, another example of a building 200 is shown. In this example, the fenestration wall assemblies 208 include one or more modules, such as conduit modules 212, screen modules 218, glazing unit modules (described herein) or the like, collectively called service modules 210. The fenestration wall assemblies 208 described herein and shown, for instance, in FIG. 2, include a plurality of sockets or other features configured to receive the service modules 210 in a complementary fashion. For instance, the fenestration wall assembly 208 is provided in an as-built configuration or a modular configuration for assembly onsite to install the one or more service modules 210 to the fenestration wall assembly 208 and thereby consolidate the modules and the fenestration wall assembly 208 in a single unit to facilitate design of the building 200 and installation.

As further shown in FIG. 2, the room 202 of the building 200 optionally includes a plurality of fenestration wall assemblies 208. The fenestration wall assemblies 208 provide one or more panels, including glass units, insulated glazing units (IGU), wall units, sliding doors, doors or the like, configured to provide access to and through the building 200 as well as daylight openings, fresh air openings or the like.

As previous described, the fenestration wall assemblies 208 include one or more service modules 210 including, but not limited to, the conduit module 212, screen module 218 or the like. For instance, the conduit module 212 includes one or more passages, such as cable conduits 214, configured to deliver one or more utilities or services to various locations in the building. The cable conduits provide services including, but not limited to, cabling for data, electrical wiring, telephone service or the like. In other examples, the conduit module 212 includes one or more passages configured to provide environmental conditioning services, for instance, one or more of conditioned air, fluids (such as radiator steam, hot water, cold water), compressed air, natural gas or the like.

As further shown in FIG. 2, an HVAC duct 220 extends through the room 202 in a linear passage through the floor 206 to a corresponding connection with the conduit module 212. The HVAC duct 220 connects with the one or more utility conduits, passages or the like provided in the conduit module 212. As shown in FIG. 2, and in comparison to FIG. 1, the HVAC duct 220 has a relatively linear route through the floor 206 for connection with the fenestration wall assembly 208 in comparison to the tortuous HVAC ducts 102 shown in FIG. 1. The HVAC duct 220 in FIG. 2 is connected with the fenestration wall assembly 208. If the fenestration wall assembly 208 is connected in series with adjacent wall assemblies the supplied service (e.g., conditioned air) is readily distributed through the conduit modules 212 of each of the wall assemblies to one or more specified locations. For example, the conduit modules of each of the wall assemblies 208 are interconnected to provide fluid communication (wired communication or the like) of the service. In the example shown in FIG. 2, heated or cooled air provided by the HVAC duct 220 is distributed throughout the room 202, the building 200 or the like through the fenestration wall assemblies 208, for instance, through the onboard conduit modules 212 of the assemblies 208.

In a similar manner, a wiring run 216 for the building 200 is, in one example, provided along one or more main lines, headers or the like to a corresponding fenestration wall assembly 208 having a conduit module 212 with a cable conduit 214. The wiring run 216 is interconnected with the cable conduit 214 extending through the fenestration wall assembly (e.g., to either end of the assembly) to provide one or more of data, power, telephone service or the like through the fenestration wall assemblies 208. As with environmental services described above, the cable conduit 214 of the conduit module 212 is, in one example, interconnected with corresponding cable conduits 214 provided in adjacent fenestration wall assemblies 208. Accordingly, one or more of data service, power, telephone service or the like is provided throughout the building 200 and the room 202 through the interconnected fenestration wall assemblies 208.

Accordingly, as shown in FIG. 2, the one or more services, including, for instance, environmental service, data service, electrical service, telephone service or the like are consolidated in the fenestration wall assemblies 208 with onboard service modules as opposed to the arrangement in FIG. 1 including distribution of the services throughout the building and separate installations for each. Instead, the fenestration wall assemblies 208 consolidate these various modules to facilitate a one-time or limited time installation of these services, modules, components or the like with the installation of the fenestration wall assembly 208. Additionally, the ducting, wiring, cabling or the like, such as HVAC ducting 220, wiring 216 or the like are more readily routed through the building 200 in a single chase or building conduit to a corresponding plug, interface or the like provided with the fenestration wall assemblies 208. The fenestration wall assemblies 208 then distribute the service through the building 200. Accordingly, the fenestration wall assemblies 208 provide a distribution or delivery manifold for one or more services including HVAC, other environmental services such as conditioned air, steam, cold or hot water, natural gas or the like as well as other services including one or more of data, power, telephone service or the like.

In a similar manner to the previously described conduit module 212 and other service modules 210, in another example, the fenestration wall assemblies 208 include a screen module 218. For instance, in the example shown in FIG. 2, the building 200 includes fenestration wall assemblies 208 having at least one screen module 218 onboard. The screen module 218 includes one or more of a deployable screen, shade or the like within a corresponding module socket of the fenestration frame of the fenestration wall assembly 208. Optionally, the screen module 218 (like the other modules described herein) in some examples bridges across one or more assemblies 208, for instance to provide an elongate continuous screen.

Installation of the fenestration wall assembly 208 to the building 200 accordingly also installs the screen module 218 in a specified location, for instance, proximate the top of the fenestration wall assembly 208 and proximate the ceiling to facilitate deployment from a specified location and concealment of the screen module 218 in the fenestration wall assembly 208. Labor intensive and time intensive buildouts of screens, shades, window treatments or the like are accordingly minimized with the screen module 218 provided in an onboard manner with the fenestration wall assembly 208.

Further, as shown in FIG. 2, each of the service modules 210 (e.g., conduit module 212, screen module 218 or the like) optionally have a low profile as part of the fenestration wall assembly 208. Accordingly, the panel, such as the daylight opening of a window, door panel or the like, is isolated from the profiles of the service modules 210. For instance, as shown in FIG. 2, the conduit module 212 and the screen module 218 are recessed from the panel and accordingly do not obstruct the panel (here a daylight opening). Instead, the fenestration wall assembly 208, including these onboard service modules 210, provides a floor-to-ceiling type panel including a daylight opening, door or the like with a fenestration frame having a clean aesthetically pleasing minimalist look for the building 200.

Figure 3:
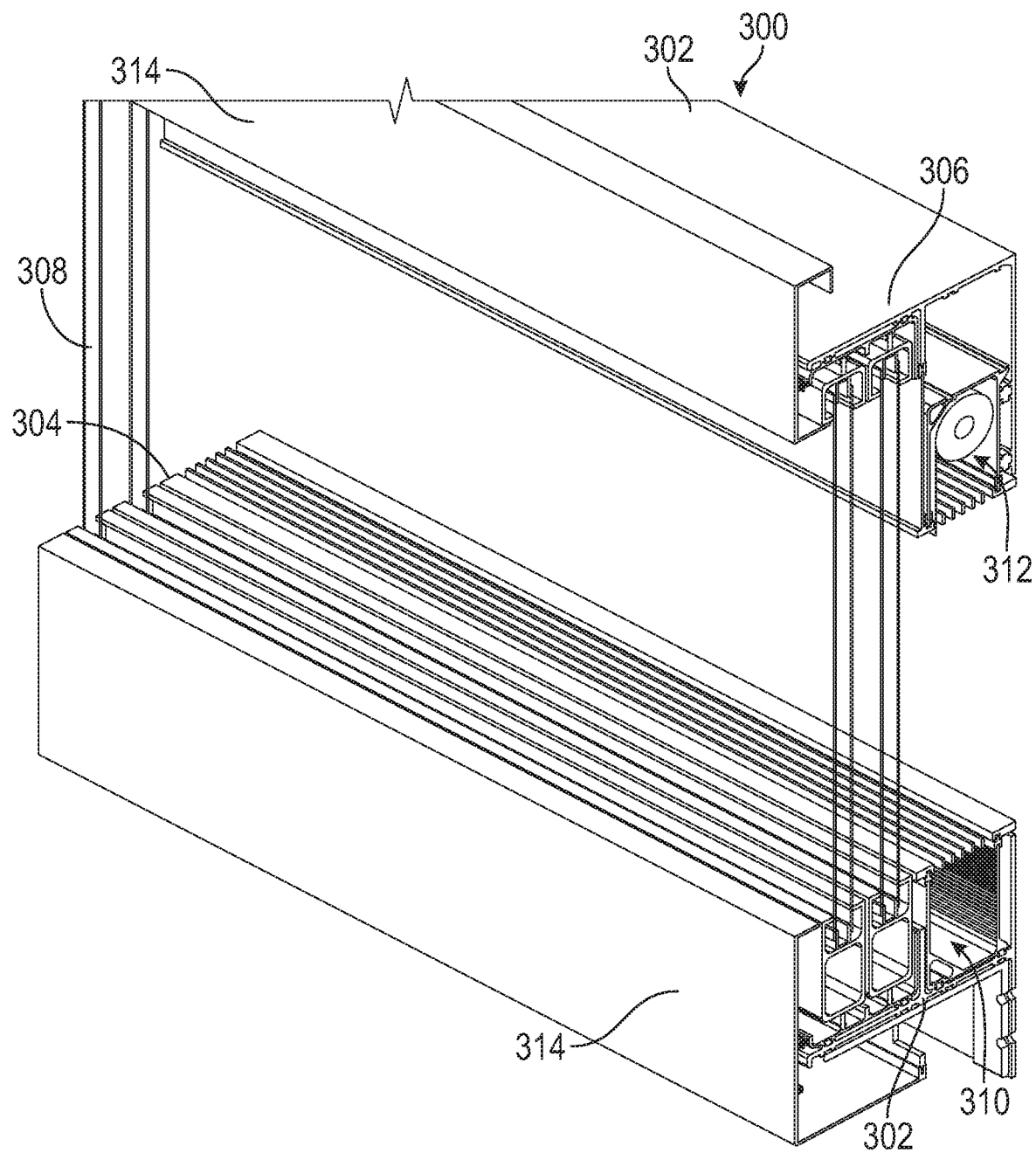
FIG. 3 is a cross-sectional view of one example of a fenestration wall assembly.

FIG. 3 shows another example of a fenestration wall assembly 300 including a plurality of module sockets provided along a socket core 306 of the fenestration frame 302. As further shown in FIG. 3, the fenestration frame 302 extends into and out of the page, for instance, along a sill and header and provides the socket core 306 there along. In other examples, the socket core 306 is provided in one or more of the sill, header, jambs or the like of the fenestration frame 302 and sockets for reception of one or more modules are accordingly provided at a plurality of locations around the fenestration wall assembly 300. The fenestration frame 302 (and socket core 306) extending along the sill and header or along the sill, header, jambs or the like surrounds the fenestration wall assembly 300. For instance, the fenestration frame 302 optionally includes discontinuities at one or more locations around the assembly 300 while still surrounding the assembly 300. The fenestration frame 302 including the socket core 306 is provided in an open configuration in FIG. 3, for instance, without mullions, trim or the like or intervening vertical socket cores 306 (or socket core 702 shown in FIGS. 7A-F) for illustration, explanation and to facilitate viewing of the interior of the assembly 300 including the modules installed in the module sockets of the socket core 306.

Referring again to FIG. 3, the socket core 306 is, in one example, a component of the fenestration frame 302. The socket core 306, in various examples, includes one or more module sockets configured for reception of corresponding service modules having a complementary profile. A variety of service modules are shown in FIG. 3 including, but not limited to, a conduit module 310 configured to provide one or more of environmental services, water diversion, other services such as data, power, telephone service or the like. Further shown in FIG. 3 is a screen module 312. The screen module 312 includes one or more features such as a screen, blinds, louvers or the like that are deployable from a housing of the module in one or more of the module sockets. In another example, the fenestration wall assembly 300 includes a glazing unit module 308 or a plurality of glazing unit modules 308 installed in one or more module sockets. In the example shown in FIG. 3, the glazing unit module 308 includes a plurality of component modules each having one or more panes of glass, insulated glazing units (IGUs) or the like.

As further shown in FIG. 3, the fenestration wall assembly 300 optionally includes frame cladding 314. The frame cladding 314 provides an interface, flashing, decorative fascia or the like between one or more of the fenestration wall assemblies 300. For instance, in a multilevel building, fenestration wall assemblies 300 are, in one example, provided on multiple levels of the building. The frame cladding 314 provides an interface between the fenestration wall assemblies 300. In some examples (FIG. 8), where a socket core 306 provides both ceiling and floor base module sockets, for instance, for the next floor up, the frame cladding 314 provides a clean interface across the fenestration wall assembly 300 servicing both the upper and lower floors. Additionally, in another example, the frame cladding 314 provides one or more segmented, interfitting or lapped cladding components configured to act as flashing to divert moisture from the components of the fenestration wall assembly 300 including one or more of glazing frames, module bodies or the like of the various service modules installed along the socket core 306. As described herein, the frame cladding is in one example provided with profiles corresponding to the shape, finish or the like of the remainder of the fenestration wall assembly 300. For example, the frame cladding 314 is provided with a shape and size configured to readily fit over the fenestration frame 302 and optionally includes a finish (paint, material or the like) matching that of the remainder of the assembly. Accordingly, time consuming bending and fitting of flashing sheets and matching of a factory finish are minimized at the installation site.

As further shown in FIG. 3, in one example, the fenestration wall assembly 300 includes a plurality of glazing unit modules 308 provided in one or more of the module sockets of the socket core 306. In the example provided in FIG. 3, a plurality of glazing unit modules 308 are provided in a single module socket. For instance, the glazing unit modules 308 are stacked and accordingly provide multiple panels 304 (e.g., panes of glass, IGUs or the like) extending across the fenestration wall assembly 300. In one example, the glazing unit modules 308 include one or more of static glazing unit modules as well as moveable glazing unit modules 308 (e.g., sliding doors or the like). For instance, in FIG. 3 the inner glazing unit module 308 is optionally a sliding door configured to slide within one or more channels, rails, along grooves or the like, to facilitate the opening of the door (inner module 308) to allow air movement between the interior and exterior of the building or access to a porch or balcony.

As further shown in FIG. 3, the panel 304 includes a panel profile corresponding to the daylight opening for the panel 304. As shown in FIG. 3 (and further described herein) the panel profile is isolated from each of the service modules including, for instance, the conduit module 310, the remainder of the glazing unit modules 308 (e.g., panel frames) or the like. Accordingly, the daylight opening is maintained in an unobstructed fashion even with the inclusion of a plurality of service modules with the socket core 306 of the fenestration frame 302. In still another example, one or more modules of the service modules (such as the screen module 312 shown in FIG. 3) includes an enlarged profile relative to the remainder of the module sockets of the socket core 306. For instance, in one example, the screen module 312 includes a rolled screen, blind, mechanism or the like housed in a profile larger than the module socket of the socket core 306. In this example, the screen module 312 accordingly extends into a portion of the panel profile of the panel 304. In other examples, the screen module 312 is fully recessed into the module socket of the socket core 306, for instance, according to the profile of the module body of the screen module 312. In such an example, the profile of the screen module 312 is thereby minimized and positions the screen module 312 out of alignment, misaligned or the like and thereby isolates the panel 304 from the module 312.

Figure 4:
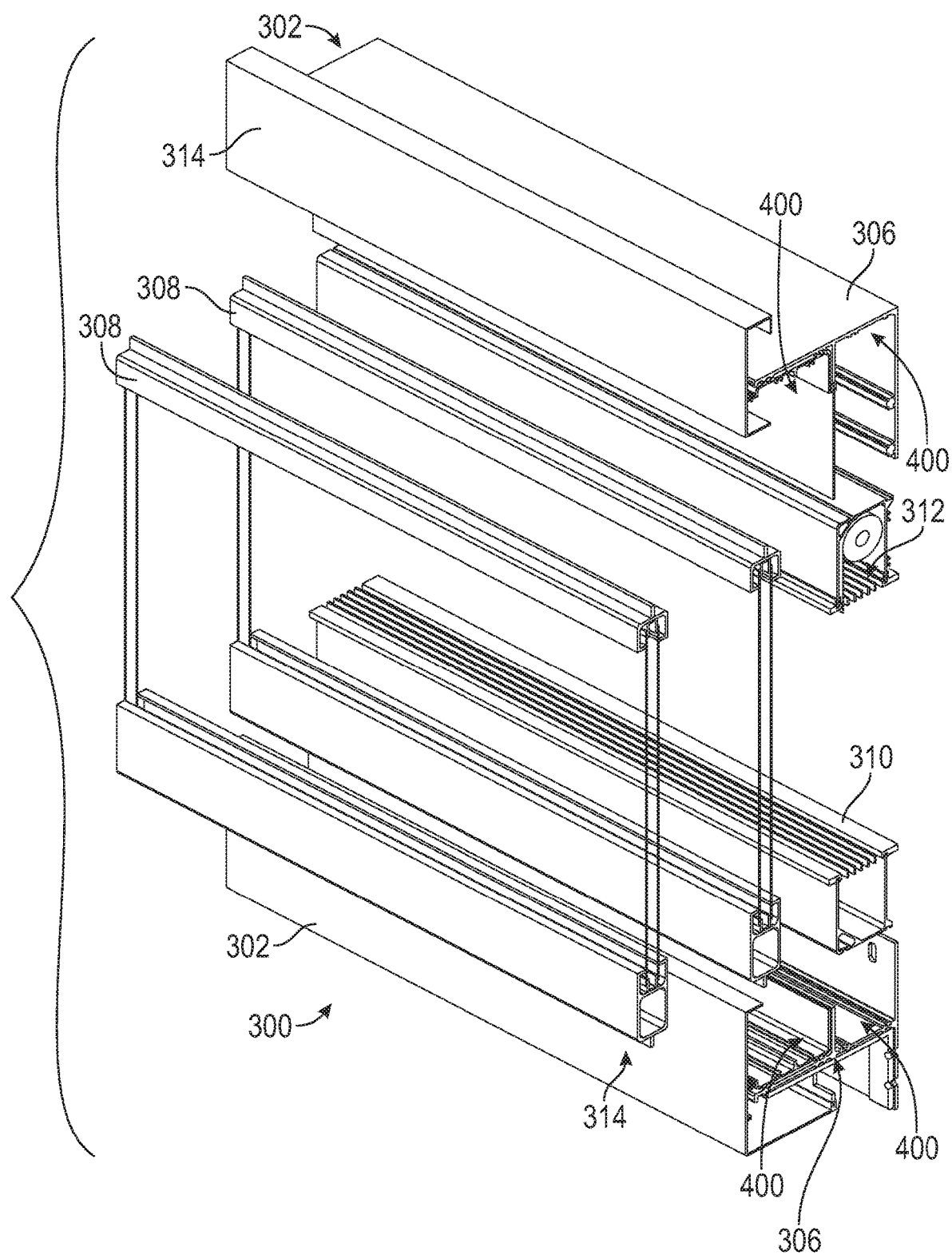
FIG. 4 is an exploded view of the fenestration wall assembly of FIG. 3.

FIG. 4 shows an exploded view of the fenestration wall assembly 300 previously shown and described in FIG. 3. In FIG. 4, the fenestration wall assembly 300 again includes the fenestration frame 302 having a socket core 306 with a plurality of module sockets 400. In the example shown in FIG. 4, each of the fenestration frame segments includes a socket core 306 having two module sockets 400. In other examples, socket cores include one or more module sockets 400. Referring again to FIG. 4, one of the module sockets 400 is provided proximate the exterior of the fenestration wall assembly 300, for instance, on the side of the unit including the glazing unit modules 308. A second module socket 400 is provided on the interior portion of the fenestration wall assembly 300, for instance, corresponding to the side of the unit having the screen module 312.

As further shown in FIG. 4, the fenestration wall assembly 300 includes module sockets 400 provided along upper and lower portions of the fenestration wall assembly, for instance, corresponding to the upper and lower fenestration frames 302 provided in FIG. 4. As shown in FIG. 4, each of the socket cores 306 of the upper and lower portions of the fenestration frame 302 include corresponding module sockets 400. The module sockets 400 of each of the lower and upper portions of the fenestration frame 302 are configured to receive complementary components such as the service modules previously described herein. For instance, in the example shown in FIG. 4, the screen module 312 is sized and shaped for reception in an upper module socket 400 of the upper socket core 306 of the upper portion of the fenestration frame 302. Conversely, the module socket 400 provided on the interior and lower portion of the fenestration frame 302 is configured for reception of another service module, in this example, the conduit module 310 including one or more conduits, for instance, for environmental services such as HVAC, condition fluids, fluids (e.g., such as compressed air, radiator steam, water, natural gas or the like), wiring, cabling or the like.

As further shown in FIG. 4, the module sockets 400 associated with the upper and lower exterior portions of the fenestration frame 302 include glazing unit modules 308 seated therein and spanning the fenestration wall assembly 300. In the example shown in FIG. 4 (as well as FIG. 3), a plurality of glazing unit modules 308, two in this example, are provided in the module sockets 400 (of the upper and lower socket cores 306).

Figure 9:
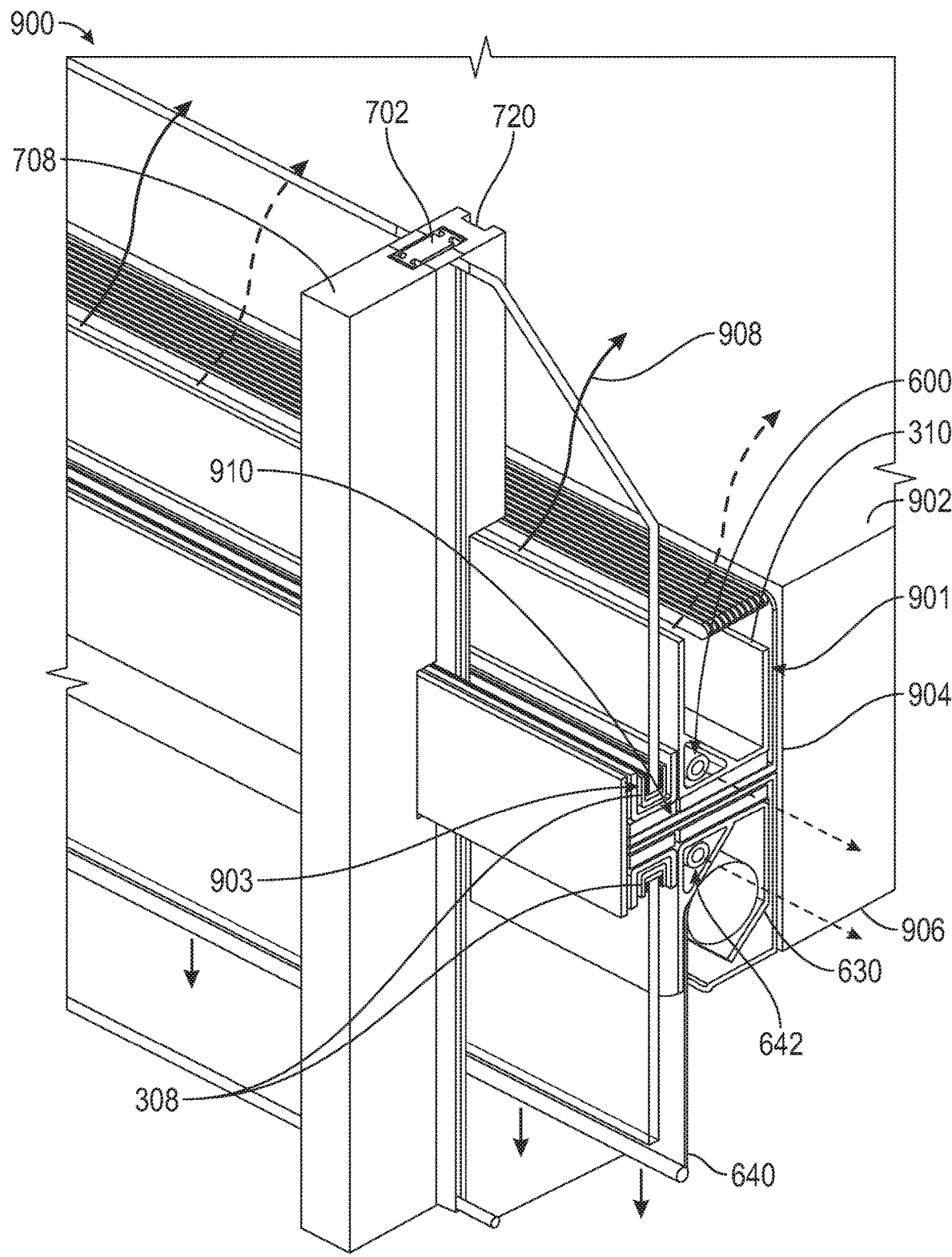
FIG. 9 is a cross-sectional view of an additional example of a fenestration wall assembly.

Each of the module sockets 400, in this example, have a corresponding profile to facilitate the interchangeable reception of service modules having a corresponding complementary profile. Accordingly, each of the screen module 312, conduit module 310, as well as the glazing unit modules 308, shown in FIG. 4, are, in various examples, configured for installation in each of the module sockets 400. For instance, the glazing unit modules 308 are, in one example, configured for reception in the interior module sockets 400 of the assembly 300. Conversely, if desired, the screen module 312, conduit module 310 or other service modules are similarly installed in the module sockets 400 provided on the exterior portion of the fenestration wall assembly 300. Optionally, in other examples, the module sockets of the fenestration wall assemblies described herein include module sockets having different profiles. For instance, as shown in FIG. 9, the exterior module sockets are approximately half the size of the interior module sockets.

Figure 5:
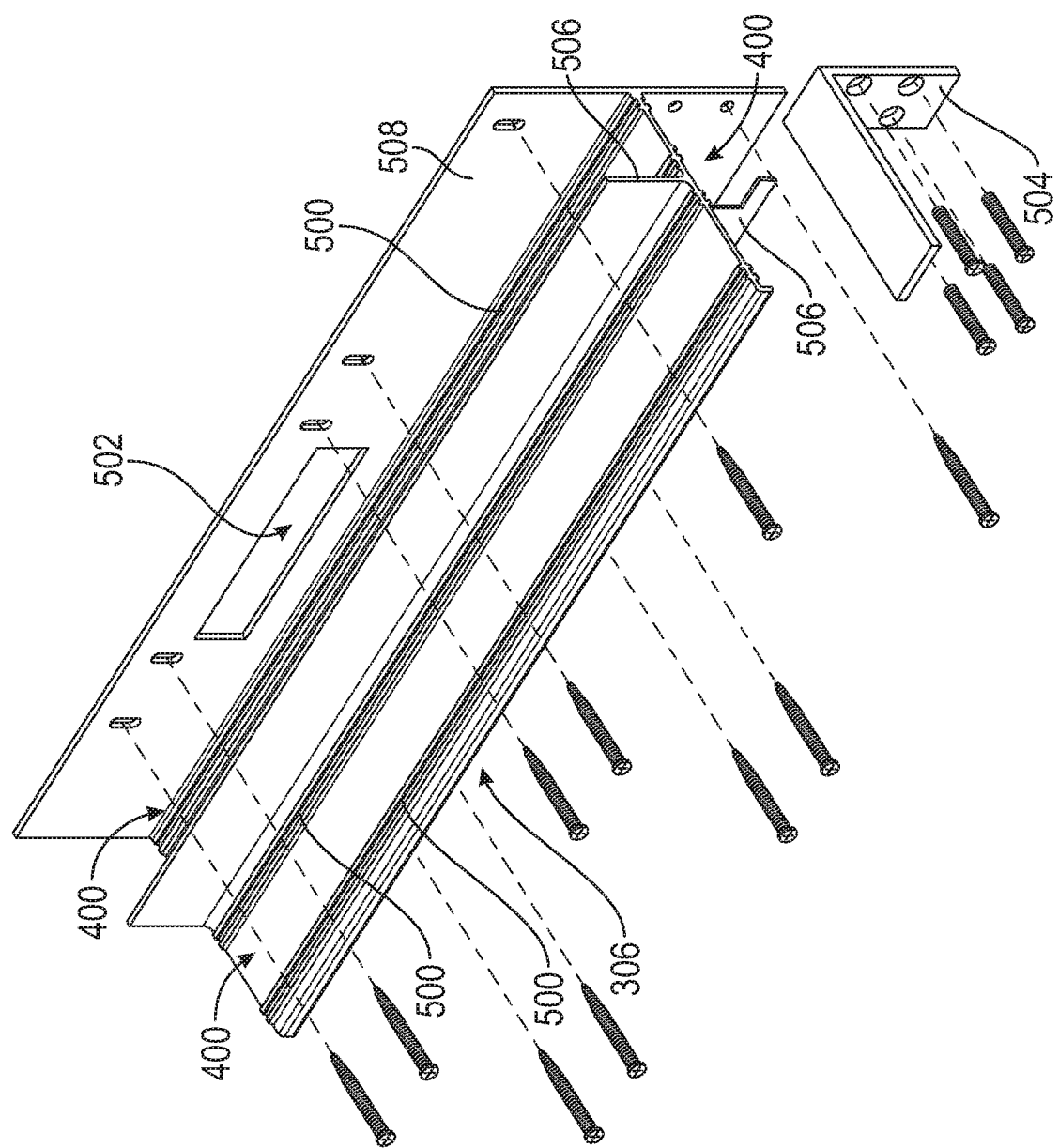
FIG. 5 is an exploded view of one example of an assembly framework including one or more module interfaces.

FIG. 5 shows one example of the socket core 306 previously shown and described in FIG. 4. The socket core 306 is shown in an exploded view relative to one or more other components including, for instance, an installation bracket 504 configured to support and facilitate installation of the socket core 306 along the side of a building, within an opening of the building or the like.

As shown in FIG. 5, the socket core 306 forms a component of the fenestration frame such as the fenestration frame 302 shown, for instance, in FIG. 4. In one example, the socket core 306 is the fenestration frame, for instance, the fenestration frame is formed by the socket core 306. In still other examples, the fenestration frame 302 includes the socket core 306 and includes one or more additional frame components including, for instance, the frame cladding 314, installation bracket 504 shown in FIG. 5, additional structural members of the frame 302, or the like.

Referring again to FIG. 5, the socket core 306 is shown with a plurality of module sockets 400 provided at various locations along the socket core 306. In this example, the socket core 306 includes four module sockets 400. Two of the module sockets 400 are provided along an upper portion of the socket core 306 and two additional module sockets 400 are provided along a lower portion of the socket core 306. In the example shown in FIG. 5, the module sockets 400 are optionally divided or separated by a socket flange 506. The socket flange 506 is, in one example, a septum, wall, divider, spacing feature or the like configured to separate and isolate the module sockets 400. In one example, the socket flange 506 provides one or more features (e.g., fittings, sockets, plugs or the like) to facilitate the coupling or reception of one or more of the service modules in the corresponding module sockets 400. In another example, the socket flange 506 provides an interposing feature, such as a wall or the like, configured to prevent the ingress of one or more of exterior weather, moisture, particulate or the like to the interior portion of the fenestration wall assembly 300. For instance, the socket flange 506 provides a physical barrier between modules installed in the exterior module sockets 400 relative to those modules installed in the interior module sockets 400. In other examples, the socket flange 506 is removed and instead one or more coupling ports 500 associated with each of the module sockets 400 provide a complementary fitting, profile or the like for reception of the service modules on the socket core 306.

As previously described, the module sockets 400, in various examples, include one or more coupling ports 500 configured to facilitate complementary coupling (including interfitting, fixing, slideable positioning or the like) of one or more of the service modules described herein. As shown in FIG. 5, each of the module sockets 400, in this example, include one or more coupling ports 500. The module sockets 400 shown in FIG. 5 include two coupling ports 500 extending along the socket core 306. The coupling ports 500 include, but are not limited to, one or more of surfaces of the sockets and modules coupled with each other (e.g., in surface to surface contact), rails and runners (or rollers), mortise and tenon features, slots and pins, orifices and posts, ports and fittings, grooves and ridges or the like. The coupling ports 500 cooperate with corresponding coupling fittings, for instance, provided with the service modules to interfit, couple and receive the service modules in the sockets 400 to assemble the fenestration wall assembly 300. Optionally, the coupling ports 500 and associated coupling fittings guide installation of the service modules and ensure the modules are aligned with other installed modules and the fenestration frame 302 (see FIG. 3) in a level, plumb, true or the like configuration.

In other examples, the coupling ports 500, in cooperation with corresponding coupling fittings, allow for movement of one or more of the service modules, for instance, along an elongate socket core 306 to a specified position. For instance, the socket core 306 extends along the length of a building such as the length of a building floor. The coupling ports 500 cooperate with one or more coupling fittings of the service modules to facilitate the positioning of the service modules along the socket core 306. The service modules are installed at a first location, and moved (e.g., by hand or the like) along the socket core 306 to a specified location including a specified window or door location. Additionally, positioning along the socket core 306 facilitates fine tuning of the position of the service modules relative to the socket core 306 and the building.

As further shown in FIG. 5, the socket core 306 optionally includes one or more access ports 502. As previously described and shown, for instance, in FIG. 2, the access port 502 is provided to couple one or more building services to corresponding service modules of the fenestration wall assembly 300 provided along the socket core 306. The access port 502 facilitates the interfitting of the service modules with these building services and delivery of the services (conditioned air, hot or cold water, power, data, telephone service or the like) through the fenestration wall assembly 300. In still other examples, the access ports 502, provided on the socket core 306, facilitate the interaction with one or more features installed through the access port 502. For instance, a gang box having switches, controls or the like is installed through the access port 502 to accordingly provide operative controls for one or more features, services or the like provided by the fenestration wall assembly 300 or other component of the building. For instance, compressed air fittings, vacuum fittings, light switches, power sockets or the like are, in one example, provided through the access port 502 for use with one or more of lights, environmental controls, power needs, data needs or the like.

As further shown in FIG. 5, in one example, the socket core 306 includes an installation bracket 504. The installation bracket 504 shown in FIG. 5 facilitates the coupling of the socket core 306 along an exterior of a building, for instance, at the concrete, steel or the like provided between floors. In other examples, differing installation brackets 504 are provided to facilitate the installation of the socket core 306 along wooden framing, within openings of the building (as opposed to the exterior fascia of the building) or the like. The installation bracket 504 supports the socket core 306 and accordingly supports the one or more service modules coupled with the socket core 306 at the various module sockets 400. In another example, the socket core 306 includes an installation flange 508 or other feature configured to facilitate the installation of the socket core 306 to the building. As shown in FIG. 5, the installation flange 508, in this example, extends from an interior portion of the socket core 306 in a vertical manner. The installation flange 508 provides one or more orifices, features or the like, such as nailing flanges to facilitate the coupling of the installation flange 508 and support the socket core 306 and service modules installed therein.

FIG. 6A shows one example of the conduit module 310 in an exploded view. The conduit module 310 includes a module body 606 surrounding one or more conduits. As shown in FIG. 6A, the example conduit module 310 includes both environmental and cable conduits 602, 600. The environmental conduit 602 is, in one example, configured to provide a passage for fluid such as conditioned air, gases, liquids or the like delivered through the wall assembly 300 and adjacent environmental conduits, for instance, provided in adjacent fenestration wall assemblies. The environmental conduits 602 of a plurality of fenestration wall assemblies are, in one example, provided in a coupled end-to-end fashion to facilitate the passage of environmental fluids, utility fluids such as compressed air, or the like to one or more locations, for instance, within a building. In a similar manner, the cable conduit 600 extends through the module body 606, in this example, in a separated passage from the environmental conduit 602 to provide a passage for one or more other services including, but not limited to, electricity, data, telephone service, liquid based services including, but not limited to, one or more of compressed air, gases, natural gas, hot or cold water or the like.

The conduit module 310 includes one or more coupling fittings 604 configured for interfitting with corresponding coupling ports, such as the coupling ports 500 shown with the socket core 306 shown in FIG. 5. In the example shown in FIG. 6A, the coupling fittings 604 extend from the module body 606 and have a complementary profile to the coupling ports 500. As described herein, the coupling fittings 604 and coupling ports 500 are, in one example, interchangeable. For instance, the coupling ports are, in one example, provided on the service module such as the conduit module 310 and the coupling fittings 604 are provided on the socket core 306. In still other examples, each of the coupling fittings 604 and coupling ports 500 are, in various examples, provided on each of the modules, for instance, the conduit module 310 as well as the socket core 306. For instance, the coupling fittings 604 and ports 500 are provided in a complementary pattern on each of the module and the socket core 306 to ensure interfitting between the ports and fittings on each of the modules and the socket core 306. In a similar manner to the coupling ports 500, the coupling fittings include, but are not limited to, one or more of surfaces of the sockets and modules coupled with each other (e.g., in surface to surface contact), rails and runners (or rollers), mortise and tenon features, slots and pins, orifices and posts, ports and fittings, grooves and ridges or the like.

Referring again to FIG. 6A, the conduit module 310, as previously described, includes an environmental conduit 602 configured to provide one or more services in the building, for instance, along the one or more fenestration wall assemblies having interconnected environmental conduits 602. In one example, the module body 606 includes a conduit access port 608 configured to provide access to one or more utilities, services or the like. An environmental duct 610 is shown in FIG. 6A and configured for coupling with the environmental conduit 602 at the access port 608.

Optionally, an environmental register 612, decorative fascia, trim piece or the like is provided over top of the environmental conduit 602. In one example, the register 612 includes one or more fittings configured for interfitting with the module body 606. Where the environmental conduit 602 provides conditioned air or is a return for conditioned air the register 612 facilitates the passage of air into a room or to the environmental conduit 602 from the room. In other examples, the environmental conduit 602 is configured to receive one or more separated passages, tubes, piping or the like each providing a different service. Optionally, the environmental register 612 includes one or more ports along the module body 606 to access the services provided with these passages, tubes, piping or the like.

As further shown in FIG. 6A the conduit module 310 includes a second conduit, such as the cable conduit 600. An optional fitting access port 620 is provided through the cable conduit 600 to provide access to one or more services including power, data, telephone or the like. For instance, a utility fitting 614 is coupled with the conduit module 310, for instance, through a fitting recess 616 in the environmental register 612. The utility fitting 614 is coupled with the corresponding cabling, sockets, plugs or the like of the cable conduit 600 at an optional fitting access port 620. In another example, a fitting cover 618 is provided for the utility fitting 614 to conceal the utility fitting 614 when not in use.

Referring now to FIG. 6B, another example of a service module, a screen module 630, is shown. As with the conduit module 310 shown in FIG. 6A, the screen module 630 includes a module body 632. The module body 632 has a corresponding profile to the module body 606 for interchangeable installation in the module sockets 400 of the socket core 306. The module body 632 includes one or more coupling fittings 604 (including fittings and conversely ports or the like) configured for interfitting and coupling of the screen module 630 within a corresponding module socket 400 of the socket core 306. As shown in FIG. 6B, a plurality of coupling fittings 604 are provided along the module body 632 to facilitate installation of the screen module 630 in the module sockets 400 of the socket core 306.

As further shown, the screen module 630 includes a screen recess 636 configured for reception of a screen spool 634 therein. In one example, the screen spool 634 includes blinds, shades, screens or the like in a spool configuration and accordingly stored when not in use in the screen recess 636. In another example, the screen spool 634 includes one or more of stacked louvers, slats, screens or the like provided in an accordion, serpentine or stacked fashion within the screen recess 636 and deployed from the recess 636 when needed. As shown in FIG. 6B, the screen 640 (deployed in this example from the screen spool 634) extends through a recess cover 638 a slot, port or the like, configured to pass the screen.

Optionally, the screen module 630 includes one or more mechanisms such as automatic operating mechanisms, electrically operated mechanisms or the like configured to deploy and store the screen 640 between deployed and stored configurations. In an example, a portion of the screen 640, for instance, a pull bar, pull handle or the like, extends from the recess cover 638 and provides a minimized overall profile for the screen 640 to facilitate access to and operation of the screen 640 while at the same time minimizing obstruction of the panel 304 including a panel profile, such as a daylight opening.

In another example, the screen module 630, like the conduit module 310 previously described herein, includes an optional cable conduit 642. The cable conduit 642, in a similar manner to the cable conduit 600 of the conduit module 310, facilitates the delivery of one or more services, such as power, data, telephone service or the like through the screen module 630. Optionally, the cable conduit 642 is, in some examples, used to deliver one or more services including, but not limited to, compressed air, gases, natural gas, liquids or the like. In another example, the cable conduit 640 provides a recess, space or the like for wiring used with an automated mechanism to deploy and retract the screen 640.

Figure 6C:
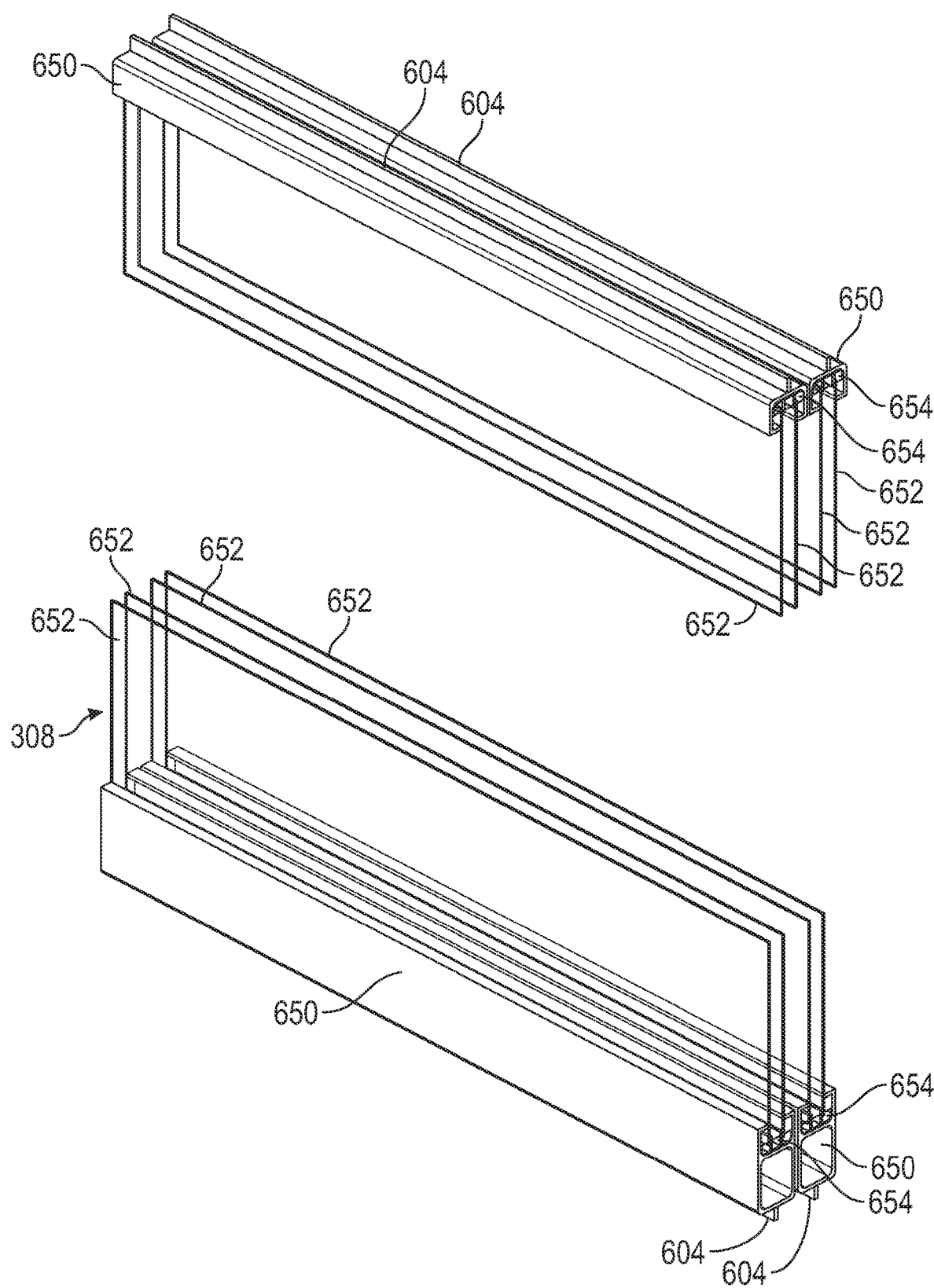
FIG. 6C is a perspective view of an additional example of a subassembly module.
Figure 6D:
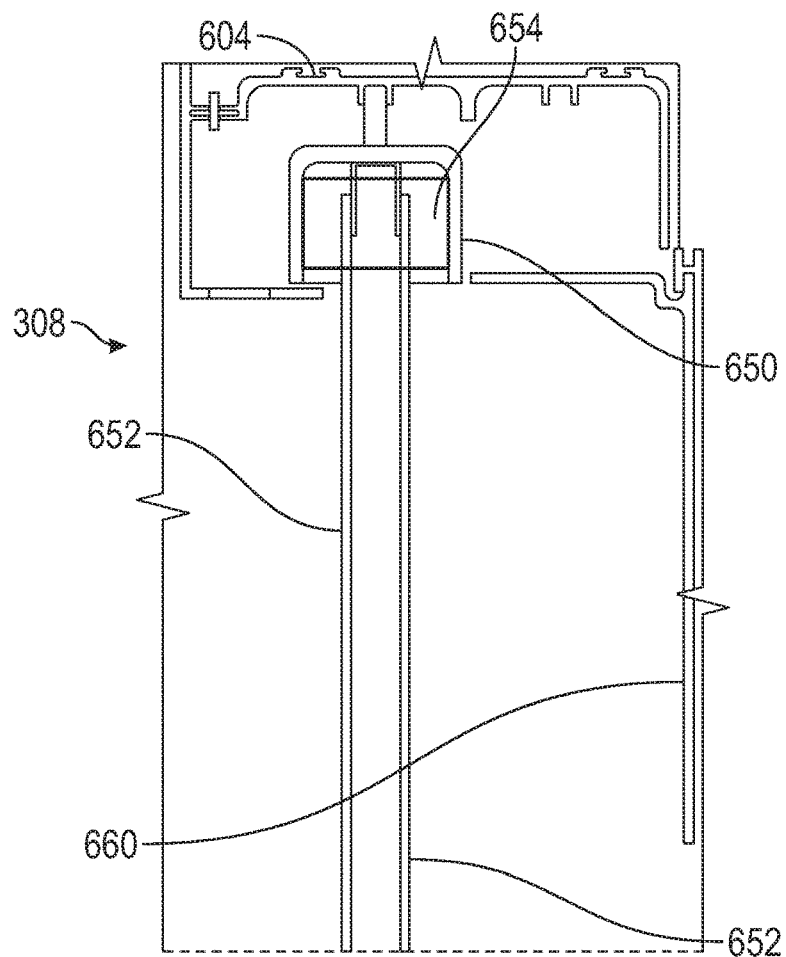
FIG. 6D is a perspective view of still another example of a subassembly module.
Figure 6D:
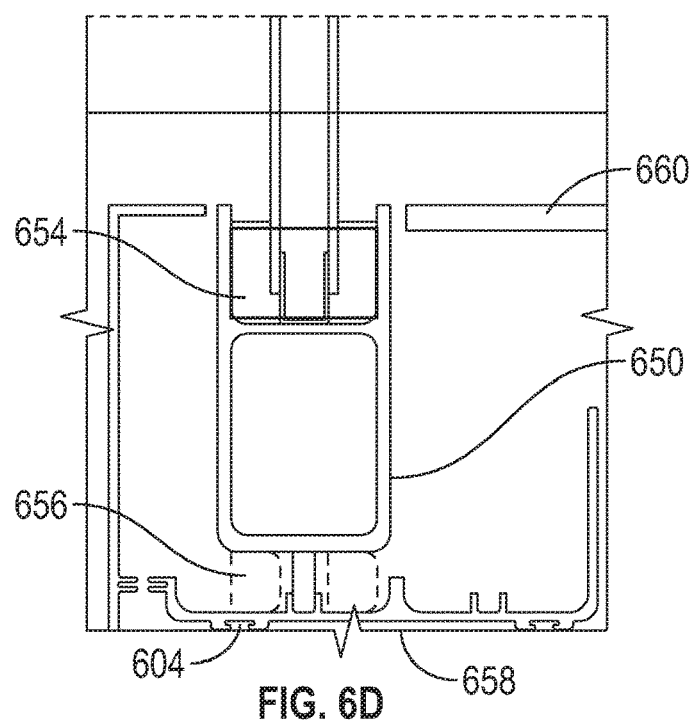

FIGS. 6C and 6D show an example of a glazing unit module 308 previous shown in FIG. 3. In FIG. 6C, the glazing unit module 308 includes a plurality of glazing unit frames 650 (e.g., module bodies). For instance, in this example, two glazing unit frames 650 are in a stacked configuration for the glazing unit module 308. As further shown in FIG. 6C, each of the glazing unit frames 650 includes one or more glazing unit panes 652. For instance, the outer or exterior glazing unit frame 650 includes first glazing unit panes 652 arranged in the manner of an insulated glazing unit (IGU). The insulated glazing unit extends between corresponding glazing unit frames 650, for instance, provided at the upper and lower portions of the glazing unit module 308. In a similar manner, the interior facing glazing unit frame 650 includes its own glazing unit panes 652, for instance, two glazing unit panes 652 extending between upper and lower portions of the glazing unit frame 650. In one example, each of the glazing unit panes 652 is robustly coupled with the respective glazing unit frame 650 with a spacing seal 654 (see FIG. 6D). In one example, the spacing seal 654 includes one or more of foam, sealant or the like that encloses and seals the space between the glazing unit pane 652 and accordingly allows for the introduction of one or more gases, vacuum or the like to accordingly improve the thermal insulating qualities of the glazing unit module 308.

As further shown in FIG. 6C, the glazing unit frames 650, in another example, include one or more coupling fittings 604 configured to couple each of the glazing unit frames 650 with corresponding coupling ports provided in the various module sockets 400 of the fenestration wall assembly 300 shown, for instance, in FIG. 3 and FIG. 4.

The glazing unit frames 650 and the associated glazing unit panes 652 of FIG. 6C are provided in a stacked configuration. In one example, one or more of the glazing unit frames 650 and the associated glazing unit pane 652 are moveable within the socket core 306, for instance, as a movable glass door, movable door, movable wall panel, opening window or the like. For instance, one or more of bogie wheels, trucks, rollers or the like are provided along one or more of the glazing unit frames 650 to facilitate the movement of the glazing unit frame 650 relative to the socket core 306. In another example, each of the glazing unit frames 650 include one or more moving features such as bogie wheels, trucks, rollers or the like configured to facilitate the movement of each of the glazing unit frames 650 and the glazing unit pane 652. Optionally, the glazing unit modules 308 configured for movement are moved in a staggered fashion, for instance, to deploy the glazing unit modules 308 across a large opening in the building corresponding to a porch, daylight opening, balcony access or the like. In this example, the glazing unit modules 308 are stacked when open in the configuration shown in FIG. 6C. If closing of the opening is desired, the glazing unit modules 308 are slid apart to provide glazing unit panes 652 and frames 650 across the opening.

FIG. 6D provides a cross-sectional view of one example of the glazing unit module 308 shown in FIG. 6C. In this example, the second glazing unit frame and its associated glazing unit pane 652 are moveable within the module socket 400, for instance with one or more of rollers, bogie wheels, runners or trucks (collectively, rollers 656) provided along one or more portions of the glazing unit frame 650. In the example shown in FIG. 6D, one of the glazing unit frames 650 is not shown and, instead, is replaced with decorative trim, fascia or the like provided across a portion of the module socket. In one example, the trim 660, coupled with the glazing unit module 308, prevents the operation, for instance, of a glazing unit module 308 into the position otherwise shown by the opposed glazing unit module 308 of FIG. 6D. For instance, the stacked configuration of the glazing unit modules 308 shown in FIG. 6C is prevented by the trim 660. Instead, the glazing unit frame 650 shown in the leftmost portion of the module socket 400 is moved out of position shown in FIG. 6D to a stacked configuration (shown in FIG. 6C) with the opposed glazing unit module 308. When closing of the glazing unit module 308 is desired, for instance, to accordingly close an opening to a porch, balcony or the like, the glazing unit module 308 shown in FIG. 6D moved (rolled, slid or the like) into the position shown in FIG. 6D and accordingly moved out of alignment with the interior glazing unit module 308.

Referring again to FIG. 6D, the glazing unit module 308, in this example, includes an optional panel interface 658 provided along one or more of the glazing unit frames 650. The panel interfaces 658 are provided along each of the glazing unit frames 650. In one example, the panel interface 658 provides one or more of a tray, tracks, guides or the like that cooperates with the rollers 656 to guide movement of the glazing unit frames 650 and associated panes 652 into the open or closed positions. Optionally, the panel interface 658 provides one or more of the coupling fittings 604. In this example, the panel interface 658 includes its own coupling fitting 604 configured for interfitting with one or more of the coupling ports provided with the module sockets 400 of the socket core 306. Accordingly, the panel interface 658 provides an intermediate component to the glazing unit module 308 to facilitate coupling of the glazing unit module 308, for instance having a plurality of glazing unit frames 650 and associated glazing unit panes 652, into the fenestration wall assembly 300. In another example, the panel interface 658 facilitates the positioning, alignment and fixing of the glazing unit frames 650 within the glazing unit module 308 prior to installation within the socket core 306. For instance, the glazing unit module 308, in one example, is assembled at an offsite location (e.g., at the factory or on the job site) and includes the panel interface 658 as well as a plurality of glazing unit frames 650 having associated panes 652. The glazing unit frames 650 are installed into the panel interface 658 to align and position the glazing unit frames 650 in a specified arrangement ready for installation in the socket core 306 of the fenestration wall assembly 300.

Figure 6E:
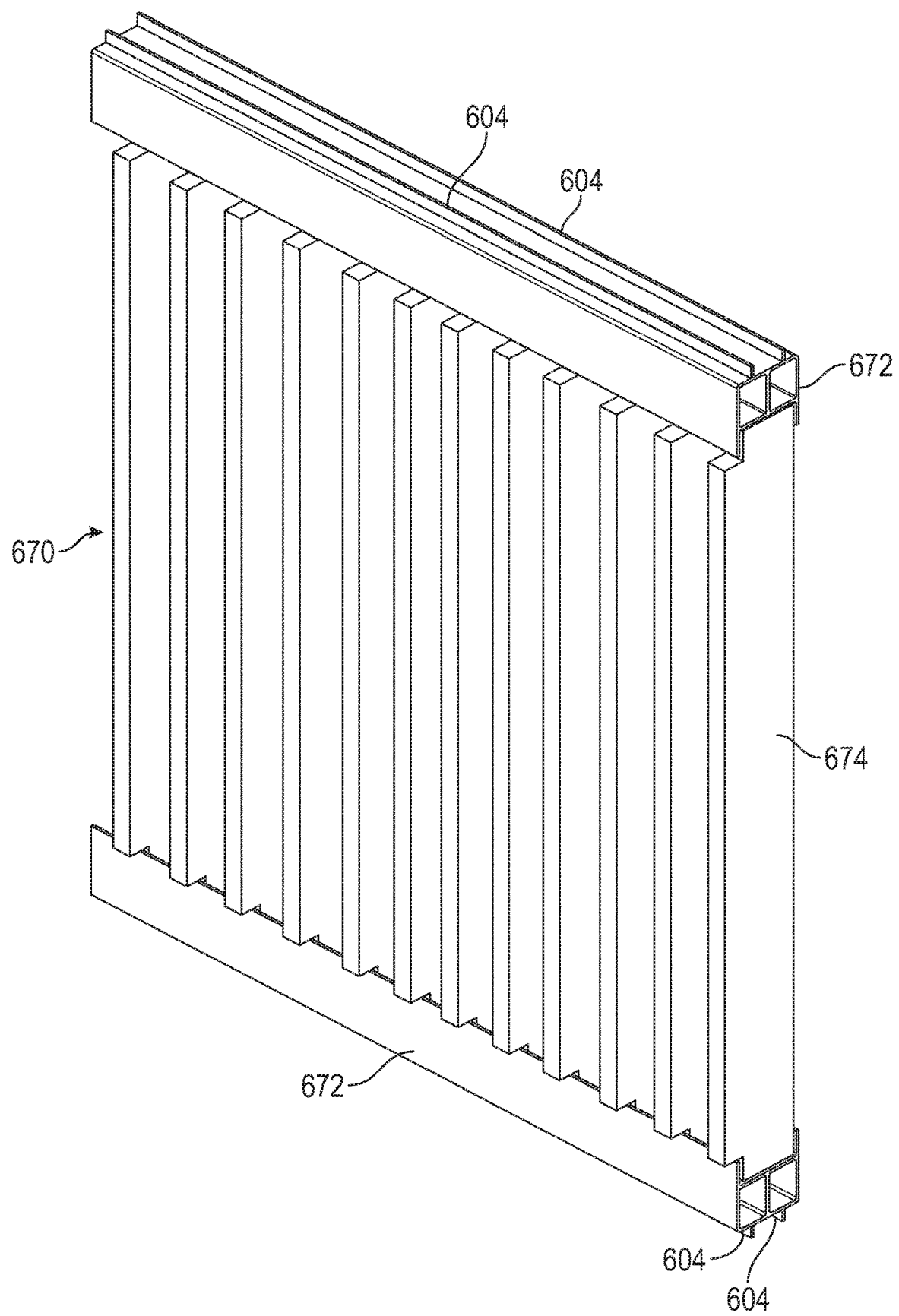
FIG. 6E is a perspective view of a supplemental example of a subassembly module.

FIG. 6E is another example of a service module. In this example, the service module is a wall module 670 configured for installation in the module sockets 400 of the socket core 306. The wall module 670 includes one or more features similar to the previously described service modules. For example, the wall module 670 includes a wall frame 672 (e.g., a module body) similar, in at least some regards, to the module body 606 (FIG. 6A), the module body 632 (FIG. 6B) as well as the glazing unit frame 650 (another example of a module body) shown in FIGS. 6C and 6D. In this example, the wall frame 672 includes one or more coupling fittings 604 configured for coupling with corresponding coupling ports such as the coupling ports 500 of the socket core 306 shown in FIG. 5. As previously described, the coupling fittings 604 are, in one example, projections, fittings, ports or the like. In one example, the coupling fittings 604 and coupling ports are provided at corresponding locations on each of the wall frames 672 and the module sockets 400 to facilitate the alignment and coupling of the wall module 670 in a specified orientation and position in the socket core 306. Accordingly, the wall module 670 is readily installed within the fenestration wall assembly 300 in a guided and aligned fashion to accordingly position the wall panel 674 in a specified installed orientation.

As further shown in FIG. 6E, the wall module 670 includes a wall panel 674. In various examples, the wall panel 674 includes one or more of solid and opaque wall panels, translucent wall panels (including transparent and partially transparent or translucent) wall panels, as well as decorative panels. For instance, the wall panel 674 has one or more profiles including, but not limited to, contours, translucency, reveals, finishes, colors or the like to provide a specified appearance, including an aesthetic appearance, to the wall module 670. In one example, the building includes a plurality of fenestration wall assemblies 300 previously described herein (on one or more floors, along one or more floors or the lie). Where a desired look or aesthetic is specified for the building, a corresponding wall panel 674 (or panels) is chosen and installed in the fenestration wall assemblies 300. Accordingly, the corresponding appearance of the wall panel 674 is readily duplicated throughout the building through installation to the fenestration wall assemblies thereby minimizing multiple installations of slats, trim, bricks, facia, contoured pieces, finishes, colors or the like otherwise needed to create the specified look or aesthetic of exterior and interior walls in previous buildings.

Figure 6F:
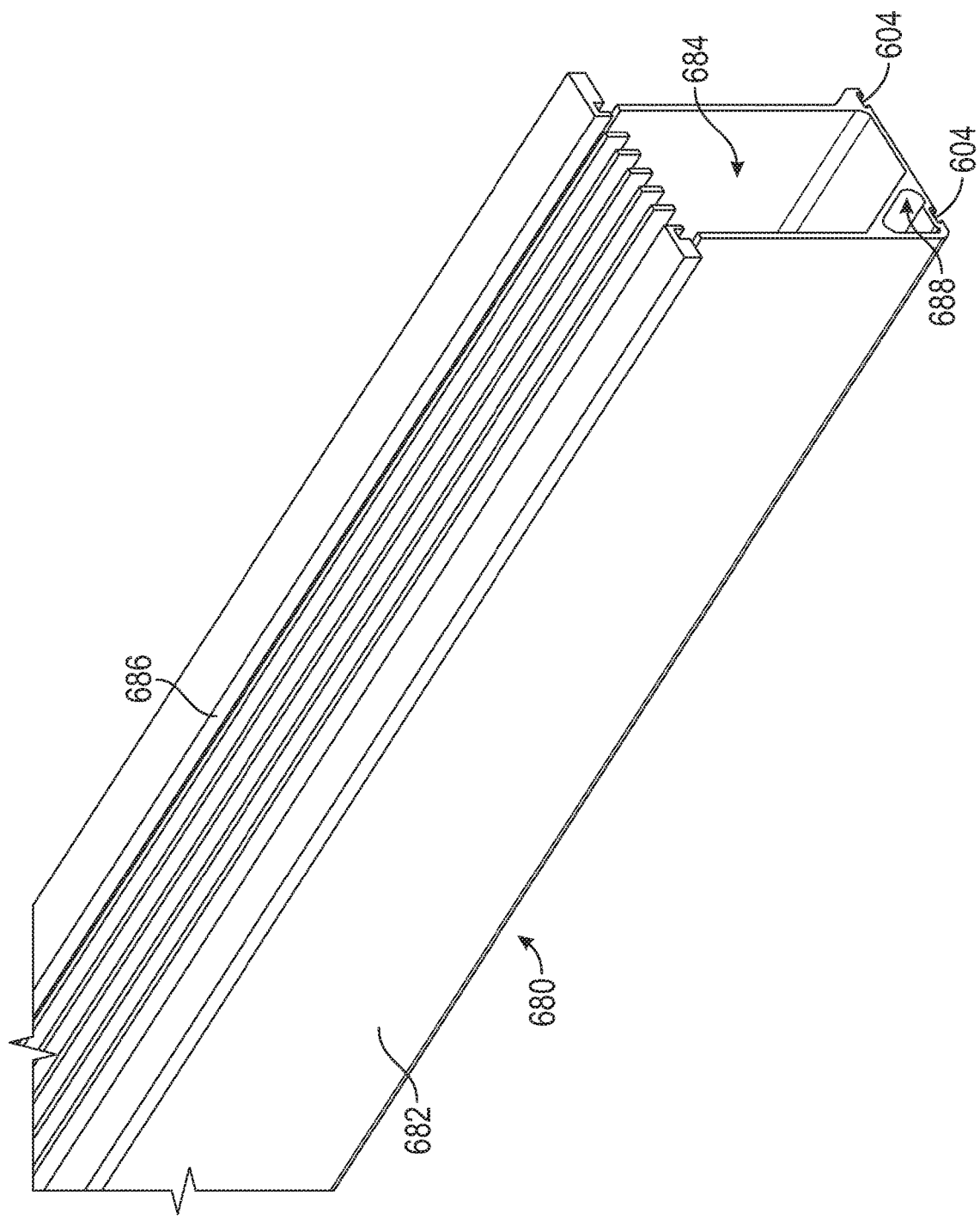
FIG. 6F is a perspective view of still another example of a subassembly module.

FIG. 6F shows another example of a service module. In this example, the service module is a diversion module 680. The diversion module 680 is similar, in some regards, to the conduit module 310 previously described herein. For instance, the diversion module 680 includes a diversion conduit 684 similar in some regards to the environmental conduit 602 of the conduit module 310 shown in FIG. 6A. The diversion conduit 684, in this example, operates as a drainage channel, gutter or the like and is configured to receive one or more fluids, for instance, moisture, melt water or the like through a diversion grate 686 and divert the moisture to a drain, sump or the like. In one example, the diversion conduit 684 is tapered (e.g., at an angle relative to horizontal) and accordingly provides a slanted or declined surface to deliver fluids to a specified location, such as a drain.

In another example, the diversion module 680 includes a module body 682 similar, in at least some regards, to the previously described module bodies herein. For instance, the module body 682 includes one or more coupling fittings 604 (e.g., fittings or ports) configured to cooperatively couple the diversion module 680 with a corresponding module socket of the socket core 306. As previously described, the coupling fittings 604 cooperate with the corresponding coupling ports 500 to readily align and couple the modules within the module sockets 400. Accordingly, with the installation of any of the modules described herein, including the diversion module 680, to the socket core 306 a unitary fenestration wall assembly is provided that facilitates the installation of the fenestration components as well as one or more of the onboard service modules in a single or limited number of steps.

As further shown in FIG. 6F, the diversion module 680, in another example, includes a cable conduit 688. The cable conduit 688 is, in one example, used to deliver one or more of power, data, phone service or other services through the fenestration wall assembly. In another example, the cable conduit 688 is used to deliver one or more utility services including, but not limited to, compressed air, gases, natural gas, liquids or the like. In still another example, the cable conduit 688 optionally includes heat tracing, a hot water passage or the like configured to melt snow and ice and maintain the diversion conduit 684 in an open configuration to facilitate the diversion of moisture to a drain, sump or the like.

Figure 7A:
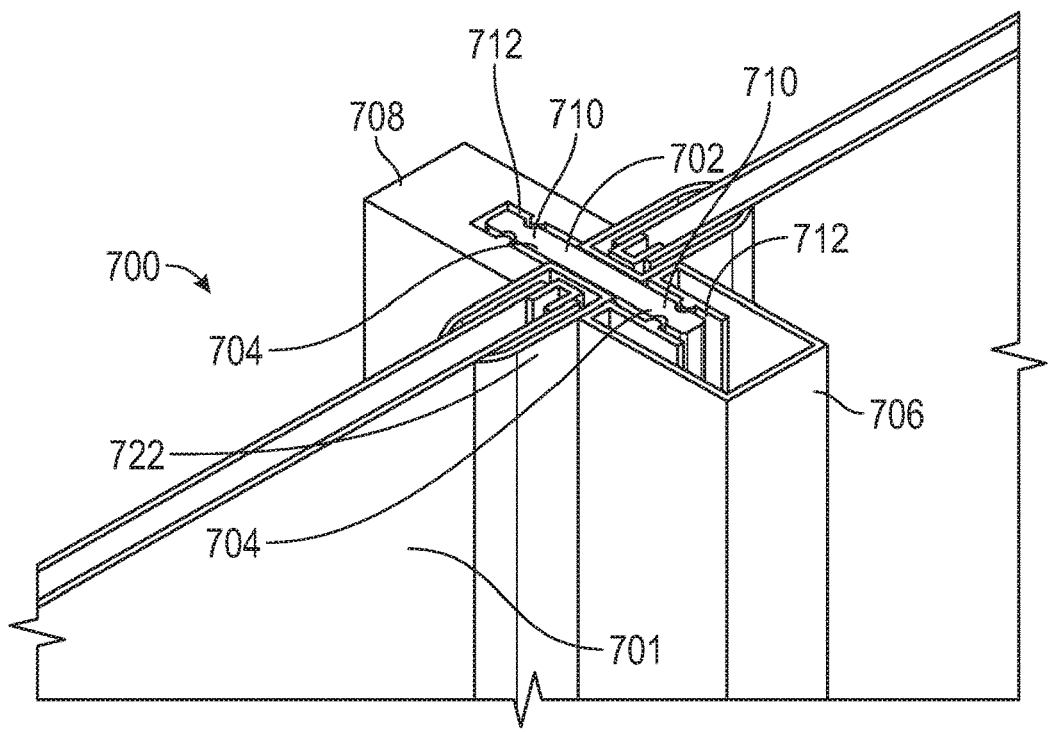
FIG. 7A is a perspective view of one example of a fascia module.

FIGS. 7A-F show various examples of trim modules useable with a fenestration wall assembly, such as the fenestration wall assembly 300 previously described and shown herein, or the fenestration wall assembly 700 shown, for instance, in FIG. 7A. The fenestration wall assembly 700 optionally includes one or more of the socket cores 306 previously described herein and shown in FIGS. 3, 4 and 5. The socket cores 306 optionally extend horizontally while the socket core 702 shown in FIG. 7A extends transverse to the socket core 306. For illustration purposes the socket core 702 is shown in detail in FIGS. 7A-F and the socket core 306 is shown elsewhere.

As shown in FIG. 7A, the socket core 702 includes a different profile relative to the socket core 306 in this example. For instance, the socket core 702 provides a transverse interface (relative to the core 306) between one or more panels such as the panels 701 including, but not limited to, glazing units, walls or the like. The socket core 702, in another example, includes panel flanges 722 configured to extend around one or more components of the panels 701. The panel flanges provide a barrier (e.g., gasket or other isolating feature) including, for instance, an interference fit between the panels 701 and the panel flanges 722 to prevent the ingress of moisture, humidity or the like and to thereby isolate the interior of a building from the exterior environment. Optionally, the panel flanges 722 secure the socket core 702 to the panels 701 through clamping engagement of the panels 701 between opposed flanges (e.g., on the exterior and interior sides).

Additionally the socket core 702, shown in FIG. 7A, includes one or more module sockets 704 provided along the interior and exterior sides of the socket core 702. In the example shown in FIG. 7A, the trim module 708 is coupled with the socket core 704 on a left (interior) side of the fenestration wall assembly 700 while the trim module 706 is coupled with the socket core 702 on the right (exterior) side of the assembly 700. Each of the module sockets 704 include one or more of coupling fittings or coupling ports. The terms coupling fittings and coupling ports are used interchangeably herein (e.g., ports may be fittings and fittings may be ports). In the example shown in FIG. 7A, the module socket 704 includes a coupling fitting 710 extending from the remainder of the socket core 702. Corresponding coupling ports 712 are provided on each of the trim modules 706, 708. The trim modules 706, 708 are coupled along the module socket 704 to form a specified profile for the fenestration wall assembly 700 at the seams between the panels 701. The profiles provided by the trim modules 706, 708 include one or more of shape, length, finish, material or color.

Referring again to FIG. 7A, the module sockets 704 shown therein are one example of an inverse configuration of the module sockets relative to the recess module sockets 400 shown, for instance, in FIG. 4. In this example, the module sockets 704 project away from the socket core 702 and accordingly provide a projection fitting or coupling fitting 710 configured for reception for corresponding coupling ports 712 on the trim modules 706, 708.

Figure 7B:
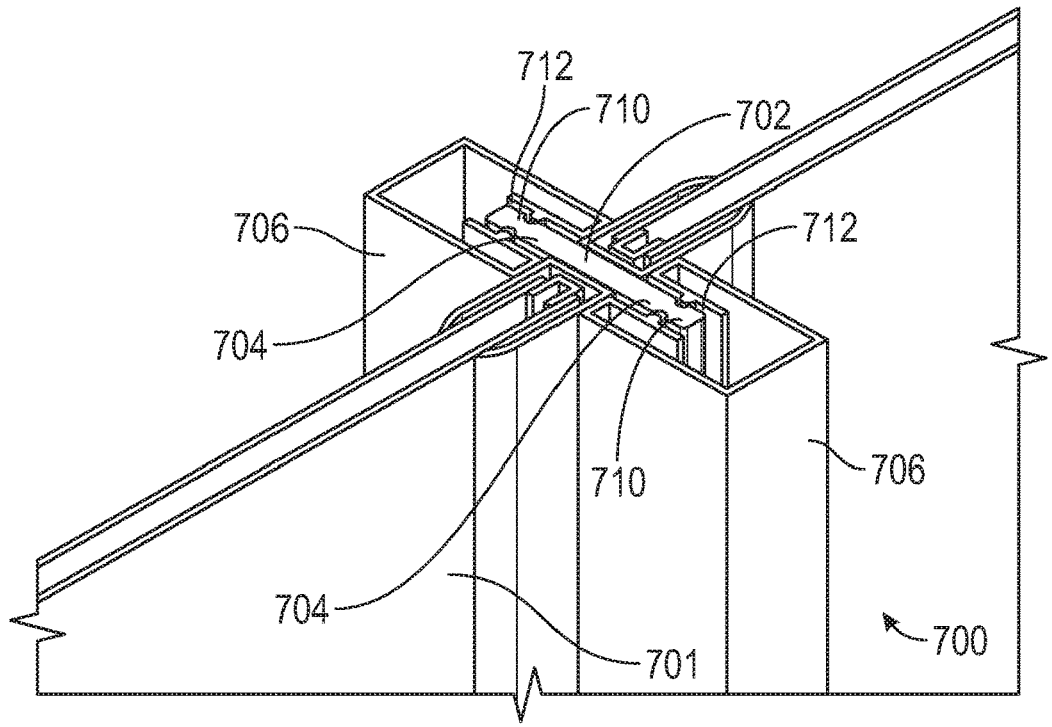
FIG. 7B is a perspective view of another example of a fascia module.

FIG. 7B shows another example of the fenestration wall assembly 700, including the socket core 702, providing an interface between the panels 701. In this example, the socket core 702 is coupled with trim modules 706. In contrast to the trim modules 708, 706, shown in FIG. 7A, FIG. 7B includes identical trim modules 706 provided at each of the module sockets 704. The trim modules 706, shown in FIG. 7B include the coupling ports 712 configured for coupling with the coupling fittings 710 of the socket core 702.

Figure 7C:
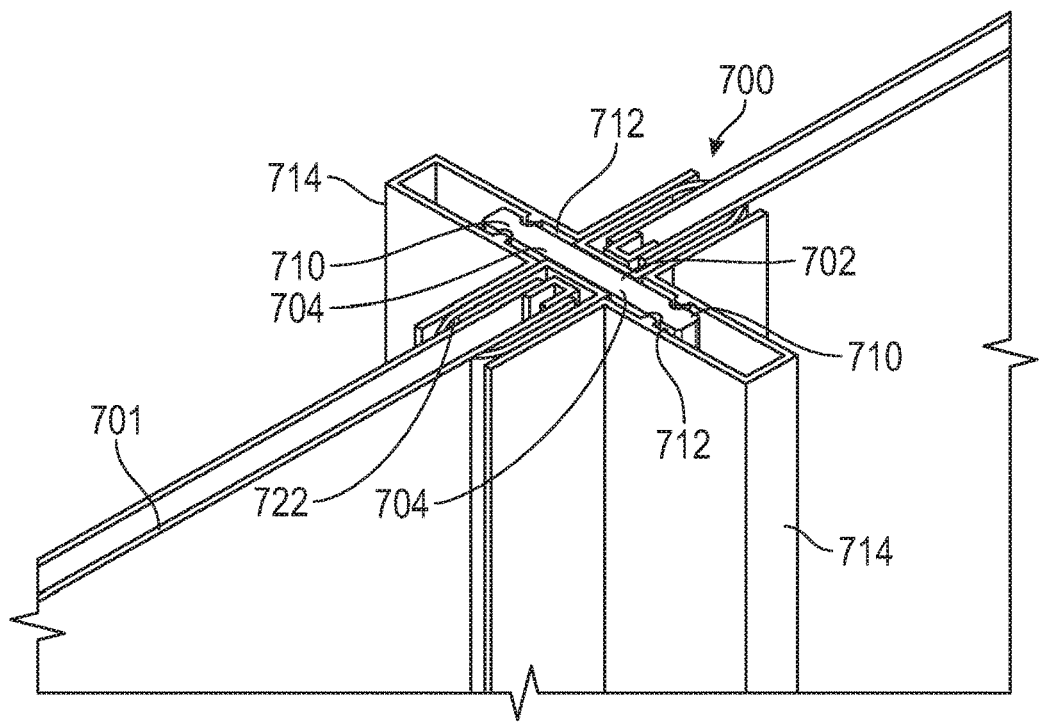
FIG. 7C is a perspective view of an additional example of a fascia module.

FIG. 7C shows another example of the fenestration wall assembly 700. In this example, the fenestration wall assembly 700 includes trim modules 714. As shown, the trim modules 714 have a differing profile than the previously described trim modules 706, 708. In this example, the trim modules 714 have a narrower profile than the previously shown trim modules and accordingly provide a different aesthetic to the interface between the panels 701. The socket core 702 used with the fenestration wall assembly includes the module sockets 704 having the coupling fittings 710, previously described herein. Conversely, the trim modules 714 include corresponding coupling ports 712 sized and shaped to couple with the coupling fittings 710. As further shown in FIG. 7C, panel flanges 722 extend from the socket core 702 to accordingly isolate the panels 701 as well as the interior portion of the building from the environment, including one or more of humidity, moisture, elevated temperatures, depressed temperatures and the like.

Figure 7D:
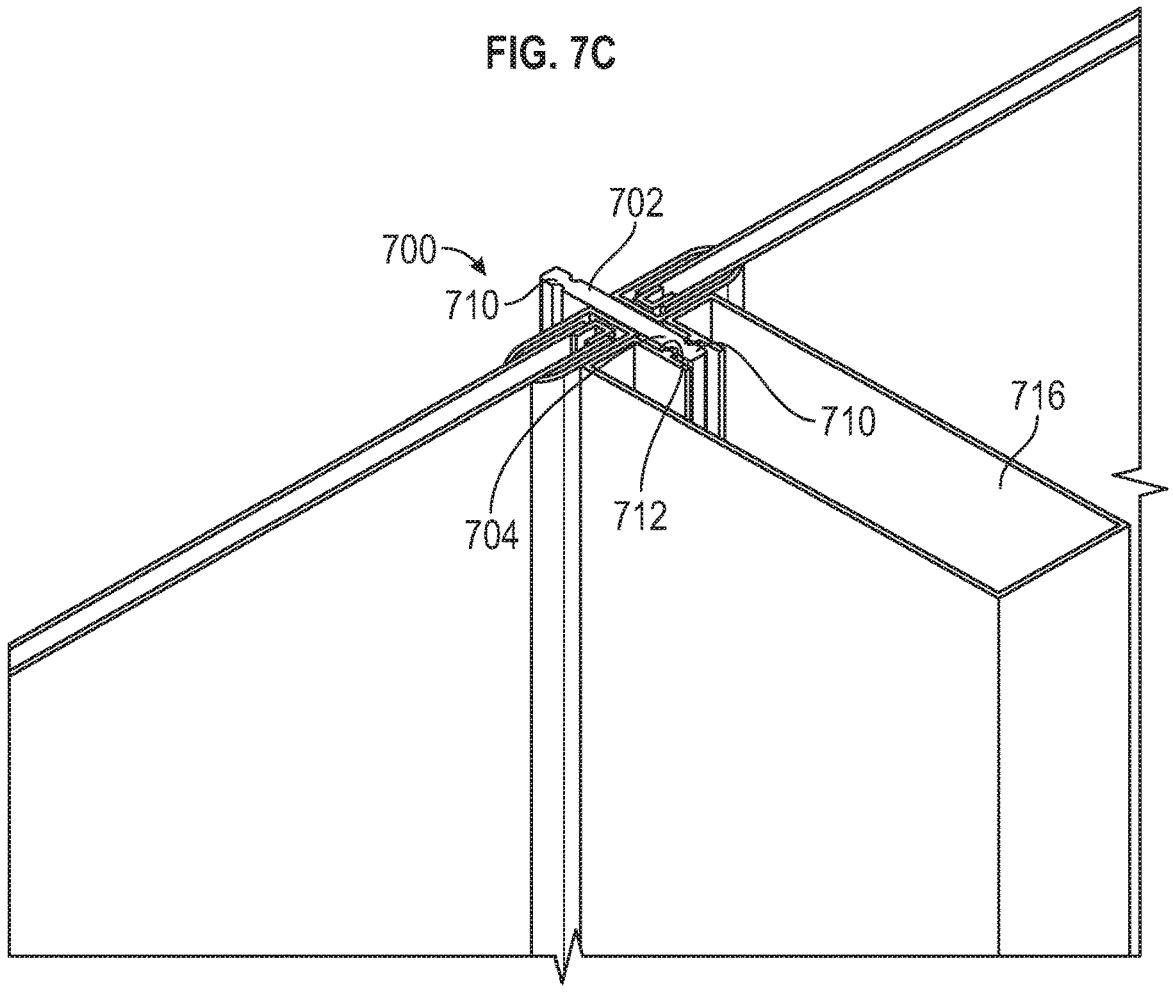
FIG. 7D is a perspective view of yet another example of a fascia module.

FIG. 7D shows yet another example of the fenestration wall assembly 700, including another trim module 716. In this example, the trim module 716 provides an elongate profile having a wider dimension relative to the trim module 714 shown, for instance, in FIG. 7C. As shown in FIG. 7D and elsewhere herein, this example trim module 716 includes one or more of a molded or extruded construction or the like. For instance, the trim module 716 is, in one example, extruded from plastic or metal, such as aluminum, or conversely molded. The trim module 716 includes a coupling port 712 configured for coupling with the coupling fitting 710 at the module socket 704 of the socket core. As further shown in FIG. 7D, the opposed module socket 704 including, for instance, a coupling fitting 710, is unadorned with a trim module. In one example, the exposed module socket 704 including the coupling fitting 710 serves as a decorative feature at the interface between the panels 701.

Figure 7E:
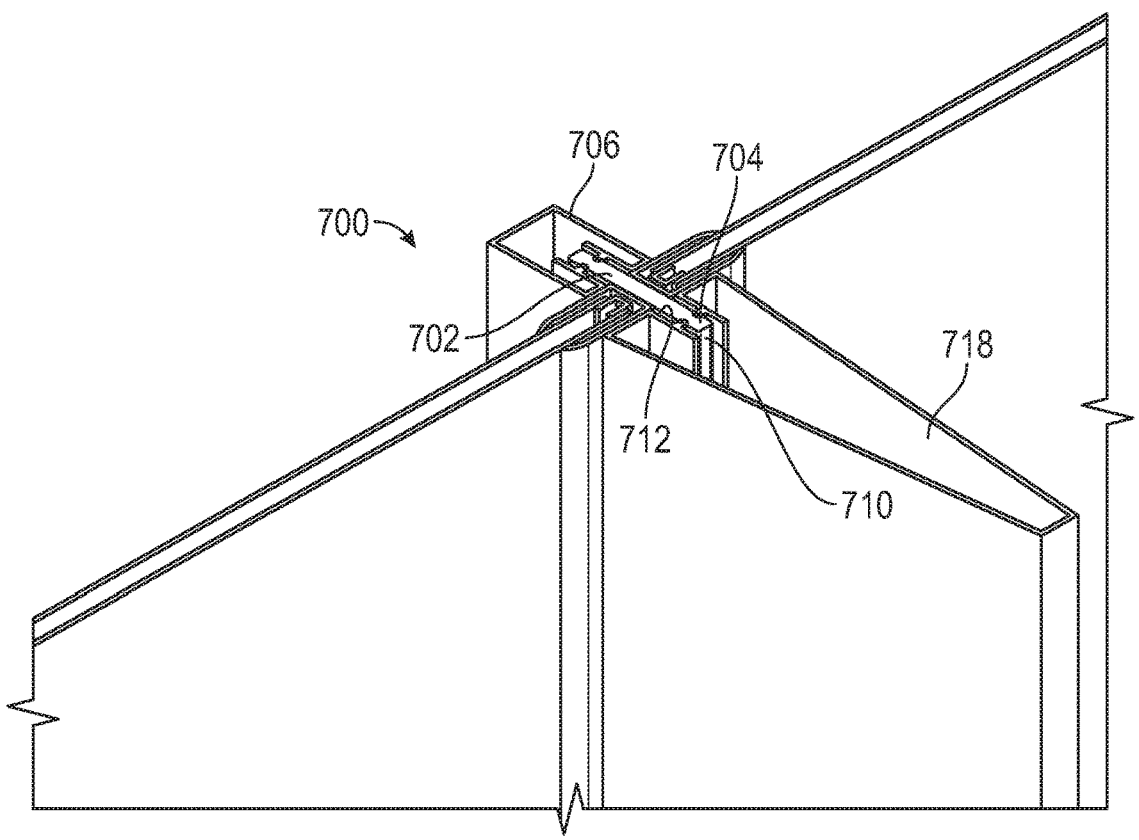
FIG. 7E is a perspective view of a supplemental example of a fascia module.

FIG. 7E shows another example of the fenestration wall assembly 700, including trim modules 718, 706. This example trim module 718 includes a tapered profile extending away from the socket core 702. Additionally, the trim module 706, previously described and shown herein, is provided along the opposed module socket 704.

Figure 7F:
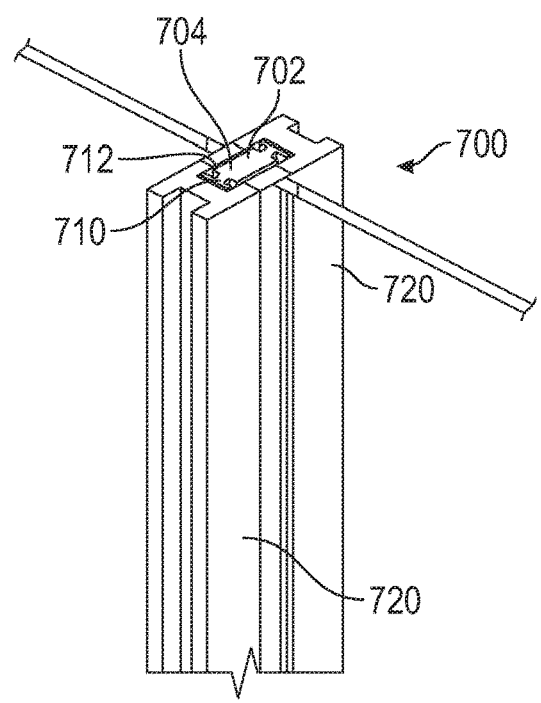
FIG. 7F is a perspective view of still another example of a fascia module.

As further shown in FIG. 7F, another example of the fenestration wall assembly 700 includes a different profile of the trim modules, such as an H-shape or I beam type configuration. The fenestration wall assembly 700 of FIG. 7F includes trim modules 720 at the module sockets 704 along the exterior and interior of the fenestration wall assembly 700. Each of the trim modules 720 includes corresponding coupling ports 712 sized and shaped for interfitting and coupling with the coupling fittings 710 of the module sockets 704 of the socket core 702.

Figure 8:
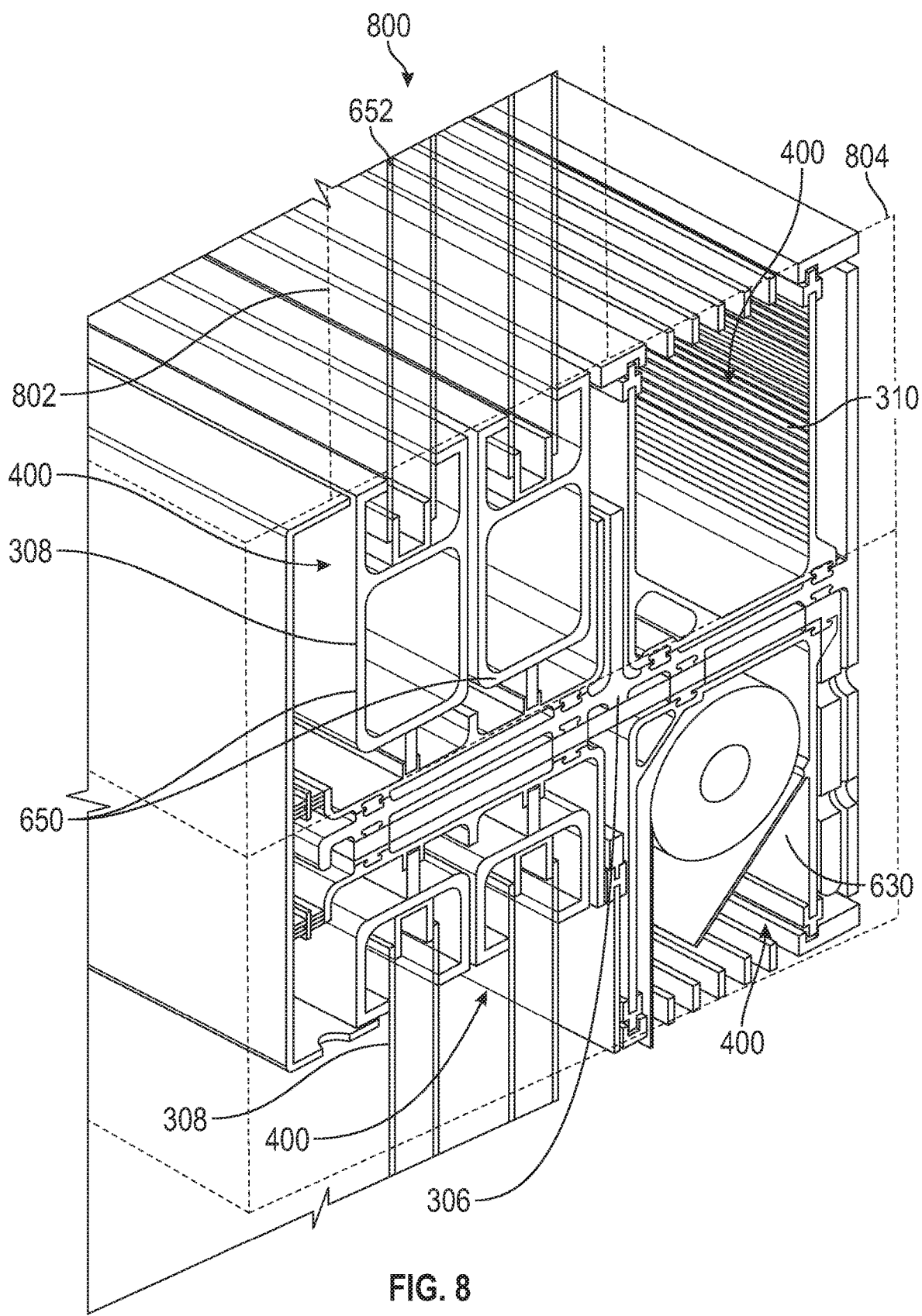
FIG. 8 is a cross-sectional view of another example of a fenestration wall assembly.

FIG. 8 is a detailed perspective view of another example of a fenestration wall assembly 800. Similarly to the previously described examples of a fenestration wall assembly, the assembly 800 includes a fenestration frame, for instance, including the socket core 306. In this example, the socket core 306 includes four module sockets each having a service module therein. The socket core 306 includes a conduit module 310 and a glazing unit module 308 associated with the upper module sockets 400 and a screen module 630 and a second glazing unit module 308 associated with the lower module sockets 400 of the socket core 306. In one example, this portion of the fenestration wall assembly 800 is an interfacing fenestration wall assembly component between upper and lower floors. For instance, the upper module sockets 400, including the conduit module 310 and the glazing unit module 308 therein, are module sockets associated with the portion of the fenestration wall assembly 800 for an upper floor of the building. The lower module sockets 400 of the socket core 306 having the screen module 630 and the second glazing unit module 308 are associated with the fenestration wall assembly portion for a lower floor. Accordingly, the fenestration wall assembly 800, shown in FIG. 8, provides both upper and lower module sockets for corresponding upper and lower floors. In another example, additional socket cores 306 are provided for the opposed ends of the fenestration wall assembly 800, for instance, for the upper (ceiling) portion of the upper floor and for the service modules provided along the lower (floor) portion of the lower floor.

Referring again to FIG. 8, the glazing unit module 308 includes a panel profile 802 corresponding to one or more of the panels, such as the glazing unit panes 652. As shown, the glazing unit panes 652 includes translucent or daylight opening portions. As further shown in FIG. 8, one or more module profiles 804 of the service modules 310 and 308 (the glazing unit frames 650 of the modules 308) include their module profiles 804 outside of the panel profile 802. Accordingly, the panel profile 802 and the corresponding daylight opening are unobstructed by each of the modules. Additionally, in another example the module profiles 804 of the service modules are complementary to module socket profiles of the socket cores (e.g., the shape and size of the module sockets), and when installed, the module socket profiles include the module profiles therein. For instance, the profile of the fenestration frame includes the module profiles of the service modules and thereby minimizes the profile of the service modules outside of the fenestration frame.

In one example, each of the modules associated with the socket core 306 and the socket core itself 306 are installed along an edge of a building between an upper and lower floor. Accordingly, the service modules, such as the conduit modules, screen module and the glazing unit modules 308, are aligned with the concrete, framing or the like of the intervening floor and thereby recessed from the daylight opening. Instead, the glazing unit panes 652 extend from floor to ceiling and accordingly provide an unobstructed view through the fenestration wall assembly 800 without any of the service modules interrupting or interfering with the daylight opening (e.g., the panel profile 802).

FIG. 9 shows another example of a fenestration wall assembly 900 that bridges between a floor 902 and a ceiling 906. In this example, the fenestration wall assembly 900 is installed along a structure edge 904. For instance, the structure edge 904 corresponds to a wood or concrete edge portion of a floor and ceiling 906, 902.

As shown in FIG. 9, the fenestration wall assembly 900 includes a fenestration frame including the socket core 910. The socket core 910 is coupled along the structure edge 904 and accordingly the service modules installed with the socket core 910 of the fenestration wall assembly 900 are recessed relative to the floor 902 and the ceiling 906 and thereby isolated from the daylight opening (e.g., the panel profile 802 in FIG. 8). In a similar manner to FIG. 8, the panels or daylight openings of the glazing unit modules 308, shown in FIG. 9, are unobstructed by the service modules including, for instance, the module profiles of the screen module 630 and the conduit module 310.

As further shown in FIG. 9, the socket core 910 includes module sockets configured for reception of the screen module 630 as well as the conduit module 310. The conduit module 310 is associated with the floor 902 and provides conditioned air 908 through the environment conduit (the larger passage of the module 310). The screen module 630 is associated with the ceiling 906 of a lower floor. In this view, the screen 640 is shown partially deployed from the screen module 630, for instance, including a pull bar provided along the bottom portion of the screen 640.

In the example shown in FIG. 9, each of the conduit module 310 and the screen module 630 includes cable conduits 600, 642. As previously described, the cable conduits 640, 642 facilitate the passage of electrical wiring, cabling, one or more utility services or the like through the fenestration wall assembly 900, for instance, for interconnection with additional or proximate fenestration wall assemblies 900 to accordingly provide services or capabilities throughout a building.

As further shown in FIG. 9, the socket core 910 of the fenestration wall assembly 900 (e.g., a portion of the fenestration frame) includes one or more glazing unit modules 308 installed in corresponding module sockets 903 of the socket core 910. In this example, the module sockets 903 are configured for reception of a single insulated glazing unit housed within the glazing unit module 308. The module sockets 903 for the glazing unit modules 308 are smaller than the module sockets 901 for the conduit module 310 or screen module 630. Accordingly, the socket core 910, shown in FIG. 9, includes module sockets having different profiles to accommodate glazing unit modules 308 having smaller profiles relative to the other service modules such as the conduit module 310 and the screen module 630.

FIG. 9 shows another example of a socket core, the socket core 702 previously described and shown in FIGS. 7A-F. In this example, the socket core 702 extends transverse to the socket core 910 and is coupled with the socket core 910. The socket core 702, as previously described, includes one or more coupling fittings or coupling ports configured for coupling with corresponding trim modules. In this example, the trim module 708 and the trim module 718 are coupled with the trim socket core 702. For instance, the trim module 708, in this example, is an exterior wood trim module. In the example shown in FIG. 9, the trim module 708 bridges between upper and lower floors and across the socket core 910. As further shown in FIG. 9, the trim module 718 is coupled along the trim socket core 702 extending upwardly from the floor 902. A lower trim module 718 is optionally coupled along the trim socket core 702 extending downwardly from the ceiling 906.

Figure 10:
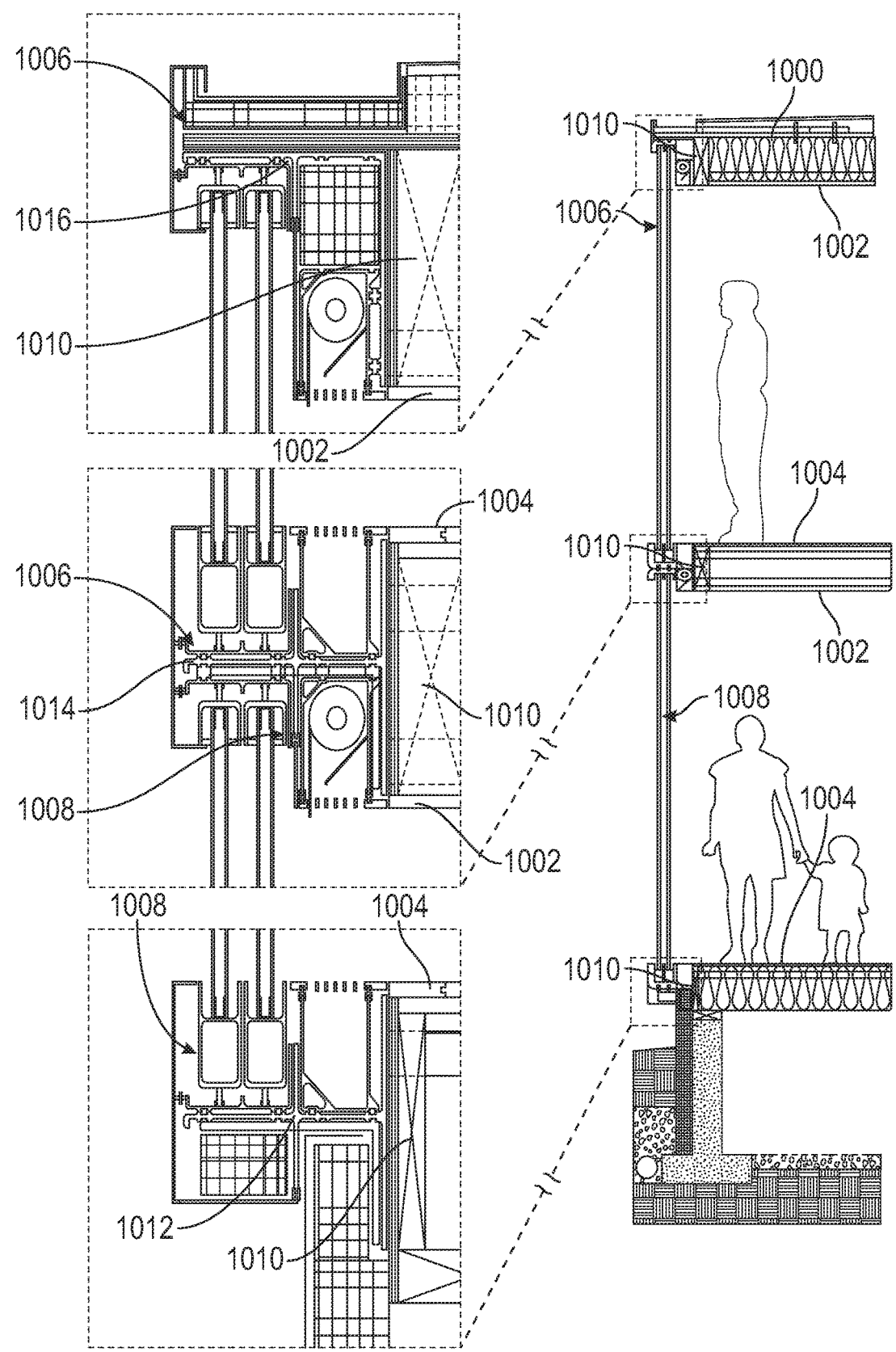
FIG. 10 is a cross-sectional view of an example fenestration wall assembly in a first installed configuration.

FIG. 10 shows an elevation and corresponding detailed views for one example of a building 1000, including fenestration wall assemblies 1006, 1008. The building 1000 includes one or more ceilings 1002 and floors 1004. In some examples, the ceilings and floors 1002, 1004 are shared ceilings and floors between each of first and second levels. Each of the floors and ceilings 1004, 1002 include corresponding edges 1010. In one example, the fenestration frame having one or more of the socket cores described herein, are installed along the edges 1010 to recess installed service modules away from the daylight openings of each of the levels of the building 1000. For instance, in the upper detailed view, the fenestration wall assembly, including one or more of a screen module and glazing unit module, is coupled with an edge 1010 of the ceiling 1002 of the building 1000. As shown, each of the service modules, including the screen module and the frame portions of the glazing unit module, are recessed away from the daylight opening, as shown in the elevation provided in FIG. 10.

The second detailed view of the building 1000 includes the fenestration wall assembly 1006 and the fenestration wall assembly 1008 meeting at a common or shared socket core 1014 extending between each of the wall assemblies. In this example, the wall assemblies 1006, 1008 are, in one example, component wall assemblies of an overall wall assembly bridging the levels of the building 1000 with the socket core 1014.

Optionally, the various socket cores 1016 and 1014 of the fenestration wall assemblies 1006, 1008 shown in FIG. 10 are, in some examples, installed along the edges 1010 prior to installation of the service modules. After installation of the socket cores 1014, 1016 (as well as the socket core 1012 shown in the third lower detailed view), the service modules are readily installed in the corresponding module sockets of the socket cores. For example, the various service modules are positioned at a first location along the socket cores and moved along the cores to specified locations (e.g., a specified installation position). Supplemental service modules are coupled along the socket cores, and then moved along the cores to positions adjacent to the previously installed service modules.

In the third detailed view of the building 1000, the fenestration wall assembly 1008 is shown along the bottom edge, for instance, with the socket core 1012, including two service modules associated with corresponding module sockets. In this example, the socket core 1012 is installed along an edge 1010 of the floor 1004. As with the other socket cores, 1016, 1014 described herein and their associated service modules, the fenestration frame portions of the wall assemblies 1006, 1008 are aligned with the floors and ceilings 1004, 1002 and accordingly are isolated from a panel profile of the glazing unit modules provided with the fenestration wall assemblies 1006, 1008. Accordingly, as shown in the elevation in FIG. 10, the daylight openings of the building 1000 remain open while the fenestration wall assemblies 1006, 1008 provide one or more services, including utility services, screens or the like in an isolated manner that maintains the daylight opening.

Figure 11:
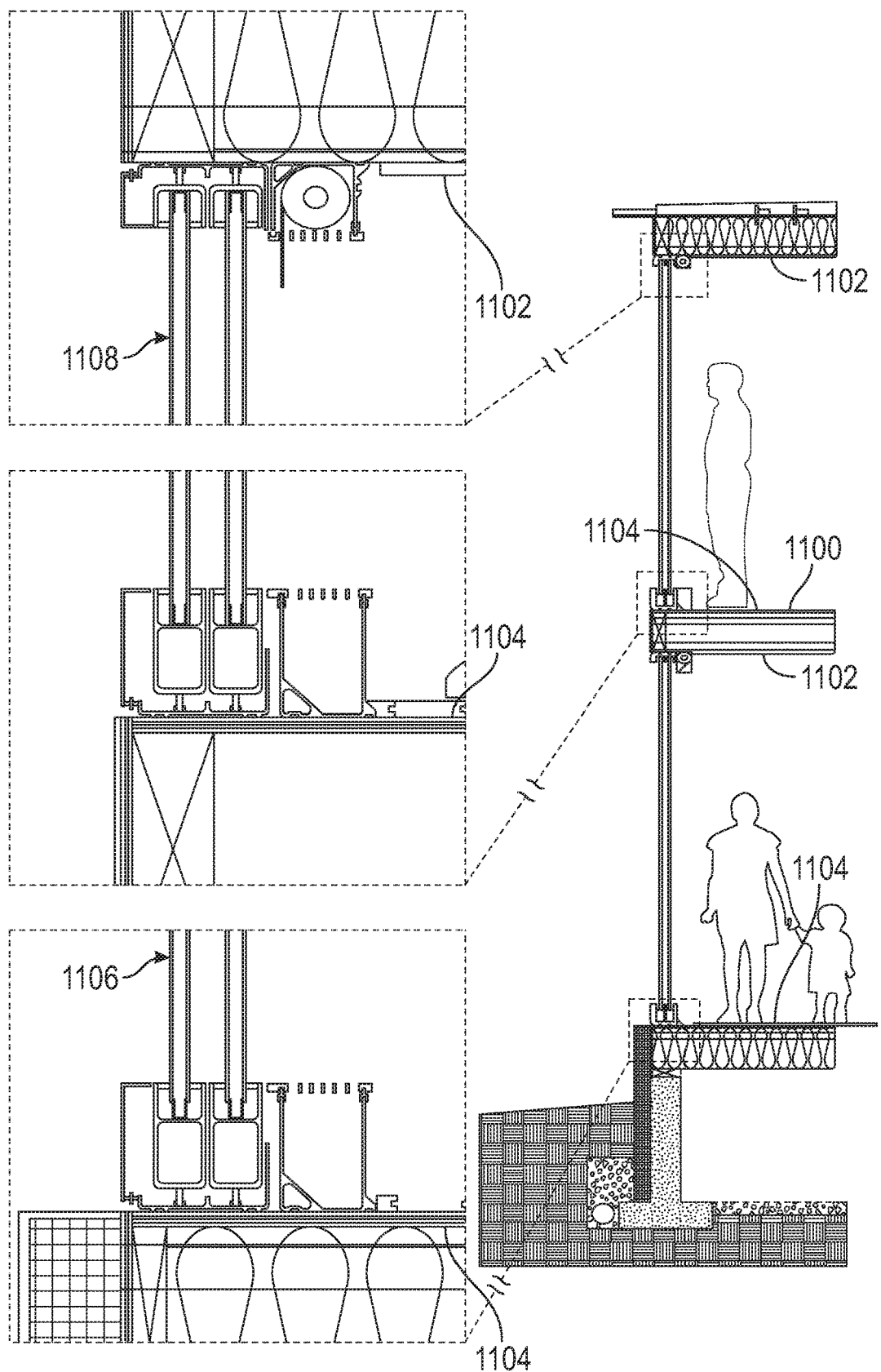
FIG. 11 is a cross-sectional view of another example fenestration wall assembly in a second installed configuration.

FIG. 11 shows another example of a building 1100. In this example, as in the example previously shown in FIG. 10, the building 1100 includes ceilings 1102, floors 1104 and, as shown in the example, a shared floor 1104 and ceiling 1102 that are common to upper and lower levels. In this example, the fenestration wall assemblies 1106 and 1008 are coupled between the respective ceilings 1102 and floors of each of the levels of the building 1100. As shown in FIG. 11, the fenestration wall assemblies 1106, 1108 are installed along the respective ceilings 1102 and floors 1104. In the detailed views provided to the left of the elevation, the fenestration wall assembly 1108 is installed along each of the associated ceiling 1102 and floor 1104 of the level in contrast to installation along the edges as shown in FIG. 10. In a similar manner, the fenestration wall assembly 1106 is also installed between the floor 1104 and the corresponding ceiling 1102. Even with installation along one or more of the ceilings and floors 1102, 1104, each of the service modules associated with the fenestration wall assemblies 1106, 1108 has a minimized profile corresponding to the profile of the respective socket cores and is recessed to maximize the daylight opening for each level of the building 1100. Additionally, the service modules, as described herein, provide one or more services, including the distribution of utility services, the provision of one or more of screens, operable windows or doors or the like, while at the same time maximizing the daylight openings.

Figure 12:
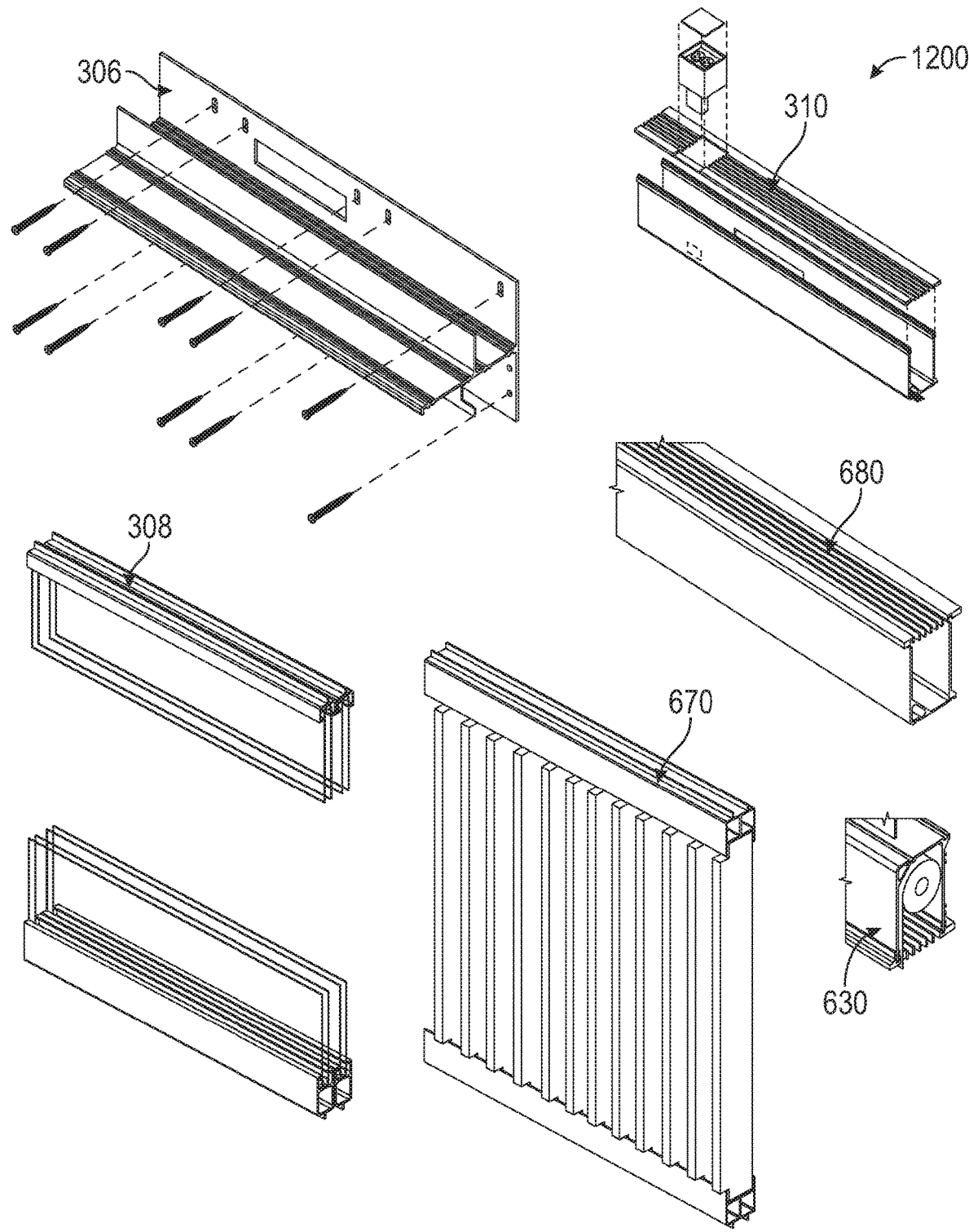
FIG. 12 is a component view of the fenestration wall assembly as a kit.

FIG. 12 shows an example of a fenestration wall assembly kit 1200. In this example, the fenestration wall assembly 1200 includes one or more of the components described previously herein. For instance, as shown in FIG. 12, the kit 1200 includes a socket core 306 one or more module sockets 400 (shown and described in FIGS. 4 and 5). The socket core 306 is included with the kit 1200 as are one or more of the service modules. Example service modules are shown in FIG. 12 and include, but are not limited to, the conduit module 310, a diversion module 680, a screen module 630, a wall module 670 and a glazing unit module 308. In this example, the glazing unit module 308 includes a double glazing unit. In other examples, the glazing unit module includes, but is not limited to, a single glazing unit module, a triple glazing unit module, one or more sliding glazing units, for instance, for use as doors or the like. The kit 1200, in various examples, includes one or more of the service modules, for instance, in a catalog to facilitate the assembly of a fenestration wall assembly according to specifications. For example, if a design requires a diversion module 680 for water diversion along an exterior portion of the socket core 306, the user selects the corresponding diversion module 680 for the socket core 306. Similarly, where one or more utility services, including, for instance, cabling, wiring, conditioned air or the like are desired, the conduit module 310 is selected for installation in the corresponding interior module socket of the socket core 306. Optionally, when a screen module 630 is specified for a lower interior module socket (positioned along a ceiling 1002 as shown in FIG. 10), the screen module 630 is selected for installation in the corresponding module socket.

In a similar manner, one or more of the trim modules and corresponding socket core 702, for instance shown in FIG. 7A-F as described herein, are also included in the fenestration wall assembly kit 1200. Accordingly, a user (e.g., an architect, designer, builder or the like) may select one or more socket cores having a specified number of module sockets and one or more of the service modules to accordingly assemble a fenestration wall assembly as specified for the project. The fenestration wall assembly, whether assembled onsite or at a factory, provides a unitary assembly of the service modules and the fenestration wall components, such as glazing unit modules 308, to accordingly consolidate each of the services provided with the daylight opening (or wall or door). Additionally, the modular components of the fenestration assembly, including trim modules, cladding components or the like provide added flexibility to specify various aesthetic aspects of the assembly according to the profiles of selected trim modules, component materials and finishes or the like.

Once assembled, the fenestration wall assembly is readily installed, for instance, by coupling along the edges of a floor and ceiling interface or within an opening in a building. Multiple fenestration wall assemblies are, in some examples, coupled horizontally along a building level and one or more of the modules described herein including, for instance, the conduit modules 310, screen modules 630, diversion modules 680 or the like are interfit. For example, by interfitting conduits of corresponding modules one or more services are distributed through the building with the interconnected fenestration wall assemblies.

Figure 13A:
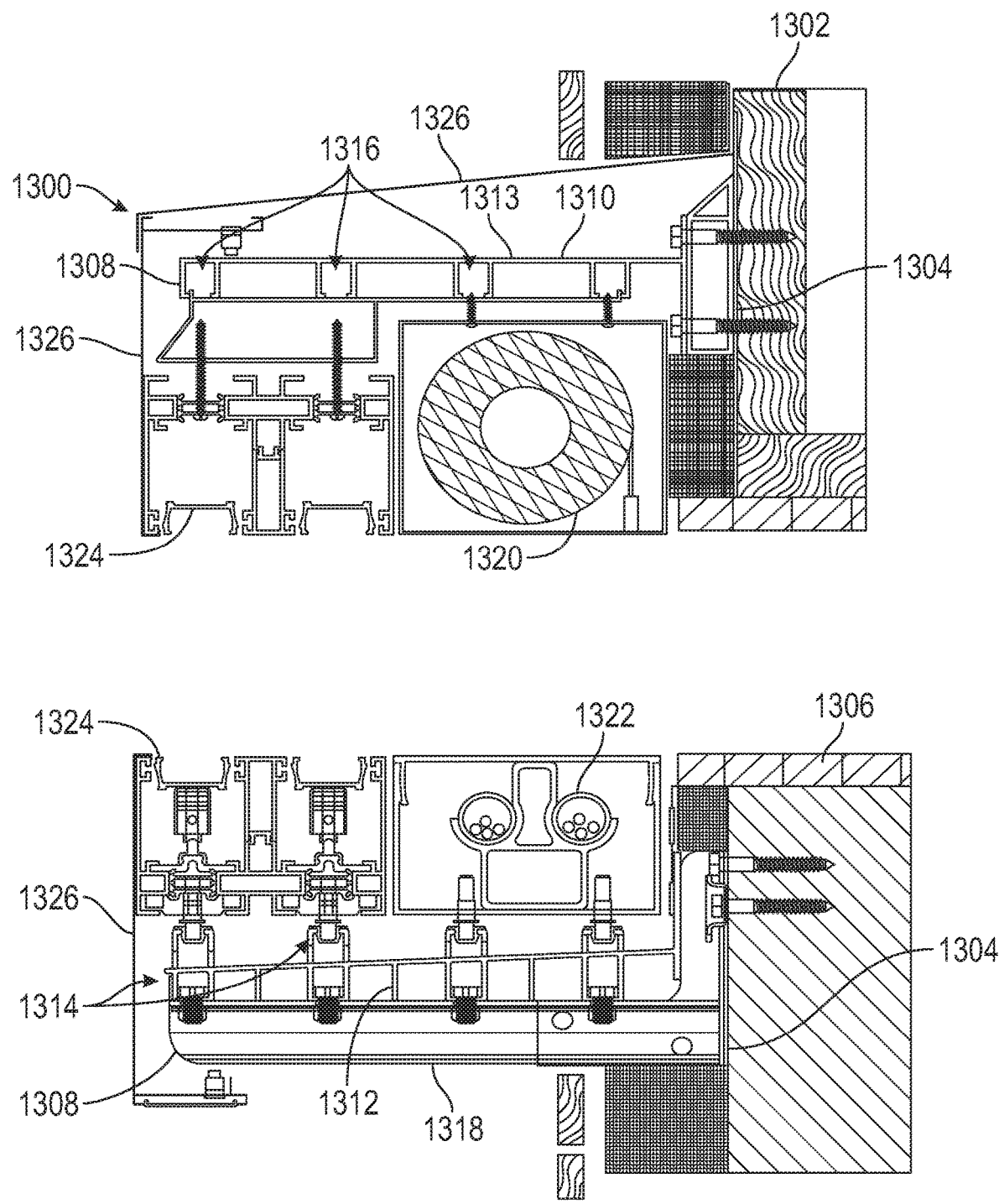
FIG. 13A is a cross-sectional view of a supplemental example of a fenestration wall assembly.

FIG. 13A shows a sectional view of another example of a fenestration wall assembly 1300. In this example, the fenestration wall assembly 1300 includes one or more socket cores 1312, 1313 and one or more service modules installed therein. As further shown in FIG. 13A, the socket core 1312 includes a different configuration of module sockets 1314 relative to the previous examples shown herein. For instance, the module sockets 1314 extend into and out of the page along the elongate socket core 1312. In one example, the module sockets 1314 are rails, grooves or the like extending from end to end of the socket core 1312.

As will be described further herein, the module sockets 1314 of the socket cores 1312 facilitate the installation of the various service modules at a single location such as at a corner or convenient location along the side of a building followed with positioning of the service modules at a specified location. For instance, the socket core 1312 and corresponding socket core 1313 extend from end to end of a floor of a building. Each of the socket cores 1312, 1313 are components of multiple fenestration wall assemblies 1300 along each floor. The service modules are, in one example, installed along a portion of the socket cores 1312, 1313 and then moved (e.g., slid, rolled, moved, positioned or the like) to a specified location. In one example, the service modules are hoisted with a crane to a level of a building proximate ends of the socket cores 1312, 1313 (e.g., at a corner of a building, central location of the building or the like). The service modules are installed within the respective module sockets 1314 and then moved into a specified position. As one example, a plurality of glazing unit modules, such as the modules 1324, shown in FIG. 13A, are installed in corresponding module sockets 1314 and then slid along the length of the socket cores 1312, 1313 to a specified position, for instance, at an opposed end of the floor, at an intermediate location or the like. Accordingly, the service modules are readily coupled with the socket cores 1312, 1313 at a first location and then readily repositioned, for instance, with hand operation, by installers to position and optionally fix the service modules at a specified location along the building wall such as a specified location of one or more of the fenestration wall assemblies 1300. Additional service modules are then optionally installed on the same module sockets 1314 and moved down the cores along the module sockets 1314 to the next or proximate position adjacent to the previously installed service module. The pre-positioning or pre-installation of the socket cores 1313, 1312 facilitates the ready coupling of the service modules along the module sockets 1316, 1314 and thereby facilitates the positioning of the service modules in a precise manner with minimal labor, for instance, with the use of one or more installers using hand pressure to move the service modules into position along the socket cores 1312, 1313.

Referring again to FIG. 13A, as previously described, a plurality of service modules are installed with the fenestration wall assembly 1300. For instance, in this example, a screen module 1320 is installed in an upper module socket 1316 including, for instance, two component module sockets 1316. Along the opposed socket core 1312 a conduit module 1322 configured to distribute one or more services through the building is installed in the opposed module socket 1314 of the socket core 1312. Glazing unit modules 1324 are installed, in this example as a double glazing unit module, in the module sockets 1314 associated with an exterior portion of the socket core 1312 and the module sockets 1316 associated with the socket core 1313 (the exterior portion of the socket core 1313).

As further shown in FIG. 13A and as previously described herein, the fenestration wall assembly 1300 is, in one example, installed between the floor 1306 and the ceiling 1302 of a building. As shown in FIG. 13A, the fenestration frame 1308 including the socket cores 1312, 1313 are installed with one or more support brackets 1318 shown coupled along the edges 1304 of the ceiling 1302 and the floor 1306. A corresponding bracket is shown coupled with the edge 1304 associated with the ceiling 1302. The socket core 1313 extends from the bracket provides opposed module sockets 1316 to the module sockets 1314 of the socket core 1312.

Each of the conduit module 1322, as well as the support components of the glazing unit modules 1324, are recessed relative to the daylight opening of the fenestration wall assembly 1300. As previously described, in an example, the module components received in the module sockets include module profiles (e.g., complementary to the module sockets). For instance, in this example, a conduit module 1322, as well as the support portions of the glazing unit modules 1324 (e.g., roller assemblies, support frames or the like) are flush with the floor 1306 and, as shown in the upper portion of 13A, flush with the ceiling 1302. Accordingly, the daylight opening profile corresponding to a panel profile is unobstructed and thereby isolated from each of the module profiles of the fenestration wall assembly 1300.

Referring again to FIG. 13A, the support bracket 1318 provides a cantilevered support for the socket core 1312 to similarly support the one or more service modules installed in the socket core 1312. In another example, the socket core 1312 is an integral component to the support bracket 1318, the core 1312 and bracket 1318 are installed as a unitary fixture. In a similar manner, the socket core 1313 of the upper portion of the fenestration wall assembly 1300 is, in one example, provided as an integral component, for instance, to a bracket coupled along the edge 1304.

As further shown in FIG. 13A, a frame cladding 1326 is coupled between the ceiling 1302 and components of the fenestration wall assembly 1300 including the socket core 1313 as well as one or more of the service modules, such as the glazing unit module 1324. In a similar manner, frame cladding 1326 is provided with the lower portion of the fenestration wall assembly 1300, and extends along one or more portions of the socket core 1312 and one or more of the service modules including the opposed ends of the glazing unit module 1324. The frame cladding 1326 provides, in one example, a segmented flashing having a complementary profile to that of the fenestration wall assembly 1300. As shown, the frame cladding 1326 has a tapered or angled profile that is complementary to the profile of the fenestration frame 1308 (e.g., one or more of the socket cores 1312, 1313). The frame cladding 1326 is, in one example, supplied with the fenestration wall assembly 1300 as a ready-to-use component provided in a specified profile complementary to the profile of the fenestration wall assembly 1300. Additionally, the profile of the frame cladding 1326 includes, but is not limited to, one or more of shape, size, material, color, finish or the like. For instance, the frame cladding 1326 includes a profile having identical or similar materials, color or finish to the materials of one or more of the service modules, socket cores or other components of the fenestration wall assemblies. Accordingly, the frame cladding 1326 seamlessly blends with the remainder of the fenestration wall assembly 1300, provides a complementary profile to the assembly 1300, and thereby provides an aesthetic consistent appearance to the fenestration wall assembly 1300.

Figure 13B:
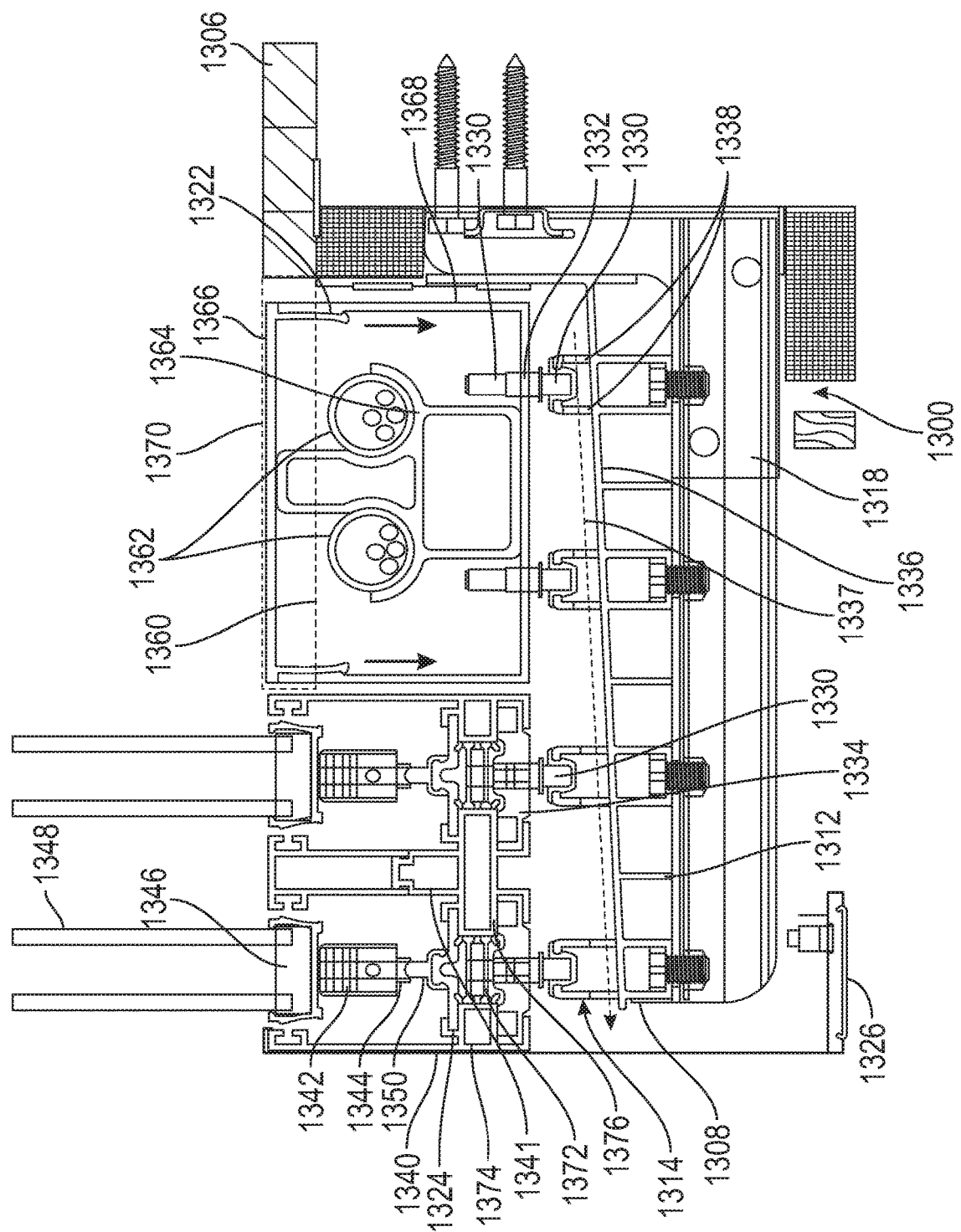
FIG. 13B is a detailed cross-sectional view of a portion of the fenestration wall assembly of FIG. 13A.

FIG. 13B is a detailed view of the bottom portion of the fenestration wall assembly 1300 previously shown and described in FIG. 13A. The conduit module 1322 and glazing unit modules 1324 are shown coupled with the socket core 1312 having (in this example) four module sockets 1314 spread along the socket core 1312.

The socket core 1312 includes a diversion surface 1336 tapering away from the building for moisture diversion (see the diverted moisture 1337 shown with the dashed line). The diversion surface 1336 is at an angle to promote moisture diversion away from the building (e.g., the floor 1306 and the edge 1304 shown in FIG. 13A) The module sockets 1314 are upstanding features along the diversion surface 1336 and provide a relatively level installation surface for each of the service modules including the conduit module 1322 and the glazing unit modules 1324 shown in FIG. 13B. In one example, each of the module sockets 1314 includes one or more weep orifices 1338 to facilitate the passage of moisture, for instance, rainwater, melt water or the like along the diversion surface 1336 toward a distal edge away from the building and toward the frame cladding 1326. In one example, the diversion surface 1336 cooperates with the frame cladding 1326. For instance, the frame cladding 1326, as previously described herein, includes a complementary profile relative to the remainder of the fenestration wall assembly 1300. The frame cladding 1326 optionally includes one or more segmented components, for instance, segmented flashing members that are lapped over each other to provide a moisture diverting function to the fenestration wall assembly 1300. In another example, the frame cladding 1326 includes one or more orifices, drains, screens, filters or the like provided along a lower surface of the frame cladding 1326, for instance, just below the end of the socket core 1312. Moisture diverted along the diversion surface 1336 drips or flows from the diversion surface 1336 and is passed out of the fenestration wall assembly 1300, for instance, through the openings of the frame cladding 1326 below the distal end of the socket core 1312. For example, the lowest portion of the frame cladding 1326 labeled in FIG. 13B, a horizontal segment, optionally includes a screen, perforations or the like immediately below the distal end of the socket core 1312.

As further shown in FIG. 13B and as previously described herein, the module sockets 1314 provide a planar installation surface for the service modules including, for instance, the conduit module 1322 and one or more glazing unit modules 1324 previously described and shown herein. As shown, the upper surface of the module sockets 1314 includes one or more ports, rails, grooves or the like configured to facilitate the installation of the service modules. As previously described in one example, the service modules are coupled with the socket cores 1312, 1313 (1313 shown in FIG. 13A) and then positioned along the module sockets 1314 at one or more specified locations.

In an example, one or more of the module sockets 1314 or the corresponding service modules includes module jacks 1330 configured to precisely adjust the position of each of the service modules relative to the socket cores 1312. The module jack 1330 includes a jack cuff 1332 associated with the module. If precise positioning of the module is specified, such as vertical positioning, leveling, plumbing or the like the glazing unit panes 1348 and associated glazing unit frames 1340 are removed to provide access to the module jack 1330. In one example, a fitting is provided at an end of the module jack 1330 for engagement with a tool (e.g., an an Allen wrench, screwdriver or the like). Rotation of the module jack 1330 is relative to the jack cuff 1334 coupled with the module and facilitates the upward and downward positioning of the corresponding portion of the glazing unit module 1324.

As further shown in FIG. 13B, a jack cuff 1332 is associated with two locations of the conduit module 1322. In one example, the jack cuffs 1332 of the conduit module 1322 facilitate the precise adjustment of the conduit module 1322, for instance, to level the conduit module relative to the floor 1306. For instance, the module jacks 1330 are rotated together or separately to reorient the upper surface of the conduit module 1322, including its conduit cover 1366. In another example, the module jacks 1330 are operated to recess the conduit module 1322 relative to the floor 1306. The floor 1306 is optionally extended over top of the conduit module 1322 as shown with the dashed floor extension 1370 in FIG. 13B. After the service modules are oriented, for instance, with operation of the module jacks 1330, one or more components of the various service modules such as the conduit cover 1366 of the conduit module 1322 or the glazing unit frames 1340 of the glazing unit modules 1324 are installed to finish installation and conceal the module jacks 1330. Optionally, if in the future adjustment of the modules is specified, for instance if the building settles and the modules are misaligned with the floor 1306 or other component the module jacks 1330 are accessed and adjusted to precisely reposition the modules as specified.

Referring again to FIG. 13B, the glazing unit modules 1324 in this example include roller assemblies 1342. In one example, the glazing unit panes 1348 are operated in the manner of sliding doors, windows or the like. For instance, the roller assemblies 1342 include one or more rollers 1344 configured for rolling movement or sliding movement along a corresponding rail or groove or the like, such as the rail 1350 extending into and out of the page along the remainder of the glazing unit frame 1340. In one example, the rollers 1344 are coupled along the glazing unit pane 1348 and facilitate the operation of the glazing unit pane in the manner of a sliding door. In another example, each of the glazing unit panes 1348 and their associated glazing unit frames

1340 the glazing unit modules 1324 are optionally operated as sliding doors or windows. For instance, in one example, the glazing unit panes 1348 and glazing unit frames 1340 of each of the glazing unit modules 1324 are, when open, stacked in a telescoping configuration to provide an opening through the fenestration wall assembly 1300 for fresh air, porch access, balcony access or the like.

As further shown in FIG. 13B, each of the glazing unit modules 1324 includes a glazing unit frame 1340, and the glazing unit frames 1340 in this example coupled together into a unitary assembly. For instance, a bridge 1341 spans each of the glazing unit frames 1340. The bridge 1341, shown in FIG. 13B provides an intercoupling feature between each of the frames 1340. In another example, the bridge 1341 provides an upper surface, face or the like as an intervening sill between each of the glazing unit panes 1348.

In another example, the glazing unit modules 1324 of FIG. 13B each include thermal breaks 1372. The thermal breaks 1372 include two or more members extending across exterior and interior components of the glazing unit frames 1340 that provide enhanced thermal insulation relative to the exterior and interior components. For instance, the interior and exterior components of the glazing unit frames 1340 are each constructed with a metal, such as aluminum, steel or the like. The intervening thermal breaks 1372 are constructed with polymers having higher thermal insulation values (such as an R value) relative to the other frame components. The thermal breaks 1372 between the interior and exterior components accordingly interrupt heat transfer from the exterior to the interior and from the interior to the exterior of the glazing unit modules 1324. The interruption of heat transfer across the glazing unit modules 1324 enhances overall thermal performance of the fenestration wall assembly 1300. Additionally, in another example the modules installed along the socket core 1312 are spaced from each other as shown in FIG. 13B. The gap therebetween further interrupts heat transfer through the wall assembly 1300.

As further shown in FIG. 13B, and as previously described herein, the conduit module 1322 is installed in one or more of the module sockets 1314. In the example shown, the conduit module 1322 extends across two of the module sockets 1314 and is coupled there along with one or more of the module jacks 1330 shown in FIG. 13B. As shown, the conduit module 1322 includes a conduit 1360 extending through the module body 1368. As previously described, the conduit 1360 is, in one example, configured to provide one or more environmental services including, but not limited to, conditioned air, radiator steam, cold water, hot water or the like to one or more locations within a building, for instance, along the fenestration wall assembly 1300.

Referring again to FIG. 13B, the conduit 1360 of the conduit module 1322, as shown in this example, includes two or more service traces 1362 extending therethrough. In this example, the service traces 1362 include one or more of cable runs, wiring bundles, telephone lines, pneumatic tubes or the like consolidated in the conduit 1360. As shown in FIG. 13B, an optional service frame 1364 is installed in the conduit 1360 along the conduit module 1322 to organize and provide channels for reception and organization of the service traces 1362 therein. The service frame 1364 includes, but is not limited to, one or more of fasteners, channels, a channeled frame, clips, hangars or the like configured to receive and retain one or more service traces 1362 therein. Additionally, as shown the conduit 1360 is larger than the service traces 1362 and the service frame 1364. In one example, one or more environmental services, including conditioned air, humidified air, radiator steam or the like are delivered through the open spaces of the conduit 1360 to one or more of grills, registers, ducts or the like in addition to the service traces 1362.

As further shown in FIG. 13B, the conduit module 1322 includes an optional conduit cover 1366. In one example, the conduit cover 1366 includes one or more coupling features configured to couple the conduit cover 1366 to the module body 1368. For instance, the coupling features include, but are not limited to, one or more of barbs, arms, members or the like configured to retain the conduit cover 1366 on the module body 1368. Optionally, the conduit cover 1366 is configured for recessing relative to the module body 1368. For instance, where installation of a floor extension 1370 is specified (as shown in broken lines in FIG. 13B) the conduit cover 1366 is recessed relative to the remainder of the module body 1368 to recess the conduit module 1322 away from the floor 1306. The floor extension 1370 is applied over top of the module body 1368 of the conduit module 1322 and the conduit cover 1366 to provide a continuous floor that extends to the glazing unit modules 1324 while at the same time still providing the services of the conduit module 1322.

Figure 14:
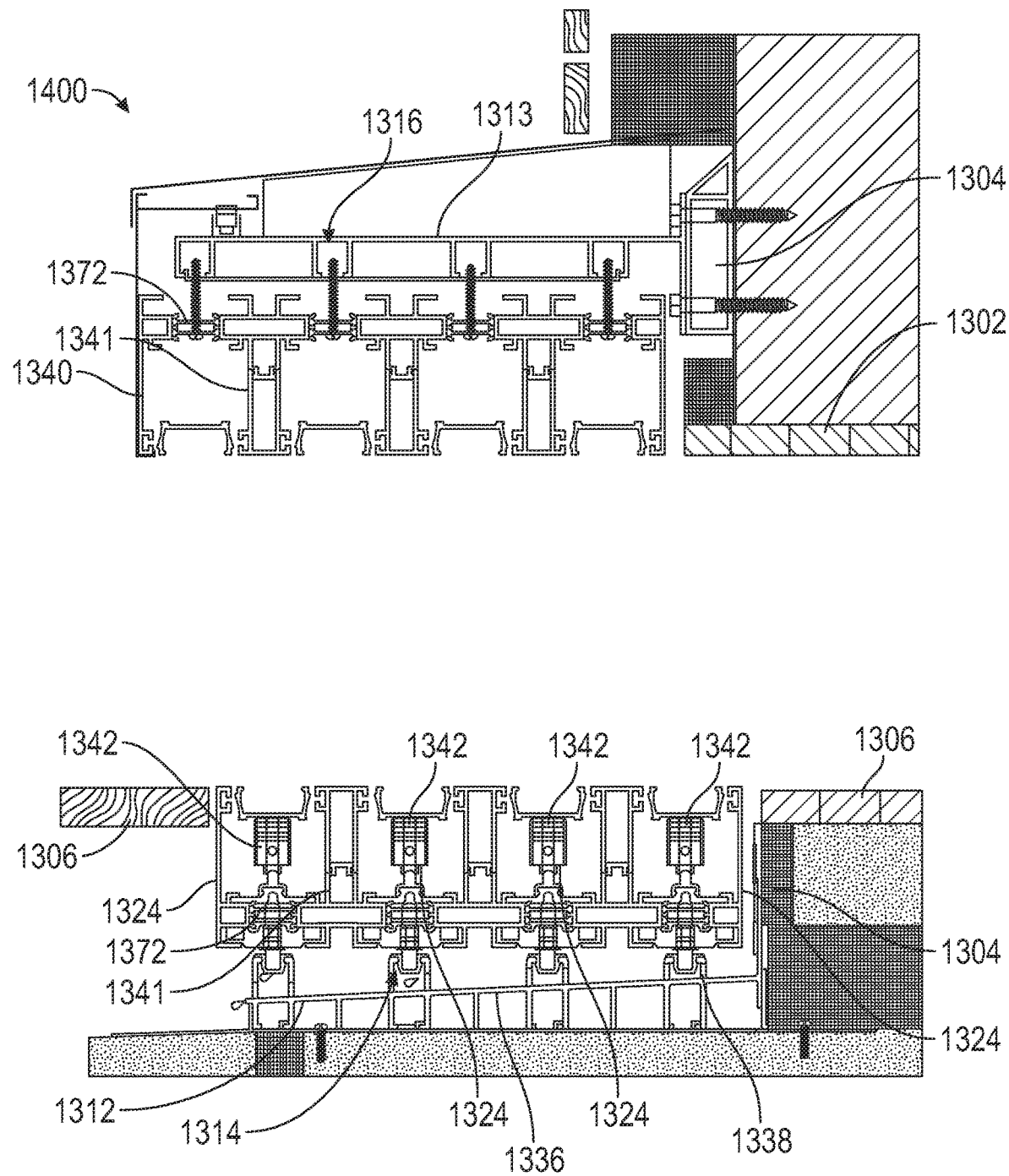
FIG. 14 is a cross-sectional view of yet another example of a fenestration wall assembly.

FIG. 14 shows another example of a fenestration wall assembly 1400. In this example, the fenestration wall assembly 1400 includes the socket cores 1312, 1313 previously shown and described in FIGS. 13A, B. In this example, the socket cores 1312, 1313 each include four module sockets 1314, 1316. In other examples, the various socket cores described herein include one or more module sockets including one, two, three, four, five or more module sockets along the socket cores.

In the example shown in FIG. 14, the fenestration wall assembly 1400 includes a plurality of glazing unit modules 1324. The plurality of glazing unit modules 1324 are shown with the fenestration wall assembly 1400 as an example of a different configuration of the wall assembly using the socket cores 1312, 1313 having modular sockets 1314, 1316. For instance, the glazing unit modules 1324 are one example of service modules that are interchangeably configured for coupling with the corresponding module sockets 1314, 1316 of the socket cores 1312, 1313.

As shown, the glazing unit modules 1324 are installed in an interior to exterior configuration, for instance, with a plurality of glazing unit modules 1324 forming a stacked or telescoping door assembly such as a multi-panel sliding door assembly. As shown in FIG. 14, each of the glazing unit modules 1324 is installed in a corresponding one of the module sockets 1314, 1316 of the respective socket cores 1312, 1313. Each of the glazing unit modules 1324 includes a roller assembly 1342 that moveably couples the glazing unit panes 1348 relative to the remainder of the module 1324 such as the respective glazing unit frame 1340. The glazing unit frames 1340 are, in turn, coupled with each of the module sockets 1314, for instance, with one or more of the module jacks described herein (e.g., jacks 1330 shown, for instance, in FIG. 13B).

As further shown in FIG. 14, each of the glazing unit modules 1324, in this example, include a thermal break 1372 interposed between interior and exterior portions of each of the glazing unit frames 1340. In one example, the thermal breaks 1372 are constructed with a polymer while the remainder of the glazing unit frames 1340 are constructed with metals or other materials having higher coefficients of thermal heat transfer. The thermal breaks 1372 interrupt heat transfer from the interior to the exterior of the building or from the exterior to the interior (depending on weather and interior conditions of the building).

Additionally, as shown in FIG. 14 the glazing unit frames 1340 of the plurality of glazing unit modules 1324 are optionally coupled together with one or more bridges 1341. In one example, the bridges 1341 provide a common interface between each of the glazing unit frames 1340 to form a coupled composite module of the component glazing unit modules 1324. In other examples, the various modules described herein, for instance, conduit modules, screen modules, drainage modules, glazing unit modules or the like and one or more of the trim modules are, in some examples, coupled together with bridges, such as the bridge 1341, to interfit the modules and accordingly provide a unitary composite module for installation along the module sockets 1314, 1316 of the respective socket cores 1312, 1313 (or other socket cores described herein).

Figure 15:
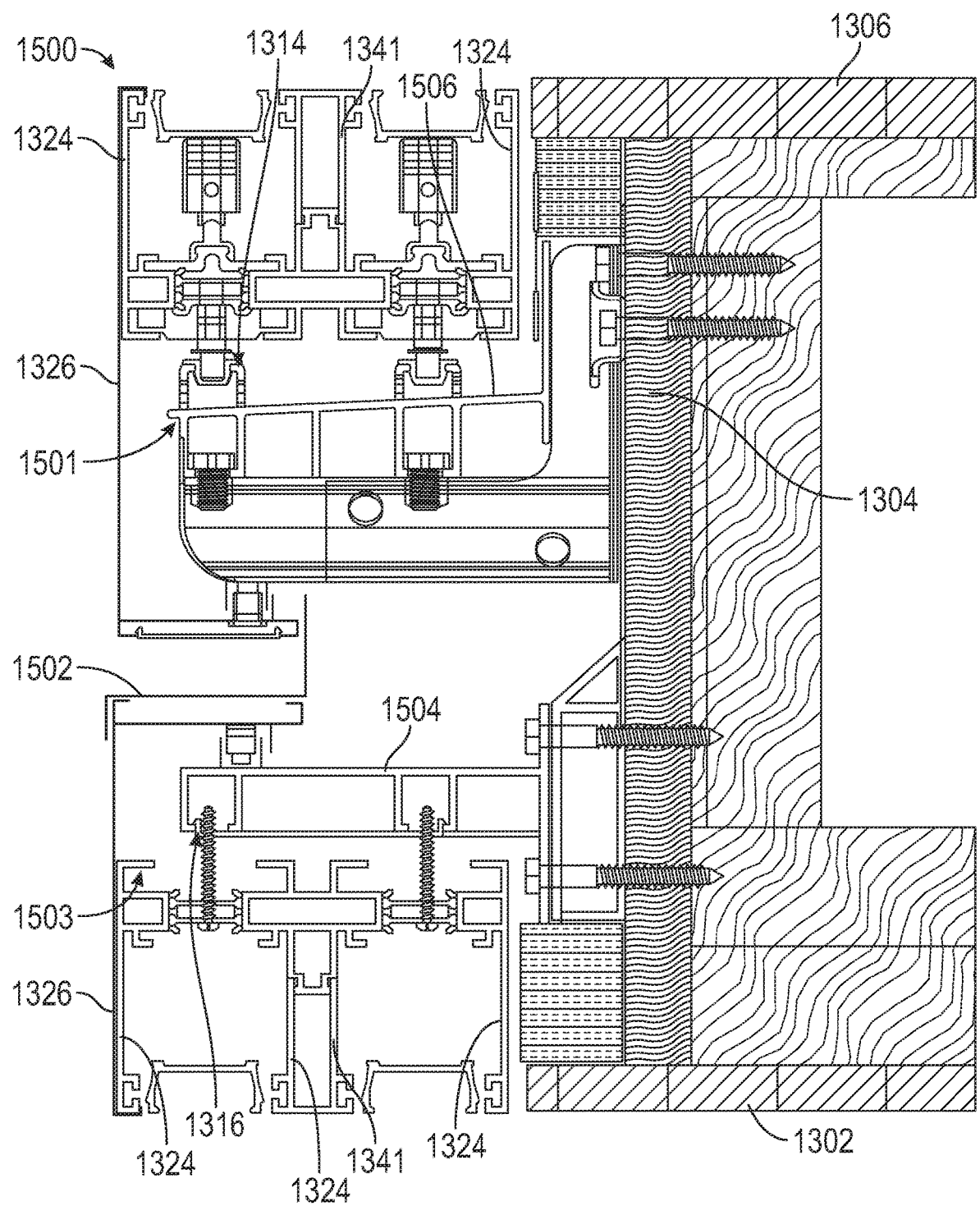
FIG. 15 is a detailed cross-sectional view of an example fenestration wall assembly including component fenestration wall assemblies.

FIG. 15 shows another example of a fenestration wall assembly 1500. In this example, the fenestration wall assembly 1500 includes one or more component fenestration wall assemblies, for instance, assemblies associated with each of the floor 1306 and an underlying ceiling 1302 (e.g., of a lower level of a building). As shown in FIG. 15, a component fenestration wall assembly 1501 having its lower portion shown in FIG. 15, is coupled along the floor 1306 and the edge 1304. An opposed component fenestration wall assembly 1503 having its upper portion shown in FIG. 15, is coupled along the ceiling 1302 and the common edge 1304 coupled with the first component fenestration wall assembly 1501. In other examples, each of the first and second component fenestration wall assemblies 1501, 1503 are coupled within openings of the building, for instance, on top of the floor 1306, proximate to the floor 1306, proximate the ceiling 1302, hung from the ceiling or the like.

As further shown in FIG. 15, each of the component fenestration wall assemblies 1501, 1503 form the overall fenestration wall assembly 1500. In this example, each of the wall assemblies 1501, 1503 includes respective socket cores 1506, 1504. Each of the socket cores 1506, 1504 include one or more module sockets. In this example, the socket core 1506 includes two module sockets 1314 while the socket core 1504 includes two module sockets 1316. In other examples, the socket cores 1504, 1506 includes one, three or more module sockets. As shown, glazing unit modules 1324 are installed in each of the module sockets 1314 and, in this example, include the bridges 1341 previously described herein.

As further shown in FIG. 15 and as previously described, the component fenestration wall assemblies 1501, 1503 are a composite fenestration wall assembly 1500 bridging one or more floors. In this example, each of the component fenestration wall assemblies 1501, 1503 have separate socket cores 1506, 1504. In other examples as described herein, a shared socket core is used with each of the upper and lower floor component wall assemblies (see FIGS. 3-5).

In this example, a frame cladding 1326 extends between each of the component fenestration wall assemblies 1501, 1503. The frame cladding 1326 includes multiple segments having a complementary profile to the overall profile of the fenestration wall assembly 1500. For instance, a floor interface cladding 1502 interconnects each of the component cladding pieces of the frame cladding 1326 provided with the component fenestration wall assemblies 1501, 1503. In the example shown in FIG. 15, the floor interface cladding 1502 provides a segmented lapped feature interconnecting the remainder of the frame cladding 1326. Additionally, the floor interface cladding 1502, shown in FIG. 15, provides a decorative recess or reveal for the fenestration wall assembly 1500 to accordingly form a shadow line or other decorative aesthetic feature for the overall composite fenestration wall assembly 1500.

Figure 16:
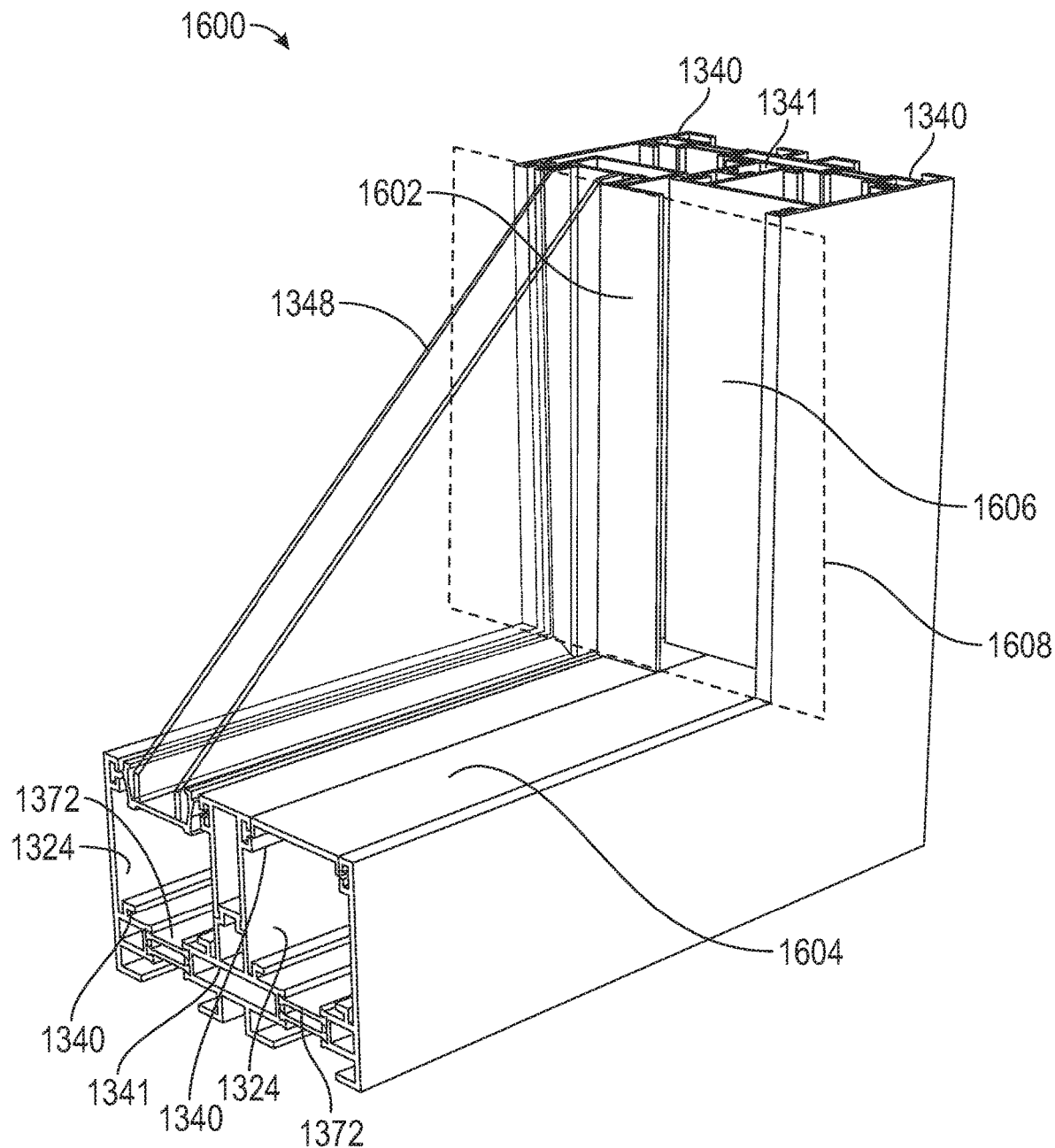
FIG. 16 is a horizontal and vertical sectional view of another example glazing unit module including a low-profile handle.
Figure 17:
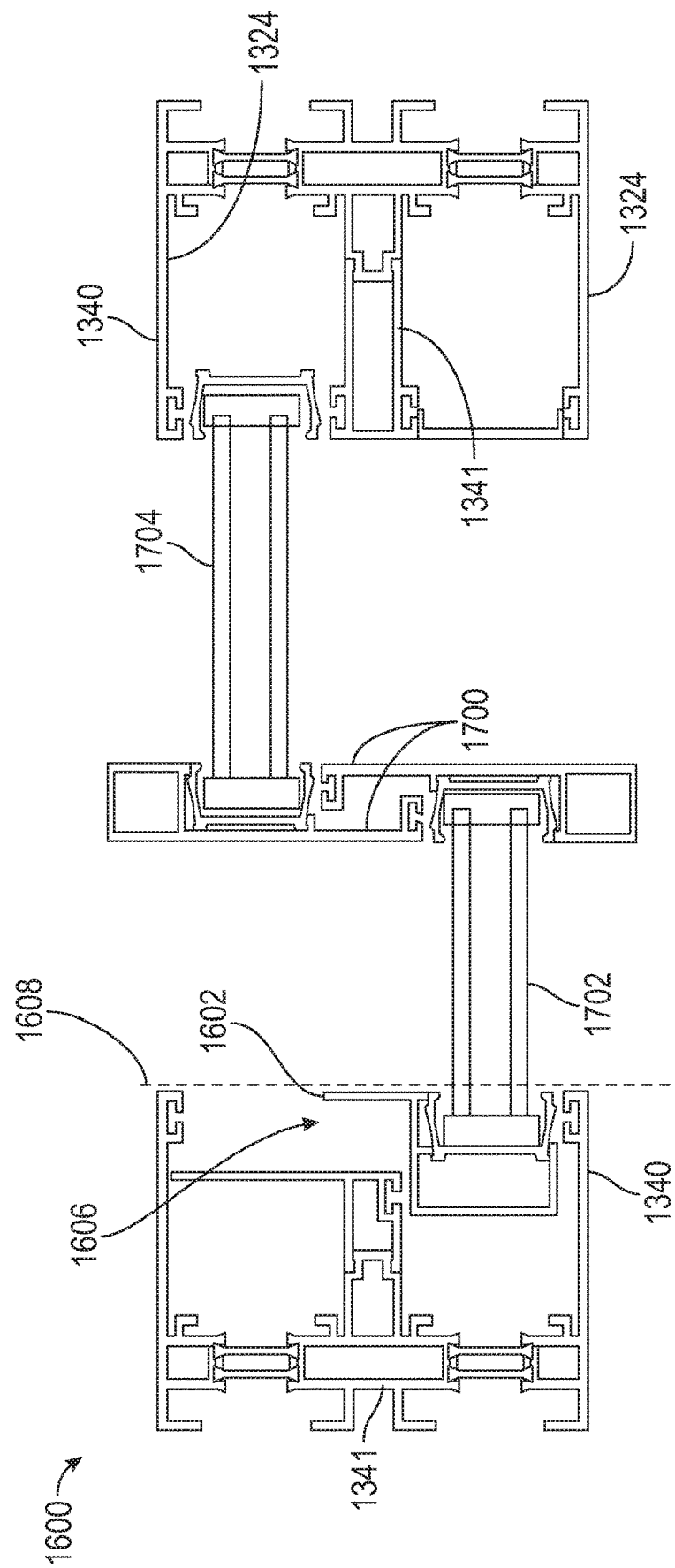
FIG. 17 is a cross-sectional view of the glazing unit module of FIG. 16 including interlocking panels.

FIGS. 16 and 17 show another example of a fenestration wall assembly 1600 including a low profile handle 1602. The low profile handle is a component of the glazing unit module 1324. As shown in FIG. 16, the fenestration wall assembly 1600 (shown without the socket core for illustration) includes a plurality of glazing unit modules 1324 coupled together with the bridge 1341. As shown in this example, the outermost or left glazing unit module 1324 includes one or more glazing unit panes 1348 (e.g., an insulated glazing unit) coupled at the exterior position while the glazing unit module 1324 provided at the interior position is without a glazing unit pane 1348. Instead, a channel cover 1604 is provided across a lower portion of the glazing unit frame 1340 of the second glazing unit module 1324. In one example, the channel cover 1604 is within the channel of the glazing unit frame 1340 to maintain the opening of the glazing unit module 1324, for instance, when the glazing unit pane 1348 at the exterior position is moved to an open position. In another example, in a fenestration wall assembly including a movable glazing unit pane 1348 the channel cover 1604 obstructs the channel of the opposed glazing unit frame 1340 (as shown) to prevent movement of the associated glazing unit pane and otherwise obstruct the opening.

Referring again to FIG. 16 and as previously described, a low profile handle 1602 is coupled with the glazing unit frame 1340 of the left glazing unit module 1324. In this example, the low profile handle 1602 extends from the remainder of the glazing unit frame 1340 and extends across a corresponding portion of the fenestration wall assembly 1600 overlying the bridge 1341. As further shown in FIG. 16, an operator recess 1606 is formed beneath the low profile handle 1602 and is formed in the glazing unit modules 1324 on the right portion of the fenestration wall assembly 1600. For instance, the channel cover 1604 vertically along the glazing unit frame 1340 of the second glazing unit module 1324 to provide a recessed profile to allow for operator access through the operator recess 1606 to the low profile handle 1602. In another option, the channel cover 1604 is removed to provide the operator recess 1606. As further shown in FIG. 16, the low profile handle 1602, as well as the remainder of the glazing unit frames 1340 of each of the glazing unit modules 1324, extends along a common plane 1608 of the fenestration wall assembly 1600. In this example, the common plane 1608 (shown with dashed lines) indicates that the low profile handle 1602 is flush with the remainder of the glazing unit frames 1340. Accordingly, a panel profile corresponding to a daylight opening in this example is maintained without obstruction. Stated another way, the panel profile is isolated from one or more of the module profiles of the glazing unit frames 1340 including the low profile handle 1602. Additionally, because the low profile handle 1602 remains within the profile of the modules, the low profile handle 1602 is concealed until the glazing unit pane 1348 is opened.

When operation of the glazing unit pane 1348 is desired, for instance to open the pane, the operator reaches into the operator recess 1606, grasps the low profile handle 1602 and moves the glazing unit module 1324. In this example, the glazing unit pane 1348 is moved with the low profile handle 1602 from the right to the left of the page to accordingly slide open the glazing unit pane 1348 and provide access either through the window or door of the fenestration wall assembly 1600. Conversely, when closing is desired, the operator pushes on the low profile handle 1602, for instance, from left to right, to move and then seat the glazing unit pane 1348 in the position shown in FIG. 16.

Optionally, a lock or latch mechanism is provided with the fenestration wall assembly 1600. For instance, the lock is coupled along the glazing unit frame 1340 and associated with one or more of the glazing unit modules 1324. A corresponding latch, such as a static latch, hook or the like is provided with the glazing unit pane 1348. Operation of the lock releases the glazing unit pane 1348 for sliding movement, for instance, with the low profile handle 1602. In one example, the lock mechanism remains with the glazing unit frame 1340 and accordingly is concealed within the glazing unit frame 1340 and does not obstruct the aesthetics or daylight opening of the glazing unit pane 1348 when the pane is opened.

FIG. 17 shows a cross-section of the fenestration wall assembly 1600 previously shown in FIG. 16. In this example, the cross-section is taken along a horizontal line extending through the assembly of FIG. 16. Referring now to FIG. 17, the fenestration wall assembly 1600 is shown with glazing unit panes installed between corresponding glazing unit frames 1340. As shown in FIG. 17, a first glazing unit pane 1704, for instance, a static glazing unit, is coupled between an interlock 1700 and the opposed glazing unit frame 1340. In this example, the glazing unit pane 1704 is static and is, when the assembly 1600 is open, stacked with the glazing unit pane 1702 (a moving pane, in this example).

As further shown in FIG. 17, the glazing unit pane 1702 is moveably coupled within the glazing unit module 1324. For instance, the glazing unit pane 1702 extends between the leftmost glazing unit frame 1340 and a corresponding interlock 1700 coupled with the opposed interlock 1700 of the other glazing unit module 1324 having the glazing unit pane 1704. Further, the interlocks 1700 of each of the glazing unit modules 1324 engage, for instance, with the glazing unit pane 1702 in the closed position shown to prevent the ingress of moisture, escape of conditioned air or the like from the fenestration wall assembly 1600. Optionally, a sealant including one or more of a gasket, foam, weather stripping or the like, is provided between the interlocks 1700, for instance, glued there along to enhance the seal therebetween and accordingly further enhance the overall resistance to ingress and egress of one or more of conditioned air, moisture or the like.

As further shown in FIG. 17, the low profile handle 1602 is shown along the common plane 1608. As provided, the low profile handle 1602, in this example, is flush relative to the remainder of the glazing unit frames 1340 proximate to the glazing unit pane 1702 and the interior of the wall assembly 1600. In another example, the low profile handle 1602 is slightly recessed or projecting relative to one or more of the glazing unit frame 1340 edges and is considered to be within a common plane 1608 (e.g., for instance, with the low profile handle 1602 recessed or extending outside of the glazing unit frame by an eighth inch or less).

When opening of the fenestration wall assembly 1600 is desired, the operator reaches their hand into the operator recess 1606 and engages the low profile handle 1602 with the fingers. Movement of the low profile handle 1602 from the left to the right, for example, disengages the interlock 1700 of the lower glazing unit pane 1702, shown in FIG. 17, relative to the static glazing unit pane 1704. Accordingly, the glazing unit pane 1702 moves from left to right the glazing unit panes 1704, 1702 are stacked. The opening extends through the glazing unit modules 1324 to accordingly provide fresh air, access to a porch, balcony or the like. When closing of the fenestration wall assembly 1600 is desired, the user engages the low profile handle 1602 and slides the glazing unit pane 1702 into the closed position shown in FIG. 17.

In another example, the interlocks 1700 shown in FIG. 17 are, in one example, duplicated. For instance, a plurality of glazing unit modules 1324 are moveably coupled within their respective glazing unit frames 1340. In such an example, the interlocks 1700 provide nested coupling of each of the glazing unit panes 1702, 1704 of the various glazing unit modules 1324. For instance, the interlocks 1700 facilitate the closing and opening of each of the panes 1702, 1704 in a telescoping manner to accordingly provide a stacked or stacked up configuration of the panes 1702, 1704 (including multiple panes) when open to provide a large opening through the fenestration wall assembly 1600. During movement to the closed position, the glazing unit pane 1702, including the low profile handle 1602, is slid toward the closed position and the interlocks 1700 engage with each other and accordingly deploy each of the glazing unit panes 1702 in a telescoping manner to accordingly bridge the entirety of the opening and thereby close the opening and the fenestration wall assembly 1600.

Figure 18:
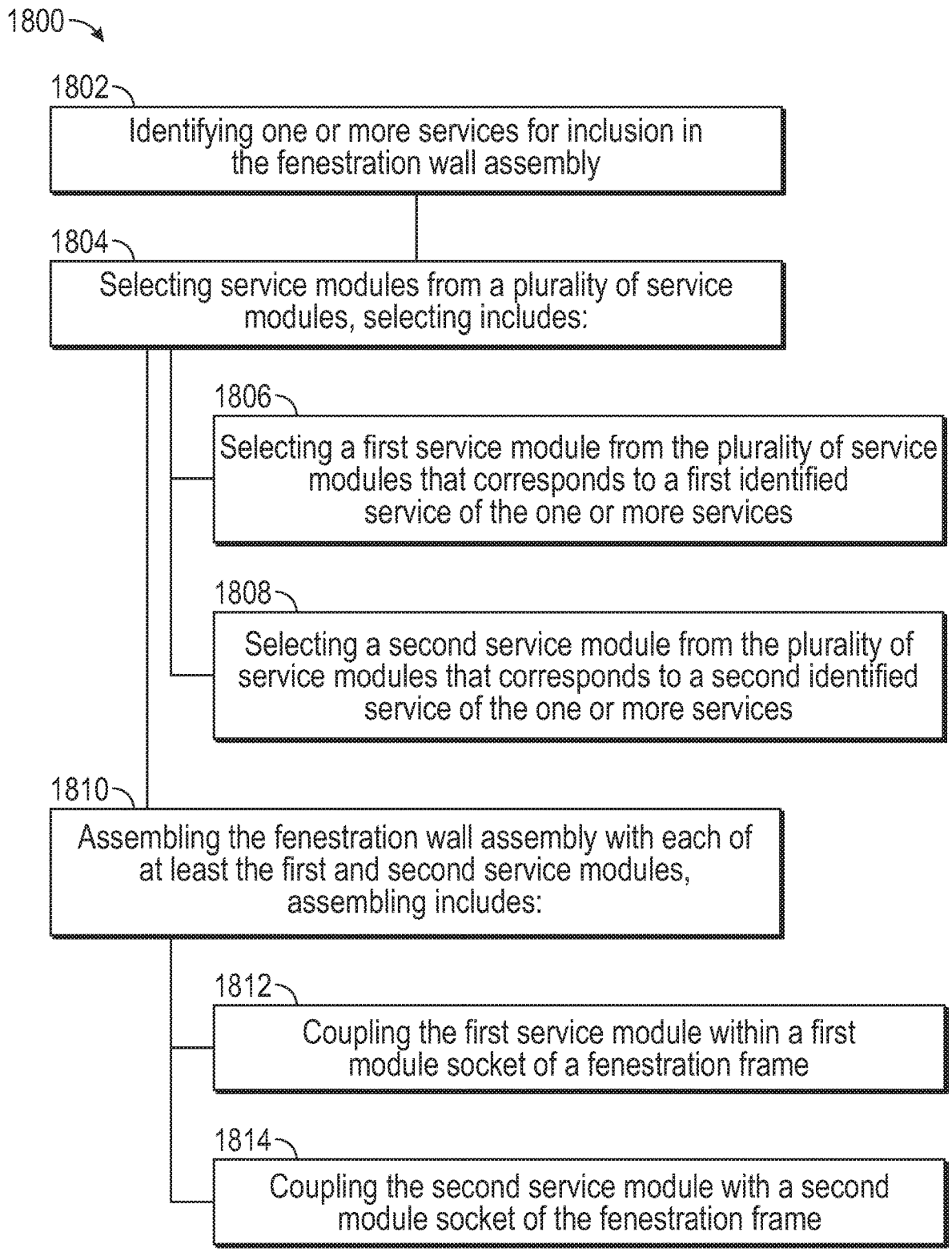
FIG. 18 is a block diagram showing one example of method for selecting and assembling a fenestration wall assembly.

FIG. 18 shows one example of a method 1800 for selecting and assembly a fenestration wall assembly, including the example fenestration wall assemblies described herein. In describing the method 1800, reference is made to one or more components, features, functions and steps previously described herein. Where convenient reference is made to the components, features, steps and the like with reference numerals. Reference numerals provided are exemplary and are not exclusive. For instance, components, features, functions, steps and the like described in the method 1800 include but are not limited to the other corresponding numbered elements provided herein, other corresponding features described herein (both numbered and unnumbered) as well as their equivalents.

At 1802, the method 1800 includes identifying one or more services for inclusion in the fenestration wall assembly (e.g., one or more of 300, 1300 or the like). The services for selection include, but are not limited to, conditioned air, window treatments, cabling (ethernet, data, audio, coaxial or the like), power, telephone service, utility services including water (cold or hot), compressed air, natural gas or the like.

At 1804, service modules are selected from a plurality of service modules, for instance provided in a catalog, at a construction site, website or the like. Selecting of the service modules includes at 1806 selecting a first service module from the plurality of service modules that corresponds to a first identified service of the one or more services. At 1808 a second service module is selected from the plurality of service modules that corresponds to a second identified service of the one or more services. In other examples, the selection of service modules is repeated until the specified services are satisfied with corresponding service modules. The service modules include, but are not limited to, one or more of glazing unit modules 308, conduit modules 310, drainage or diversion modules 680, screen modules 630 (e.g., having onboard window treatments), wall modules 670, trim modules (e.g., cladding, trim modules as shown in FIGS. 7A-F) or the like.

At 1810, the method 1800 includes assembling the fenestration wall assembly 300, 1300 (as two example) with each of at least the first and second service modules. Assembly includes at 1812 coupling the first service module within a first module socket of a fenestration frame, for instance the module socket 400 of the fenestration frame 302 having a socket core 306. In another example, the first service module is installed in the module sockets 1316, 1314 of the socket cores 1313, 1312 (see FIGS. 13A, B). Similarly, at 1814, the second service module is installed with a second module socket (e.g., 400, 1316, 1314) of the fenestration frame. Installation is optionally repeated to install each of the service modules with the fenestration frame. Installation of the service modules is conducted at one or more locations in various examples. In one example, the service modules are installed at the factory during assembly of the overall fenestration wall assembly. In another example, the service modules are installed on site, for instance from pallets or the like prior to placement on a building. In still other examples, the fenestration frame is installed in the building, for instance along a shared edge along the floor and ceiling between two or more floors. In this example, the service modules are delivered to the installed fenestration frames including socket cores. The service modules are placed in module sockets, and positioned along the socket cores as specified. For example, the service modules are installed at first location on the socket cores, and then moved laterally into a specified position. Additional service modules are installed and moved laterally into a proximate position of the previously positioned service module. In another example, installation of the servicer modules further includes interconnecting of service modules across fenestration wall assembles. For instance, conduits of one or more conduit modules are interfit or the like.

Several options for the method 1800 follow. In one example, coupling of the first or second service modules includes interfitting a coupling fitting of the first or second service modules with a coupling port of the first or second module sockets. The coupling fittings and ports described herein are interchangeable and include, but are not limited to, one or more of surfaces of the sockets and modules coupled with each other (e.g., in surface to surface contact), rails and runners (or rollers), mortise and tenon features, slots and pins, orifices and posts, ports and fittings, grooves and ridges or the like.

In another example, the fenestration wall assembly includes a panel surrounded by the fenestration frame and the panel includes a panel profile. Assembling the fenestration wall assembly includes isolating the panel profile from first and second module profiles of the first and second service modules, respectively. For example, the module profiles are within the fenestration frame, and accordingly the panel profile, including a daylight opening, wall panel or the like is not obstructed by the module profiles. In another example, the fenestration frame includes a frame profile corresponding to one or more components of the fenestration, such as the socket core. The socket core includes one or more module sockets, and assembling the fenestration wall assembly includes aligning the first and second module profiles of the respective first and second service modules with the frame profile. For example, the module bodies of the service modules have complementary profiles to the module socket profiles, and the service modules are accordingly housed therein, consolidated with the fenestration wall assembly, and concealed in the assembly to facilitate a clean aesthetic while providing one or more services with the assembly.

VARIOUS NOTES & EXAMPLES

Example 1 can include subject matter such as a fenestration wall assembly configured for coupling with a building, the fenestration wall assembly comprising: a fenestration frame extending along a perimeter of the fenestration wall assembly, the fenestration frame includes a socket core, and the socket core includes: a first module socket having at least one of a coupling port or coupling fitting, the first module socket is configured to interchangeably receive service modules therein, and a second module socket having at least one of a coupling port or coupling fitting, the second module socket is configured to interchangeably receive service modules therein; and wherein the interchangeably received service modules include at least first and second service modules: the first service module within the first module socket, the first service module includes a coupling fitting or coupling port coupled with the respective coupling port or coupling fitting of the first module socket, and the second service module within the second module socket, the second service module includes a coupling fitting or coupling port coupled with the respective coupling port or coupling fitting of the second module socket.

Example 2 can include, or can optionally be combined with the subject matter of Example 1, to optionally include wherein the first and second module sockets are configured to receive each of the first and second service modules.

Example 3 can include, or can optionally be combined with the subject matter of one or any combination of Examples 1 or 2 to optionally include wherein the fenestration frame is the socket core.

Example 4 can include, or can optionally be combined with the subject matter of one or any combination of Examples 1-3 to optionally include a panel coupled within the fenestration frame, the panel includes a panel profile.

Example 5 can include, or can optionally be combined with the subject matter of one or any combination of Examples 1-4 to optionally include wherein the first and second service module include corresponding first and second module profiles, and the panel profile is isolated from the first and second module profiles.

Example 6 can include, or can optionally be combined with the subject matter of Examples 1-5 to optionally include wherein the first and second service modules include corresponding first and second module profiles, and the first and second module profiles are concealed by the fenestration frame.

Example 7 can include, or can optionally be combined with the subject matter of Examples 1-6 to optionally include wherein the panel includes one or more of a glazing unit, a door unit or a wall unit.

Example 8 can include, or can optionally be combined with the subject matter of Examples 1-7 to optionally include wherein the socket core includes an installation flange configured for coupling with the building.

Example 9 can include, or can optionally be combined with the subject matter of Examples 1-8 to optionally include wherein the coupling port and coupling fitting include one or more of coupled surfaces, rail and runner, mortise and tenon, slot and pin, port and post or groove and ridge complementary fittings.

Example 10 can include, or can optionally be combined with the subject matter of Examples 1-9 to optionally include wherein the first and second service modules include one or more of a conduit module, a screen module, a glazing unit module, a door module, a wall module, a diversion module or a trim module.

Example 11 can include, or can optionally be combined with the subject matter of Examples 1-10 to optionally include wherein each of the first and second service modules includes a module body configured for reception in at least one of the first or second module sockets.

Example 12 can include, or can optionally be combined with the subject matter of Examples 1-11 to optionally include wherein each module body of the first and second service modules includes the at least one coupling fitting or coupling port.

Example 13 can include, or can optionally be combined with the subject matter of Examples 1-12 to optionally include wherein the module body includes an environmental conduit.

Example 14 can include, or can optionally be combined with the subject matter of Examples 1-13 to optionally include wherein the module body includes a diversion conduit.

Example 15 can include, or can optionally be combined with the subject matter of Examples 1-14 to optionally include wherein the module body includes a cable conduit.

Example 16 can include, or can optionally be combined with the subject matter of Examples 1-15 to optionally include wherein the module body includes a utility fitting configured to communicate with the first or second service module.

Example 17 can include, or can optionally be combined with the subject matter of Examples 1-16 to optionally include wherein at least one of the first or second service modules includes a screen module having: a module body including a screen recess, a screen spool within the screen recess including a screen wound on the screen spool, and a recess cover including at least one deployment port.

Example 18 can include, or can optionally be combined with the subject matter of Examples 1-17 to optionally include wherein at least one of the first or second service modules includes a glazing unit module having: at least one glazing unit frame, and at least one glazing unit pane coupled with the glazing unit frame.

Example 19 can include, or can optionally be combined with the subject matter of Examples 1-18 to optionally include wherein the at least one glazing unit pane includes two or more glazing unit panes, and the at least one glazing unit frame includes a spacing seal coupled along edges of the two or more glazing unit panes.

Example 20 can include, or can optionally be combined with the subject matter of Examples 1-19 to optionally include a fenestration wall assembly comprising: a fenestration frame extending along a perimeter of the fenestration wall assembly, the fenestration frame includes a socket core, and the socket core includes: a first module socket configured to interchangeably receive service modules therein, and a second module socket configured to interchangeably receive service modules therein; a first service module, of the interchangeably received service modules, within the first module socket, and the first service module includes a first module profile; a second service module, of the interchangeably received service modules, within the second module socket, and the second service module includes a second module profile; and a panel surrounded by the fenestration frame, the panel includes a panel profile, and the panel profile is isolated from the first and second module profiles.

Example 21 can include, or can optionally be combined with the subject matter of Examples 1-20 to optionally include wherein the first and second module profiles are concealed by the fenestration frame.

Example 22 can include, or can optionally be combined with the subject matter of Examples 1-21 to optionally include wherein the fenestration frame is the socket core.

Example 23 can include, or can optionally be combined with the subject matter of Examples 1-22 to optionally include wherein the panel includes one or more of a glazing unit, a door unit or a wall unit.

Example 24 can include, or can optionally be combined with the subject matter of Examples 1-23 to optionally include wherein each of the first and second module sockets include at least one of a coupling fitting or a coupling port, and the first and second service modules include at least one of a coupling port or a coupling fitting configured for coupling with the respective coupling fitting or coupling port of the first and second socket modules.

Example 25 can include, or can optionally be combined with the subject matter of Examples 1-24 to optionally include wherein the coupling fittings and the coupling ports include one or more of rail and runner, mortise and tenon, slot and pin, port and post, or groove and ridge complementary fittings.

Example 26 can include, or can optionally be combined with the subject matter of Examples 1-25 to optionally include wherein the first and second service modules include one or more of a conduit module, a screen module, a glazing unit module, a door module, a wall module, a diversion module or a trim module.

Example 27 can include, or can optionally be combined with the subject matter of Examples 1-26 to optionally include wherein each of the first and second service modules includes a module body configured for reception in at least one of the first or second module sockets.

Example 28 can include, or can optionally be combined with the subject matter of Examples 1-27 to optionally include wherein the module body includes one or more of an environmental conduit, a diversion conduit or a cable conduit.

Example 29 can include, or can optionally be combined with the subject matter of Examples 1-28 to optionally include wherein the first service module includes a glazing unit module having: at least one glazing unit frame, and at least one glazing unit pane coupled with the glazing unit frame; wherein the panel includes the at least one glazing unit pane, the visible portion of the at least one glazing unit pane includes the panel profile, and the at least one glazing unit frame includes the first module profile.

Example 30 can include, or can optionally be combined with the subject matter of Examples 1-29 to optionally include wherein the fenestration frame includes an exterior facing portion and an interior facing portion, and the exterior facing portion includes at least the first module socket, and the interior facing portion includes at least the second module socket.

Example 31 can include, or can optionally be combined with the subject matter of Examples 1-30 to optionally include wherein the fenestration frame includes a floor facing portion and a ceiling facing portion, and the floor facing portion includes at least the first module socket, and the ceiling facing portion includes at least the second module socket.

Example 32 can include, or can optionally be combined with the subject matter of Examples 1-31 to optionally include wherein the fenestration frame includes an exterior facing portion having frame cladding that bridges the floor and ceiling facing portions.

Example 33 can include, or can optionally be combined with the subject matter of Examples 1-32 to optionally include wherein the frame cladding extends continuously between the floor and ceiling facing portions.

Example 34 can include, or can optionally be combined with the subject matter of Examples 1-33 to optionally include wherein the socket core includes a vertical portion extending between fenestration frame rails of the fenestration frame, and the vertical portion includes one or more vertical module sockets.

Example 35 can include, or can optionally be combined with the subject matter of Examples 1-34 to optionally include wherein a third service module is coupled with the one or more vertical module sockets.

Example 36 can include, or can optionally be combined with the subject matter of Examples 1-35 to optionally include wherein the third service module includes a trim module.

Example 37 can include, or can optionally be combined with the subject matter of Examples 1-36 to optionally include a method for selecting and assembling a fenestration wall assembly comprising: identifying one or more services for inclusion in the fenestration wall assembly; selecting service modules from a plurality of service modules, selecting includes: selecting a first service module from the plurality of service modules that corresponds to a first identified service of the one or more services, and selecting a second service module from the plurality of service modules that corresponds to a second identified service of the one or more services; and assembling the fenestration wall assembly with each of at least the first and second service modules, assembling includes: coupling the first service module within a first module socket of a fenestration frame, and coupling the second service module with a second module socket of the fenestration frame.

Example 38 can include, or can optionally be combined with the subject matter of Examples 1-37 to optionally include wherein one or both of coupling the first or second service modules includes interfitting a coupling fitting of the first or second service modules with a coupling port of the first or second module sockets.

Example 39 can include, or can optionally be combined with the subject matter of Examples 1-38 to optionally include wherein the fenestration wall assembly includes a panel surrounded by the fenestration frame, the panel includes a panel profile, and assembling the fenestration wall assembly includes isolating the panel profile from first and second module profiles of the first and second service modules, respectively.

Example 40 can include, or can optionally be combined with the subject matter of Examples 1-39 to optionally include wherein the fenestration frame includes a frame profile, and assembling the fenestration wall assembly includes aligning the first and second module profiles of the respective first and second service modules with the frame profile.

Example 41 can include, or can optionally be combined with the subject matter of Examples 1-40 to optionally include wherein selecting service modules from the plurality of service modules includes selecting service modules from one or more of a conduit module, a screen module, a glazing unit module, a door module, a wall module, a diversion module or a trim module.

Example 42 can include, or can optionally be combined with the subject matter of Examples 1-41 to optionally include a frame cladding coupled with at least the fenestration frame, the frame cladding includes a cladding profile complementary to the fenestration frame including the socket core and at least the first and second service modules.

Example 43 can include, or can optionally be combined with the subject matter of Examples 1-42 to optionally include a frame cladding coupled over the socket core and at least the first and second service modules, the frame cladding includes a cladding profile complementary to at least the socket core and at least the first and second service modules.

Example 44 can include, or can optionally be combined with the subject matter of Examples 1-43 to optionally include wherein assembling the fenestration wall assembly includes covering at least one of the first or second service modules and the respective first or second module sockets with a frame cladding, and the frame cladding includes a cladding profile complementary to the covered first or second service modules and the respective first or second module sockets.

Example 45 can include, or can optionally be combined with the subject matter of Examples 1-44 to optionally include a fenestration wall assembly configured for coupling with a building, the fenestration wall assembly comprising: a fenestration frame extending along a perimeter of the fenestration wall assembly, the fenestration frame includes a socket core, and the socket core includes: a first module socket configured to interchangeably receive service modules therein; and a second module socket configured to interchangeably receive service modules therein; and wherein the interchangeably received service modules include at least first and second service modules, the first service module within the first module socket, and the second service module within the second module socket; and a frame cladding coupled with at least the fenestration frame, the frame cladding includes a cladding profile complementary to the fenestration frame including the socket core and at least the first and second service modules.

Example 46 can include, or can optionally be combined with the subject matter of Examples 1-45 to optionally include wherein the cladding profile includes one or more shape, size, material, color or finish.

Example 47 can include, or can optionally be combined with the subject matter of Examples 1-46 to optionally include wherein the cladding profile includes a complementary shape to a frame contour of the socket core and at least the first and second service modules within the respective first and second module sockets, and the frame cladding follows the frame contour.

Example 48 can include, or can optionally be combined with the subject matter of Examples 1-47 to optionally include wherein at least one of the first or second module sockets is an exterior module socket, and the cladding profile wraps over at least the socket core and one or more of the first or second service modules within the exterior facing module socket.

Example 49 can include, or can optionally be combined with the subject matter of Examples 1-48 to optionally include wherein the frame cladding includes a plurality of lapped flashing segments.

Example 50 can include, or can optionally be combined with the subject matter of Examples 1-49 to optionally include wherein a frame profile of one or more of the socket core or the first or second service modules includes one or more of a frame material, frame color or frame finish; and the cladding profile includes one or more of matching cladding material, cladding color or cladding finish.

Each of these non-limiting examples can stand on its own, or can be combined in various permutations or combinations with one or more of the other examples.

above detailed description includes references to the accompanying drawings, which form a part of the detailed description. The drawings show, by way of illustration, specific embodiments in which the disclosure can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

What is claimed is:

1. A fenestration wall assembly configured for coupling with a building, the fenestration wall assembly comprising:
   a fenestration frame extending along a perimeter of the fenestration wall assembly, the fenestration frame includes a socket core, and the socket core includes:
      a first module socket having at least one of a coupling port or coupling fitting, the first module socket is configured to interchangeably receive service modules therein; and
      a second module socket having at least one of a coupling port or coupling fitting, the second module socket is configured to interchangeably receive service modules therein;
   wherein the service modules include at least first and second service modules:
      the first service module is received within the first module socket, the first service module includes a coupling fitting or coupling port coupled with the coupling port or coupling fitting of the first module socket, and the first service module includes a first module profile; and
      the second service module is received within the second module socket, the second service module includes a coupling fitting or coupling port coupled with the coupling port or coupling fitting of the second module socket, and the second service module includes a first module profile; and
   wherein the fenestration frame conceals each of the first and second module profiles.

2. The fenestration wall assembly of claim 1, wherein the fenestration frame is the socket core.

3. The fenestration wall assembly of claim 1, wherein the socket core includes an installation flange configured for coupling with the building.

4. The fenestration wall assembly of claim 1, wherein the coupling port and coupling fitting include one or more of coupled surfaces, rail and runner, mortise and tenon, slot and pin, port and post or groove and ridge complementary fittings.

5. The fenestration wall assembly of claim 1, wherein the first and second service modules include one or more of a conduit module, a screen module, a glazing unit module, a door module, a wall module, a diversion module or a trim module.

6. The fenestration wall assembly of claim 1, wherein at least one of the first or second service modules includes a screen module having:
   a module body including a screen recess;
   a screen spool within the screen recess including a screen wound on the screen spool; and
   a recess cover including at least one deployment port.

7. The fenestration wall assembly of claim 1, wherein the fenestration frame includes a frame cladding coupled with a remainder of the fenestration frame.

8. The fenestration wall assembly of claim 1, wherein at least one of the first or second service modules includes a glazing unit module having:
   at least one glazing unit frame; and
   at least one glazing unit pane coupled with the glazing unit frame.

9. The fenestration wall assembly of claim 8, wherein the at least one glazing unit pane includes two or more glazing unit panes; and
   the at least one glazing unit frame includes a spacing seal coupled along edges of the two or more glazing unit panes.

10. The fenestration wall assembly of claim 1 comprising a panel coupled within the fenestration frame, the panel includes a panel profile.

11. The fenestration wall assembly of claim 10, wherein the panel profile is isolated from the first and second module profiles.

12. The fenestration wall assembly of claim 10, wherein the panel includes one or more of a glazing unit, a door unit or a wall unit.

13. The fenestration wall assembly of claim 1, wherein each of the first and second service modules includes a module body configured for reception in at least one of the first or second module sockets.

14. The fenestration wall assembly of claim 13, wherein each module body of the first and second service modules includes the at least one coupling fitting or coupling port.

15. The fenestration wall assembly of claim 13, wherein the module body includes an environmental conduit.

16. The fenestration wall assembly of claim 13, wherein the module body includes a diversion conduit.

17. The fenestration wall assembly of claim 13, wherein the module body includes a cable conduit.

18. The fenestration wall assembly of claim 13, wherein the module body includes a utility fitting configured to communicate with the first or second service module.

19. A fenestration wall assembly comprising:
a fenestration frame extending along a perimeter of the fenestration wall assembly, the fenestration frame includes a socket core, and the socket core includes:
a first module socket configured to interchangeably receive service modules therein; and
a second module socket configured to interchangeably receive service modules therein;
a first service module, of the interchangeably received service modules, received within the first module socket, and the first service module includes a first module profile;
a second service module, of the interchangeably received service modules, received within the second module socket, and the second service module includes a second module profile;
a panel surrounded by the fenestration frame, the panel includes a panel profile, and the panel profile is isolated from the first and second module profiles; and
wherein the fenestration frame conceals each of the first and second module profiles.

20. The fenestration wall assembly of claim 19, wherein the first and second module profiles are concealed by the fenestration frame.

21. The fenestration wall assembly of claim 19, wherein the fenestration frame is the socket core.

22. The fenestration wall assembly of claim 19, wherein the panel includes one or more of a glazing unit, a door unit or a wall unit.

23. The fenestration wall assembly of claim 19, wherein the first and second service modules include one or more of a conduit module, a screen module, a glazing unit module, a door module, a wall module, a diversion module or a trim module.

24. The fenestration wall assembly of claim 19, wherein the first service module includes a glazing unit module having:
at least one glazing unit frame; and
at least one glazing unit pane coupled with the glazing unit frame;
wherein the panel includes the at least one glazing unit pane, the visible portion of the at least one glazing unit pane includes the panel profile, and the at least one glazing unit frame includes the first module profile.

25. The fenestration wall assembly of claim 19, wherein the fenestration frame includes an exterior facing portion and an interior facing portion, and
the exterior facing portion includes at least the first module socket; and
the interior facing portion includes at least the second module socket.

26. The fenestration wall assembly of claim 19, comprising a frame cladding coupled over the socket core and at least the first and second service modules, the frame cladding includes a cladding profile complementary to at least the socket core and at least the first and second service modules.

27. The fenestration wall assembly of claim 19, wherein each of the first and second module sockets include at least one of a coupling fitting or a coupling port, and
the first and second service modules include at least one of a coupling port or a coupling fitting configured for coupling with the respective coupling fitting or coupling port of the first and second socket modules.

28. The fenestration wall assembly of claim 27, wherein the coupling fittings and the coupling ports include one or more of coupled surfaces, rail and runner, mortise and tenon, slot and pin, port and post, or groove and ridge complementary fittings.

29. The fenestration wall assembly of claim 19, wherein each of the first and second service modules includes a module body configured for reception in at least one of the first or second module sockets.

30. The fenestration wall assembly of claim 29, wherein the module body includes one or more of an environmental conduit, a diversion conduit or a cable conduit.

31. The fenestration wall assembly of claim 19, wherein the fenestration frame includes a floor facing portion and a ceiling facing portion; and
the floor facing portion includes at least the first module socket; and
the ceiling facing portion includes at least the second module socket.

32. The fenestration wall assembly of claim 31, wherein the fenestration frame includes an exterior facing portion having frame cladding that bridges the floor and ceiling facing portions.

33. The fenestration wall assembly of claim 32, wherein the frame cladding extends continuously between the floor and ceiling facing portions.

34. The fenestration wall assembly of claim 19, wherein the socket core includes a vertical portion extending between fenestration frame rails of the fenestration frame, and the vertical portion includes one or more vertical module sockets.

35. The fenestration wall assembly of claim 34, wherein a third service module is coupled with the one or more vertical module sockets.

36. The fenestration wall assembly of claim 35, wherein the third service module includes a trim module.

37. A fenestration wall assembly configured for coupling with a building, the fenestration wall assembly comprising:
a fenestration frame extending along a perimeter of the fenestration wall assembly, the fenestration frame includes a socket core, and the socket core includes:
a first module socket configured to interchangeably receive service modules therein; and
a second module socket configured to interchangeably receive service modules therein;
wherein the interchangeably received service modules include at least first and second service modules having respective first and second module profiles, the first service module received within the first module socket, and the second service module received within the second module socket; and
wherein the fenestration frame includes a frame cladding coupled with a remainder of the fenestration frame, the frame cladding includes a cladding profile complementary to the remainder of the fenestration frame including the socket core and at least the first and second service modules, and the fenestration frame conceals the first and second module profiles.

38. The fenestration wall assembly of claim 37, wherein the cladding profile includes one or more shape, size, material, color or finish.

39. The fenestration wall assembly of claim 37, wherein the cladding profile includes a complementary shape to a frame contour of the socket core and at least the first and second service modules within the respective first and second module sockets, and the frame cladding follows the frame contour.

40. The fenestration wall assembly of claim 37, wherein at least one of the first or second module sockets is an exterior module socket, and the cladding profile wraps over at least the socket core and one or more of the first or second service modules within the exterior facing module socket.

41. The fenestration wall assembly of claim 37, wherein the frame cladding includes a plurality of lapped flashing segments.

42. The fenestration wall assembly of claim 37, wherein a frame profile of one or more of the socket core or the first or second service modules includes one or more of a frame material, frame color or frame finish; and
the cladding profile includes one or more of matching cladding material, cladding color or cladding finish.

43. A method of selecting and assembling the fenestration wall assembly of claim 1 comprising:
identifying one or more services for inclusion in the fenestration wall assembly;
selecting service modules from a plurality of service modules including the at least first and second service modules, selecting includes:
selecting the first service module from the plurality of service modules that corresponds to a first identified service of the one or more services; and
selecting the second service module from the plurality of service modules that corresponds to a second identified service of the one or more services; and
assembling the fenestration wall assembly with each of the at least first and second service modules, assembling includes:
coupling the first service module within the first module socket of the fenestration frame; and
coupling the second service module with the second module socket of the fenestration frame; and
concealing the first and second module profiles of respective said first and second service modules within the fenestration frame.

44. The method of claim 43, wherein one or both of coupling the first or second service modules includes interfitting a coupling fitting of the first or second service modules with a coupling port of the first or second module sockets.

45. The method of claim 43, wherein the fenestration wall assembly includes a panel surrounded by the fenestration frame, the panel includes a panel profile; and
assembling the fenestration wall assembly includes isolating the panel profile from first and second module profiles of the first and second service modules, respectively.

46. The method of claim 43, wherein the fenestration frame includes a frame profile; and
assembling the fenestration wall assembly includes aligning the first and second module profiles of the respective first and second service modules with the frame profile.

47. The method of claim 43, wherein selecting service modules from the plurality of service modules includes selecting service modules from one or more of a conduit module, a screen module, a glazing unit module, a door module, a wall module, a diversion module or a trim module.

48. The method of claim 43, wherein assembling the fenestration wall assembly includes covering at least one of the first or second service modules and the respective first or second module sockets with a frame cladding, and the frame cladding includes a cladding profile complementary to the covered first or second service modules and the respective first or second module sockets.

49. A method of selecting and assembling the fenestration wall assembly of claim 19 comprising:
identifying one or more services for inclusion in the fenestration wall assembly;
selecting service modules from a plurality of service modules including the at least first and second service modules, selecting includes:
selecting the first service module from the plurality of service modules that corresponds to a first identified service of the one or more services; and
selecting the second service module from the plurality of service modules that corresponds to a second identified service of the one or more services; and
assembling the fenestration wall assembly with each of the at least first and second service modules, assembling includes:
coupling the first service module within the first module socket of the fenestration frame; and
coupling the second service module with the second module socket of the fenestration frame; and
concealing the first and second module profiles of respective said first and second service modules within the fenestration frame.

50. The method of claim 49, wherein one or both of coupling the first or second service modules includes interfitting a coupling fitting of the first or second service modules with a coupling port of the first or second module sockets.

51. The method of claim 49, wherein the fenestration wall assembly includes a panel surrounded by the fenestration frame, the panel includes a panel profile; and assembling the fenestration wall assembly includes isolating the panel profile from first and second module profiles of the first and second service modules, respectively.

52. The method of claim 49, wherein the fenestration frame includes a frame profile; and assembling the fenestration wall assembly includes aligning the first and second module profiles of the respective first and second service modules with the frame profile.

53. The method of claim 49, wherein selecting service modules from the plurality of service modules includes selecting service modules from one or more of a conduit module, a screen module, a glazing unit module, a door module, a wall module, a diversion module or a trim module.

54. The method of claim 49, wherein assembling the fenestration wall assembly includes covering at least one of the first or second service modules and the respective first or second module sockets with a frame cladding, and the frame cladding includes a cladding profile complementary to the covered first or second service modules and the respective first or second module sockets.

55. A method of selecting and assembling the fenestration wall assembly of claim 37 comprising:

identifying one or more services for inclusion in the fenestration wall assembly;

selecting service modules from a plurality of service modules including the at least first and second service modules, selecting includes:
  selecting the first service module from the plurality of service modules that corresponds to a first identified service of the one or more services; and
  selecting the second service module from the plurality of service modules that corresponds to a second identified service of the one or more services; and assembling the fenestration wall assembly with each of the at least first and second service modules, assembling includes:
  coupling the first service module within the first module socket of the fenestration frame; and
  coupling the second service module with the second module socket of the fenestration frame; and concealing the first and second module profiles of respective said first and second service modules within the fenestration frame.

56. The method of claim 55, wherein one or both of coupling the first or second service modules includes interfitting a coupling fitting of the first or second service modules with a coupling port of the first or second module sockets.

57. The method of claim 55, wherein the fenestration wall assembly includes a panel surrounded by the fenestration frame, the panel includes a panel profile; and assembling the fenestration wall assembly includes isolating the panel profile from first and second module profiles of the first and second service modules, respectively.

58. The method of claim 55, wherein the fenestration frame includes a frame profile; and assembling the fenestration wall assembly includes aligning the first and second module profiles of the respective first and second service modules with the frame profile.

59. The method of claim 55, wherein selecting service modules from the plurality of service modules includes selecting service modules from one or more of a conduit module, a screen module, a glazing unit module, a door module, a wall module, a diversion module or a trim module.

60. The method of claim 55, wherein assembling the fenestration wall assembly includes covering at least one of the first or second service modules and the respective first or second module sockets with a frame cladding, and the frame cladding includes a cladding profile complementary to the covered first or second service modules and the respective first or second module sockets.

* * * * *